(12) United States Patent
Nehashi et al.

(10) Patent No.: US 11,852,894 B2
(45) Date of Patent: Dec. 26, 2023

(54) LASER PROCESSING APPARATUS CAPABLE OF MEASURING A DISTANCE TO A WORKPIECE WITH LASER LIGHT

(71) Applicant: Keyence Corporation, Osaka (JP)

(72) Inventors: Kazuma Nehashi, Osaka (JP); Hideki Yamakawa, Osaka (JP); Kosuke Matano, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 865 days.

(21) Appl. No.: 16/693,405

(22) Filed: Nov. 25, 2019

(65) Prior Publication Data

US 2020/0209523 A1 Jul. 2, 2020

(30) Foreign Application Priority Data

Dec. 28, 2018 (JP) .................................. 2018-246974

(51) Int. Cl.
*G02B 7/32* (2021.01)
*B23K 26/03* (2006.01)
(Continued)

(52) U.S. Cl.
CPC .............. *G02B 7/32* (2013.01); *B23K 26/032* (2013.01); *B23K 26/048* (2013.01);
(Continued)

(58) Field of Classification Search
CPC ........ G02B 7/32; G02B 11/026; G02B 11/22; B23K 26/082; B23K 26/032;
(Continued)

(56) References Cited

U.S. PATENT DOCUMENTS 4,769,523 A * 9/1988 Tanimoto ............. B23K 26/082
257/E23.179
5,386,263 A * 1/1995 Kotani ..................... G02B 7/32
396/123
(Continued)

FOREIGN PATENT DOCUMENTS

JP 2006315031 A 11/2006
JP 2008215829 A 9/2008

OTHER PUBLICATIONS

U.S. Appl. No. 16/693,403, filed Nov. 25, 2019 (178 pages).

*Primary Examiner* — Jennifer D Bennett
*Assistant Examiner* — Erin R Garber
(74) *Attorney, Agent, or Firm* — Kilyk & Bowersox, P.L.L.C.

(57) ABSTRACT

A laser processing apparatus includes a laser light output section, a laser light scanning section, a distance measurement light emitting section which emits distance measurement light, a pair of light receiving elements which receives the distance measurement light emitted from the distance measurement light emitting section and reflected by the workpiece, optical axes of the pair of light receiving elements being arranged inside the housing so as to sandwich an optical axis of the distance measurement light emitting section, a distance measuring section which measures a distance to the surface of the workpiece, and a light receiving lens which is arranged such that each of the optical axes of the pair of light receiving elements passes through the light receiving lens, and condenses the distance measurement light that has been reflected by the workpiece on respective light receiving surfaces of the pair of light receiving elements.

14 Claims, 30 Drawing Sheets

(51) Int. Cl.
*B23K 26/06* (2014.01)
*G01B 11/02* (2006.01)
*B23K 26/04* (2014.01)
*B23K 26/082* (2014.01)
*B23K 26/064* (2014.01)
*B23K 26/70* (2014.01)
*B23K 26/362* (2014.01)

(52) U.S. Cl.
CPC ........ *B23K 26/064* (2015.10); *B23K 26/0643* (2013.01); *B23K 26/0648* (2013.01); *B23K 26/082* (2015.10); *B23K 26/702* (2015.10); *G01B 11/026* (2013.01); *B23K 26/362* (2013.01)

(58) Field of Classification Search
CPC .. B23K 26/048; B23K 26/042; B23K 26/046; B23K 26/064; B23K 26/0643; B23K 26/0648; B23K 26/0665; B23K 26/359; B23K 26/707; G06T 2207/30144; G06T 7/0004; H04N 7/183
See application file for complete search history.

(56) References Cited

U.S. PATENT DOCUMENTS

| | | | |
|---|---|---|---|
| 2009/0154504 A1* | 6/2009 | Sato | B23K 26/082 372/24 |
| 2015/0002638 A1* | 1/2015 | Suzuki | G01B 11/14 348/47 |
| 2015/0029489 A1* | 1/2015 | Metzler | G01S 7/4812 356/4.01 |
| 2019/0126393 A1* | 5/2019 | Igasaki | B23K 26/035 |
| 2019/0184491 A1 | 6/2019 | Idaka et al. | |
| 2019/0190227 A1 | 6/2019 | Sato et al. | |

* cited by examiner

FIG. 18
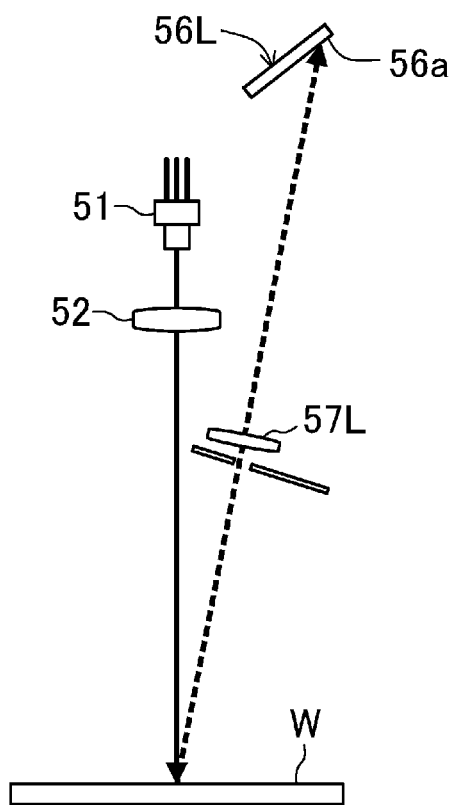
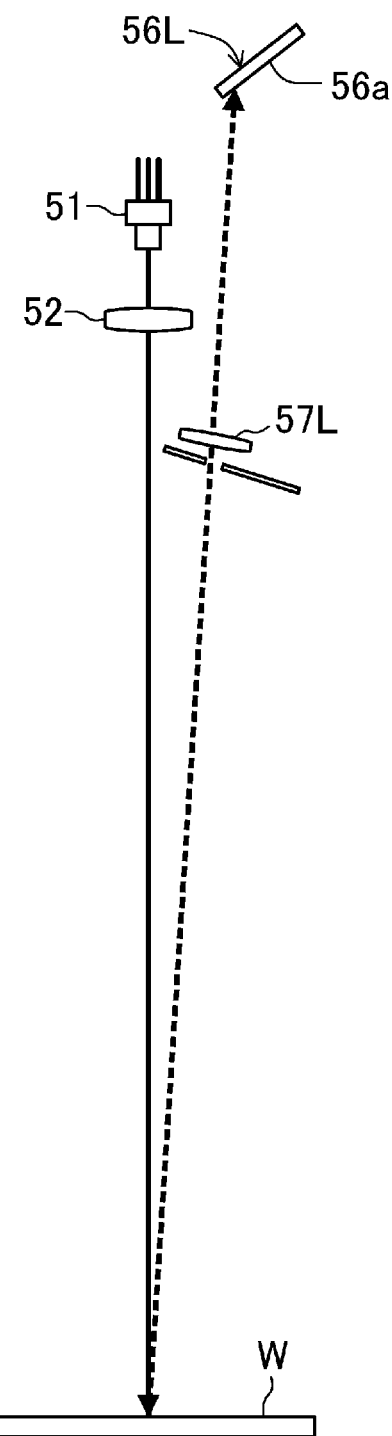

FIG. 25A  CALCULATING AVERAGE VALUE
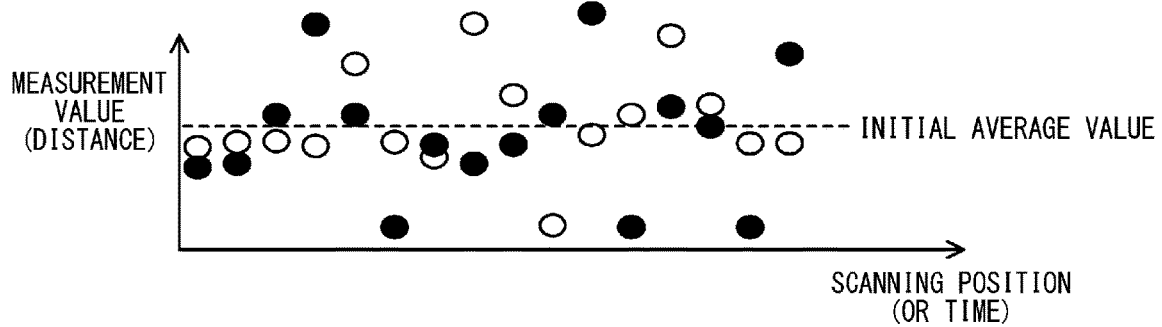
FIG. 25B  EXCLUDING SPECULAR REFLECTION
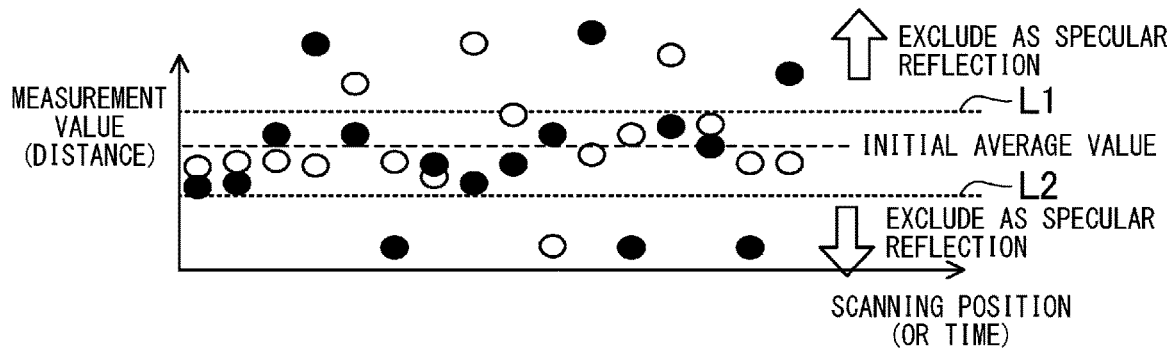
FIG. 25C  CORRECTING AVERAGE VALUE
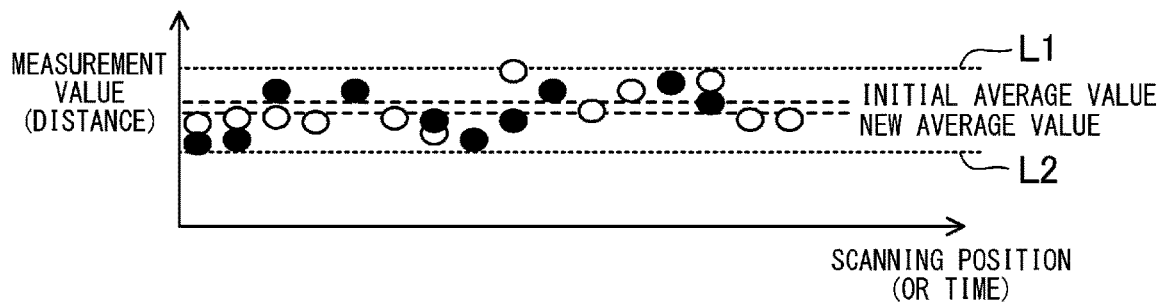

LASER PROCESSING APPARATUS CAPABLE OF MEASURING A DISTANCE TO A WORKPIECE WITH LASER LIGHT

CROSS-REFERENCE TO RELATED APPLICATIONS

The present application claims foreign priority based on Japanese Patent Application No. 2018-246974, filed Dec. 28, 2018, the contents of which is incorporated herein by reference.

BACKGROUND OF THE INVENTION

1. Field of the Invention

The technology disclosed herein relates to a laser processing apparatus such as a laser marking apparatus that performs processing by irradiating a workpiece with laser light.

2. Description of Related Art

Conventionally, a laser processing apparatus capable of measuring a distance to a workpiece has been known.

For example, JP-A-2006-315031 (Patent Literature 1) discloses a laser processing apparatus including an objective condensing lens which condenses laser light (pulse laser light) for processing emitted from a laser light source, a distance measuring sensor which measures a distance between the objective condensing lens and a workpiece (a processing target), and an actuator which adjusts a focal position of the laser light based on a measurement result obtained by the distance measuring sensor.

The distance measuring sensor according to JP-A-2006-315031 (Patent Literature 1) is separated from the objective condensing lens. That is, the distance measuring sensor is arranged at a position deviating from an optical axis of the laser light.

JP-A-2008-215829 (Patent Literature 2) discloses, as another example of the distance measuring sensor according to JP-A-2006-315031 (Patent Literature 1), a laser processing apparatus including a displacement sensor which emits distance measurement light (laser light for measurement) for measuring a distance to a workpiece (a processing target).

The displacement sensor according to JP-A-2008-215829 (Patent Literature 2) is separated from an optical system unit which emits laser light, and is arranged at a position deviating from an optical axis of the laser light, similarly to the distance measuring sensor according to JP-A-2006-315031 (Patent Literature 1).

The laser processing apparatus disclosed in JP-A-2008-215829 (Patent Literature 2) irradiates distance measurement light from the displacement sensor onto the workpiece (processing target) placed on a stage, and appropriately detects reflected light by the displacement sensor to measure the distance to the workpiece.

SUMMARY OF THE INVENTION

However, since the distance measuring sensor according to JP-A-2006-315031 (Patent Literature 1) is arranged at a position deviating from the optical axis of the laser light for processing as described above, a distance to a fixed point away from an irradiation destination of the laser light is measured. When the laser processing apparatus disclosed in JP-A-2006-315031 (Patent Literature 1) is used, a measurement position on the workpiece cannot be changed without moving the workpiece relative to the laser processing apparatus.

The same applies to a case where the displacement sensor according to JP-A-2008-215829 (Patent Literature 2) is used.

Therefore, in the laser processing apparatus as disclosed in JP-A-2008-215829 (Patent Literature 2), it is conceivable to make the distance measurement light emitted from the displacement sensor coaxial with the optical axis of the laser light for processing. In this case, by operating a galvano scanner and the like for scanning the laser light for processing, it is possible to scan the distance measurement light and smoothly change the measurement position.

However, when such a configuration is used, a distance from a merging portion of the distance measurement light and the laser light to the workpiece tends to increase. Therefore, the distance measurement light reflected on the surface of the workpiece may not form an appropriate spot on a light receiving element in the displacement sensor, which may reduce measurement accuracy.

The technology disclosed herein has been made in view of the above, and an object thereof is to measure the distance to the workpiece with a high accuracy.

Specifically, a first aspect of the present invention relates to a laser processing apparatus including an excitation light generating section which generates excitation light, a laser light output section which generates laser light based on the excitation light generated by the excitation light generating section and emits the laser light, a laser light scanning section which irradiates a workpiece with the laser light emitted from the laser light output section and scans the laser light emitted from the laser light output section on a surface of the workpiece, and a housing in which at least the laser light output section and the laser light scanning section are provided.

According to the first aspect of the invention, the laser processing apparatus includes a distance measurement light emitting section which is provided in the housing and emits distance measurement light for measuring a distance from the laser processing apparatus to the surface of the workpiece, a pair of light receiving elements which receives the distance measurement light emitted from the distance measurement light emitting section and reflected by the workpiece, optical axes of the pair of light receiving elements being arranged inside the housing so as to sandwich an optical axis of the distance measurement light emitting section, a distance measuring section which measures a distance from the laser processing apparatus to the surface of the workpiece by a triangulation method based on a light receiving position of the distance measurement light in the pair of light receiving elements, a merging mechanism which is provided in the middle of an optical path from the laser light output section to the laser light scanning section in the housing, guides the distance measurement light emitted from the distance measurement light emitting section to the workpiece via the laser light scanning section by merging the distance measurement light into the optical path, and guides the distance measurement light reflected by the workpiece and returning to the laser light scanning section to the pair of light receiving elements, and a light receiving lens which is arranged inside the housing such that each of the optical axes of the pair of light receiving elements passes through the light receiving lens, and is arranged in the middle of an optical path connecting the merging mechanism and the pair of light receiving elements, and condenses the distance measurement light that has been reflected by the workpiece and has passed through the merging mechanism on respective light receiving surfaces of the pair of light receiving elements.

According to the configuration, the distance measurement light emitting section emits distance measurement light when the distance from the laser processing apparatus to the surface of the workpiece is measured. The distance measurement light emitted from the distance measurement light emitting section passes through the merging mechanism and the laser light scanning section in this order and is irradiated onto the workpiece. The distance measurement light irradiated onto the workpiece returns, after being reflected by the workpiece, to pass through the laser light scanning section and the merging mechanism, and reaches the light receiving lens. The distance measurement light that has passed through the light receiving lens reaches the respective light receiving surfaces of the pair of light receiving elements. The distance measuring section measures the distance to the surface of the workpiece based on the light receiving positions of the distance measurement light on the light receiving surfaces.

Here, the merging mechanism is provided between the laser light output section and the laser light scanning section, and makes the distance measurement light emitted from the distance measurement light emitting section and the laser light emitted from the laser light output section coaxial. Therefore, the distance measurement light is made coaxial in an optical path on an upstream side of the laser light scanning section, and thus the distance measurement light can be scanned by operating the laser light scanning section.

Further, the light receiving lens is provided between the merging mechanism and the pair of light receiving elements, and can condense the distance measurement light that has passed through the merging mechanism. In this way, the distance measurement light can form an appropriate spot on the light receiving surface, and further the distance to the workpiece can be measured with a high accuracy.

In addition, by using a pair of members as the light receiving elements, even when the distance measurement light fails to be well received by one of the light receiving elements due to vignetting caused by a shape of the workpiece, for example, it is still possible to measure the distance based on the distance measurement light received by the other light receiving element.

According to a second aspect of the invention, an optical path length from the merging mechanism to the pair of light receiving elements may be made longer than an optical path length from the merging mechanism to the distance measurement light emitting section.

According to the configuration, each light receiving element is arranged away from the merging mechanism farther than the distance measurement light emitting section. As a result, the distance between the light receiving lens and each light receiving element is increased by a portion that each light receiving element is made farther away, and consequently a measurement resolution can be increased.

According to a third aspect of the invention, the pair of light receiving elements may be arranged in a direction orthogonal to the optical axis of the distance measurement light emitting section.

According to a fourth aspect of the invention, the distance measurement light emitting section may include a light projecting lens which is provided between the pair of light receiving elements and the light receiving lens and is arranged such that the optical axis of the distance measurement light emitting section passes through the light projecting lens.

According to the configuration, the light receiving lens condenses the distance measurement light emitted from the distance measurement light emitting section. As a result, the distance measurement light and the laser light can well be made coaxial.

According to a fifth aspect of the invention, a support base extending along the optical axis of the distance measurement light emitting section may be provided in the housing, the distance measurement light emitting section may include a distance measurement light source which emits distance measurement light to be condensed by the light projecting lens, and the distance measurement light source and the light projecting lens may be both fixed via the support base.

According to the configuration, the distance measurement light source and the light projecting lens form an integral light projecting module, which is advantageous in maintaining a relative positional relation between the distance measurement light source and the light projecting lens.

According to a sixth aspect of the invention, the pair of light receiving elements and the light receiving lens may be both fixed on the support base.

According to the configuration, the pair of light receiving elements and the light receiving lens are fixed via the support base. As a result, each light receiving element and the light receiving lens form an integral light receiving module, which is advantageous in maintaining a relative positional relation between each light receiving element and the light receiving lens.

Further, according to the configuration, since the light projecting module and the light receiving module are integrated via the support base, it is easy to attach a component related to the distance measurement light and it is advantageous in bringing an optical path on the emitting side and an optical path on the light receiving side close to each other.

According to a seventh aspect of the invention, the light receiving lens may include a pair of light receiving lenses, where an optical axis of one of the pair of light receiving lenses passes through one of the pair of light receiving elements, and an optical axis of the other of the pair of light receiving lenses passes through the other of the pair of light receiving elements.

According to an eighth aspect of the invention, a main surface of the light receiving lens and the respective light receiving surfaces of the pair of light receiving elements may be arranged so as not to follow Scheimpflug principle.

According to a ninth aspect of the invention, a diaphragm for adjusting light amount incident on the light receiving surfaces may be provided between the light receiving lens and the respective light receiving surfaces of the pair of light receiving elements, or between the merging mechanism and the light receiving lens, or between the light receiving lens and the respective light receiving surfaces of the pair of light receiving elements and between the merging mechanism and the light receiving lens.

In general, a main surface of a light receiving lens and a light receiving surface of a light receiving element are arranged inclined with respect to each other for the sake of layout in cases. In this case, although focal points can be connected on the light receiving surface by arranging following the so-called Scheimpflug principle, each layout is limited.

In contrast, according to the configuration, by arranging so as not to follow the Scheimpflug principle, it is possible to freely layout the light receiving lens and each light receiving element, and it is also possible to measure a distance with a high accuracy by providing a diaphragm.

According to a tenth aspect of the invention, the housing may include a bottom plate positioned at least below the laser light scanning section, the merging mechanism, the pair of light receiving elements, and the light receiving lens, and the laser light scanning section, the merging mechanism, the light receiving lens, and the pair of light receiving elements may be arranged at substantially the same height when viewed from the bottom plate.

According to the configuration, by making the height positions of the respective components substantially the same, it is possible to limit the number of turns of an optical path connecting the components. As a result, the number of components such as reflection mirrors for turning the optical path can be decreased, and manufacturing cost can be reduced.

According to an eleventh aspect of the invention, the laser light scanning section may include a first scanner that scans the laser light emitted from the laser light output section in a first direction, and a second scanner that scans the laser light scanned by the first scanner in a second direction substantially orthogonal to the first direction, the pair of light receiving elements may receive distance measurement light reflected by the workpiece and reflected by the first scanner and the second scanner, the pair of light receiving elements may be arranged such that their relative positional relations with the first scanner and the second scanner are different from each other, and the distance measuring section may measure, when distance measurement light has been received by at least one of the pair of light receiving elements, the distance from the laser processing apparatus to the surface of the workpiece based on a light receiving position of the distance measurement light.

According to the configuration, the distance measurement light reflected by the workpiece is reflected by the first scanner and the second scanner to enter each light receiving element. Here, depending on a measurement position on the workpiece, the distance measurement light reflected by the first scanner and the second scanner may not reach each light receiving element, or may not enter the first scanner or the second scanner in the first place. When the distance measurement light does not reach the light receiving element, the distance to the workpiece cannot be measured.

However, as described above, the pair of light receiving elements is arranged such that their relative positional relations with the first scanner and the second scanner are different from each other. Therefore, for example, even when the distance measurement light reflected by the second scanner fails to enter one of the light receiving elements, it is still possible to enter the other of the light receiving elements. By configuring to measure a distance using the distance measurement light incident on any one of the light receiving elements, it is possible to widen an area where the distance can be measured on the workpiece.

According to a twelfth aspect of the invention, the distance measurement light emitting section may emit distance measurement light a plurality of times with respect to a peripheral portion of a measurement position on the workpiece, the distance measuring section may measure a distance from the laser processing apparatus to the peripheral portion a plurality of times based on each reflected light of the distance measurement light that has been emitted a plurality of times, and the distance measuring section may estimate a distance from the laser processing apparatus to the measurement position based on the distances from the laser processing apparatus to the peripheral portion that have been measured a plurality of times.

According to a thirteenth aspect of the invention, the distance measuring section may estimate the distance from the laser processing apparatus to the measurement position by extracting at least a part of the distances from the laser processing apparatus to the peripheral portion that have been measured a plurality of times, and may determine a probability of a measurement value based on a ratio of the extracted distances.

According to a fourteenth aspect of the invention, the distance measuring section may remeasure the distance from the laser processing apparatus to the measurement position when the probability is equal to or less than a predetermined value.

As described above, according to the laser processing apparatus, the distance to the workpiece can be measured with a high accuracy.

BRIEF DESCRIPTION OF THE DRAWINGS

FIG. 18 is a diagram explaining a triangulation method.

FIGS. 25A-C are diagrams illustrating averaging processing by a peripheral scanning;

DESCRIPTION OF EMBODIMENTS

Embodiments of the invention will be described below with reference to the drawings. The following description is merely illustrative.

That is, in the present specification, a laser marker as an example of a laser processing apparatus will be described. However, the technology disclosed herein can also be applied to general laser application devices regardless of names of the laser processing apparatus and the laser marker.

In the specification, printing processing will be described as a representative example of processing. However, it is not limited to printing processing, and can be used in any processing that uses laser light, such as image marking.

<Overall Configuration>

Figure 1:
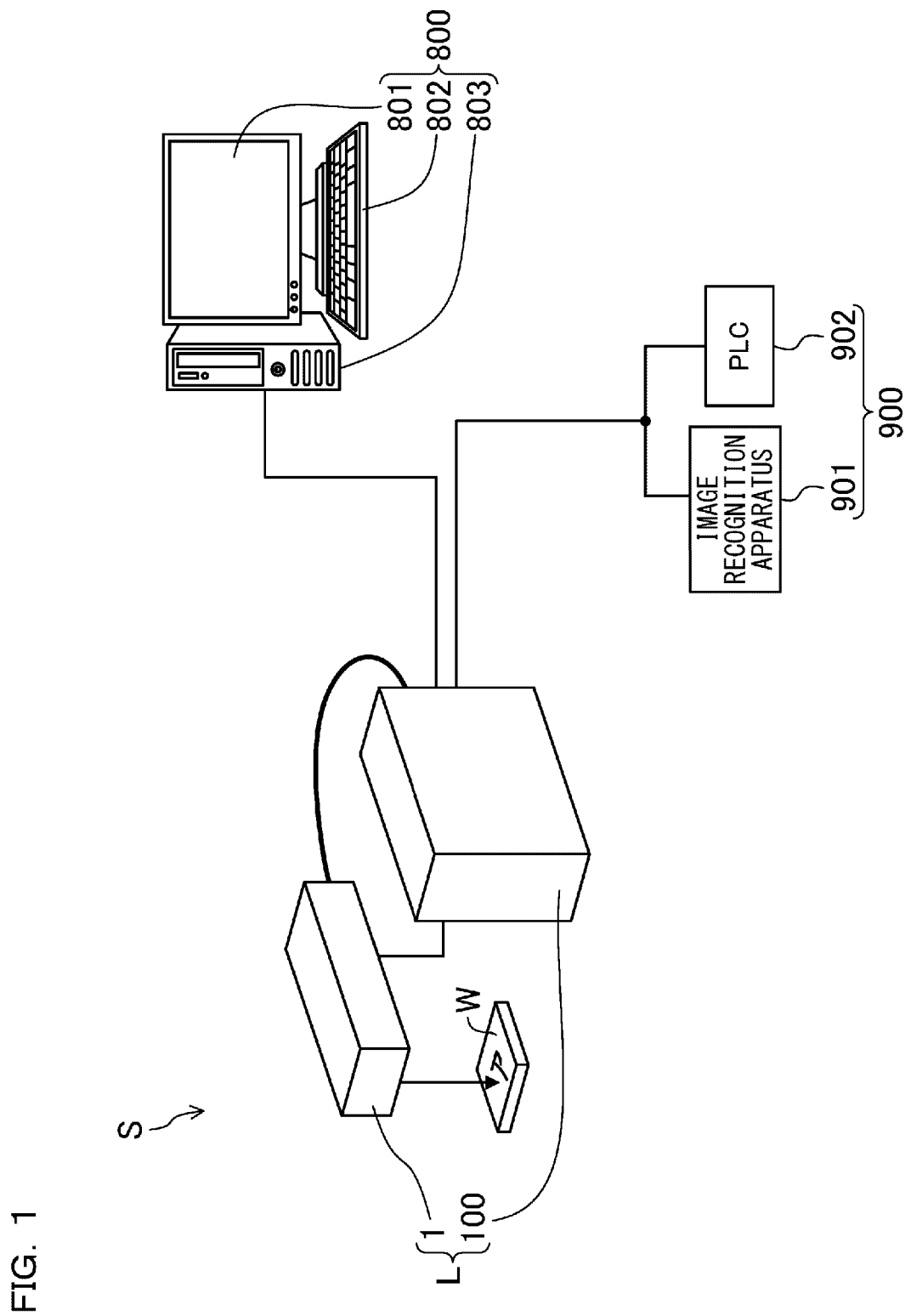
FIG. 1 is a diagram illustrating an overall configuration of a laser processing system.
Figure 2:
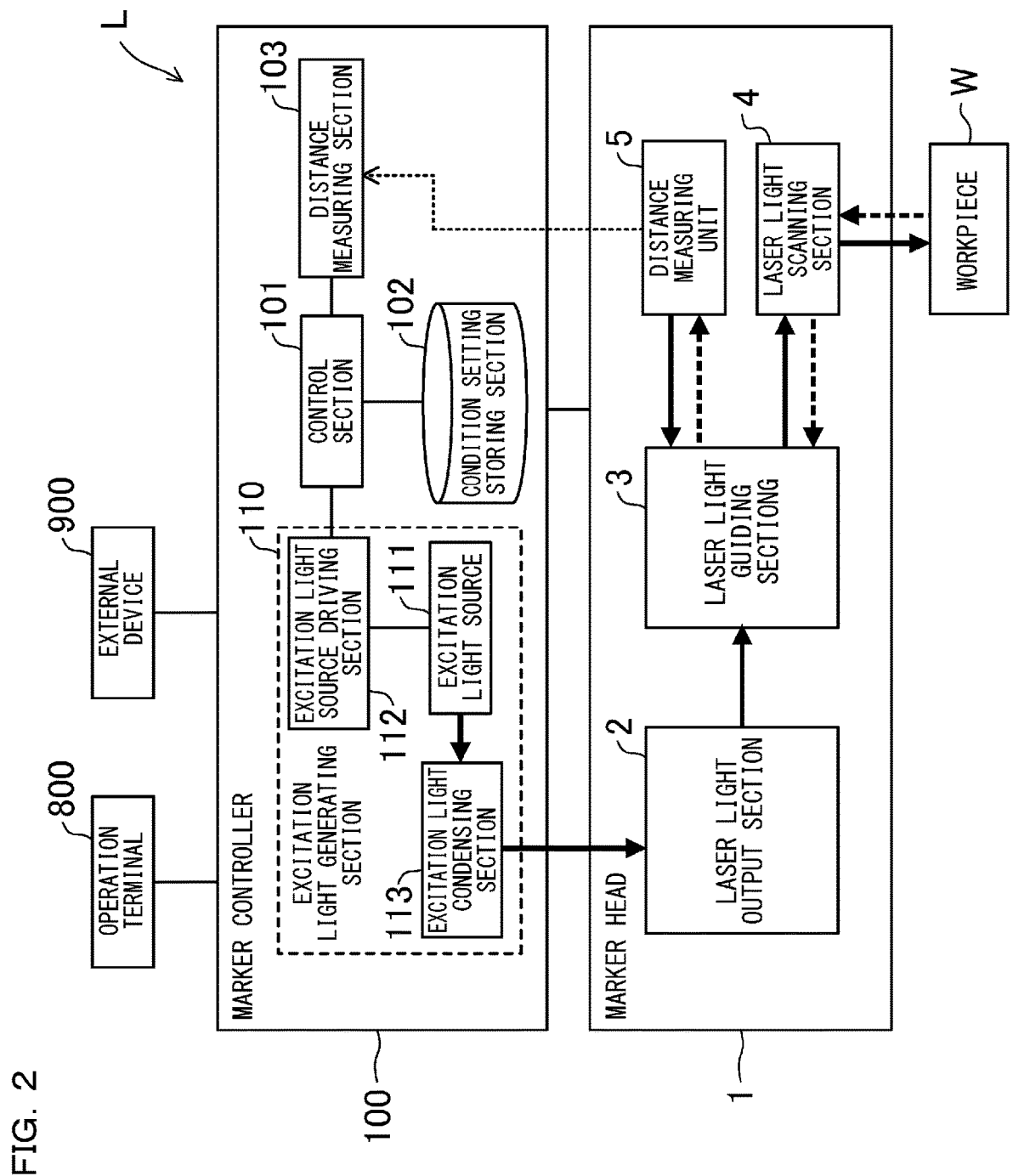
FIG. 2 is a block diagram illustrating a schematic configuration of a laser processing apparatus.

FIG. 1 is a diagram illustrating an overall configuration of a laser processing system S, and FIG. 2 is a diagram illustrating a schematic configuration of a laser processing apparatus L in the laser processing system S. The laser processing system S illustrated in FIG. 1 includes the laser processing apparatus L, and an operation terminal 800 and an external device 900 connected to the laser processing apparatus L.

The laser processing apparatus L illustrated in FIG. 1 and FIG. 2 irradiates a workpiece W as a processing target with laser light emitted from a marker head 1, and performs processing by performing a three-dimensional scanning on the surface of the workpiece W. Here, the "three-dimensional scanning" refers to a concept that generically refers to a combination of a two-dimensional operation (i.e., "two-dimensional scanning") of scanning an irradiation destination of laser light on the surface of the workpiece W, and a one-dimensional operation of adjusting a focal position of the laser light.

In particular, the laser processing apparatus L according to the present embodiment can emit laser light having a wavelength near 1064 nm as laser light for processing the workpiece W. The wavelength corresponds to a near-infrared (NIR) wavelength region. Therefore, in the following description, the laser light for processing the workpiece W may be referred to as "near-infrared laser light" to be distinguished from other laser light. Of course, laser light having other wavelengths may also be used for processing the workpiece W.

The laser processing apparatus L according to the embodiment can measure a distance to the workpiece W via a distance measuring unit 5 incorporated in the marker head 1 and can adjust a focal position using a measurement result thereof.

As shown in FIG. 1 and FIG. 2, the laser processing apparatus L includes the marker head 1 for emitting laser light and a marker controller 100 for controlling the marker head 1.

The marker head 1 and the marker controller 100 are separated from each other in the embodiment, and are electrically connected via an electrical wiring and optically coupled via an optical fiber cable.

More generally, one of the marker head 1 and the marker controller 100 can be incorporated into the other to be integrated together. In this case, an optical fiber cable or the like can be omitted as appropriate.

The operation terminal 800 includes, for example, a central processing unit (CPU) and a memory, and is connected to the marker controller 100. The operation terminal 800 sets various processing conditions such as printing setting, and also functions as a terminal for showing information related to laser processing to a user. The operation terminal 800 includes a display section 801 for displaying information to the user, an operating section 802 which receives an operation input from the user, and a storing device 803 for storing various kinds of information.

Specifically, the display section 801 is configured by, for example, a liquid crystal display or an organic EL panel. The display section 801 displays an operation status and a processing condition, etc., of the laser processing apparatus L as information related to laser processing. The operating section 802 is configured by, for example, a keyboard and/or a pointing device. Here, the pointing device includes a mouse and/or a joystick, etc. The operating section 802 is configured to receive an operation input from the user, and is used to operate the marker head 1 via the marker controller 100.

The operation terminal 800 configured as described above can set processing conditions in laser processing based on an operation input from the user. The processing conditions include, for example, a content (marking pattern) of a character string, etc., to be printed on the workpiece W, an output required for laser light (target output), and scanning speed of laser light on the workpiece W.

Further, the processing conditions according to the embodiment also include conditions and parameters (also referred to as "distance measurement conditions") related to the aforementioned distance measuring unit 5. Such distance measurement conditions include, for example, data and the like associating a signal indicating a detection result obtained by the distance measuring unit 5 with a distance to the surface of the workpiece W.

The processing conditions set by the operation terminal 800 are output to the marker controller 100 and stored in a condition setting storing section 102 thereof. The storing device 803 in the operation terminal 800 may store the processing conditions as necessary.

The operation terminal 800 can be incorporated into the marker controller 100 to be integrated together, for example. In this case, a name such as a control unit is used instead of the "operation terminal". However, at least in the embodiment, the operation terminal 800 and the marker controller 100 are separated from each other.

The external device 900 is connected to the marker controller 100 of the laser processing apparatus L as necessary. In the example shown in FIG. 1, an image recognition apparatus 901 and a programmable logic controller (PLC) 902 are provided as the external device 900.

Specifically, the image recognition apparatus 901 determines, for example, a type and a position of the workpiece W conveyed on a line. An image sensor, for example, can be used as the image recognition apparatus 901. The PLC 902 is used to control the laser processing system S according to a predetermined sequence.

In addition to the devices and apparatus described above, the laser processing apparatus L can also be connected to an apparatus for performing an operation and a control, a computer for performing various other kinds of processing, a storing apparatus, a peripheral device, etc. The connection in this case may be, for example, a serial connection such as IEEE 1394, RS-232, RS-422 and USB, or a parallel connection. Alternatively, an electrical, magnetic, or optical connection can be adopted through a network such as 10 BASE-T, 100 BASE-TX, and 1000 BASE-T. In addition to a wired connection, the connection may be a wireless LAN such as IEEE 802, or a wireless connection using radio waves such as Bluetooth (registered trademark), infrared rays, optical communication, etc. Moreover, as a storing medium used for a storing apparatus for exchanging data and storing various settings and the like, for example, various kinds of memory cards, magnetic disks, magneto-optical disks, semiconductor memories, and hard disks can be used.

Hereinafter, description will be made in order regarding a description relating to a hardware configuration of each of the marker controller 100 and the marker head 1, and a configuration relating to a control of the marker head 1 by the marker controller 100.

<Marker Controller 100>

As shown in FIG. 2, the marker controller 100 includes a condition setting storing section 102 which stores the aforementioned processing conditions, a control section 101 which controls the marker head 1 based on the processing conditions stored therein, and an excitation light generating section 110 which generates laser excitation light (excitation light).

(Condition Setting Storing Section 102)

The condition setting storing section 102 is configured to store a processing condition set via the operation terminal 800, and to output the stored processing condition to the control section 101 as necessary.

Specifically, the condition setting storing section 102 is configured using a volatile memory, a non-volatile memory, a hard disk drive (HDD), etc., and can temporarily or continuously store information indicating a processing condition. When the operation terminal 800 is incorporated into the marker controller 100, the storing device 803 can be configured to also serve as the condition setting storing section 102.

(Control Section 101)

The control section 101 executes printing processing and the like of the workpiece W by controlling at least the excitation light generating section 110 in the marker controller 100, and the laser light output section 2, the laser light guiding section 3, the laser light scanning section 4 and the distance measuring unit 5 in the marker head 1 based on the processing conditions stored in the condition setting storing section 102.

Specifically, the control section 101 includes a CPU, a memory, and an input/output bus, and generates a control signal based on a signal indicating information input via the operation terminal 800 and a signal indicating a processing condition read from the condition setting storing section 102. By outputting the control signal thus generated to each part of the laser processing apparatus L, the control section 101 controls printing processing on the workpiece W and measurement of a distance to the workpiece W.

For example, when starting processing of the workpiece W, the control section 101 reads a target output stored in the condition setting storing section 102 and outputs a control signal generated based on the target output to an excitation light source driving section 112 to control generation of laser excitation light.

(Excitation Light Generating Section 110)

The excitation light generating section 110 includes an excitation light source 111 which generates laser light corresponding to a drive current, the excitation light source driving section 112 which provides a drive current to the excitation light source 111, and an excitation light condensing section 113 which is optically coupled to the excitation light source 111. The excitation light source 111 and the excitation light condensing section 113 are fixed in an excitation casing which is not shown in the drawings. Although details are omitted, the excitation casing is made with a metal such as copper having excellent thermal conductivity, and can efficiently dissipate heat from the excitation light source 111.

Each part of the excitation light generating section 110 will be described below in order.

The excitation light source driving section 112 provides a drive current to the excitation light source 111 based on a control signal output from the control section 101. Although details are omitted, the excitation light source driving section 112 determines a drive current based on a target output determined by the control section 101, and provides a drive current thus determined to the excitation light source 111.

The excitation light source 111 oscillates laser light corresponding to the drive current while the drive current is provided from the excitation light source driving section 112. For example, the excitation light source 111 includes a laser diode (LD), etc., and an LD array or an LD bar in which a plurality of LD elements are arranged in a straight line can be used. When an LD array or an LD bar is used as the excitation light source 111, the laser light oscillated from each element is output in a line shape and enters the excitation light condensing section 113.

The excitation light condensing section 113 condenses laser light output from the excitation light source 111 and outputs the same as laser excitation light (excitation light). For example, the excitation light condensing section 113 includes a focusing lens, etc., and has an incident surface on which the laser light is incident, and an emission surface from which the laser excitation light is output. The excitation light condensing section 113 is optically coupled to the marker head 1 via the aforementioned optical fiber cable. Therefore, the laser excitation light output from the excitation light condensing section 113 is guided to the marker head 1 via the optical fiber cable.

The excitation light generating section 110 may be an LD unit or an LD module in which the excitation light source driving section 112, the excitation light source 111, and the excitation light condensing section 113 are incorporated in advance. In addition, the excitation light emitted from the excitation light generating section 110 (to be specific, the laser excitation light output from the excitation light condensing section 113) can be non-polarized, and this eliminates the need to consider a change in polarization state, which is advantageous in design. In particular, with regard to a configuration around the excitation light source 111, it is preferable that a mechanism which makes the output light non-polarized is provided in an LD unit itself that outputs light obtained from each of LD arrays in which tens of LD elements are arranged by bundling the light using an optical fiber.

(Other Components)

The marker controller 100 also includes a distance measuring section 103 which measures a distance to the workpiece W via the distance measuring unit 5. The distance measuring section 103 is electrically connected to the distance measuring unit 5, and is capable of receiving a signal related to a measurement result obtained by the distance measuring unit 5 (a signal indicating at least a light receiving position of distance measurement light in a distance measurement light receiving section 5B).

The distance measuring section 103 may be configured by the control section 101. For example, the control section 101 may be made to also serve as the distance measuring section 103.

Specific functions of the distance measuring section 103 will be described later.

<Marker Head 1>

As described above, the laser excitation light generated by the excitation light generating section 110 is guided to the marker head 1 via the optical fiber cable. The marker head 1 includes the laser light output section 2 which amplifies, generates, and outputs laser light based on the laser excitation light, the laser light scanning section 4 which irradiates the surface of the workpiece W with the laser light output from the laser light output section 2 to perform a two-dimensional scanning, the laser light guiding section 3 which forms an optical path from the laser light output section 2 to the laser light scanning section 4, and the distance measuring unit 5 for measuring a distance to the surface of the workpiece W based on distance measurement light projected and received via the laser light scanning section 4.

Here, the laser light guiding section 3 according to the embodiment does not only form an optical path, but also combines a plurality of members such as a Z scanner (focus adjusting section) 33 which adjusts a focal position of the laser light, and a guide light source (guide light emitting section) 35 which emits guide light.

Although details will be described later, the laser light guiding section 3 further includes an upstream side merging mechanism 31 which merges near-infrared laser light output from the laser light output section 2 and guide light emitted from a guide light source 36, and a downstream side merging mechanism 35 which merges laser light guided to the laser light scanning section 4 and the distance measurement light projected from the distance measuring unit 5.

Figure 3A:
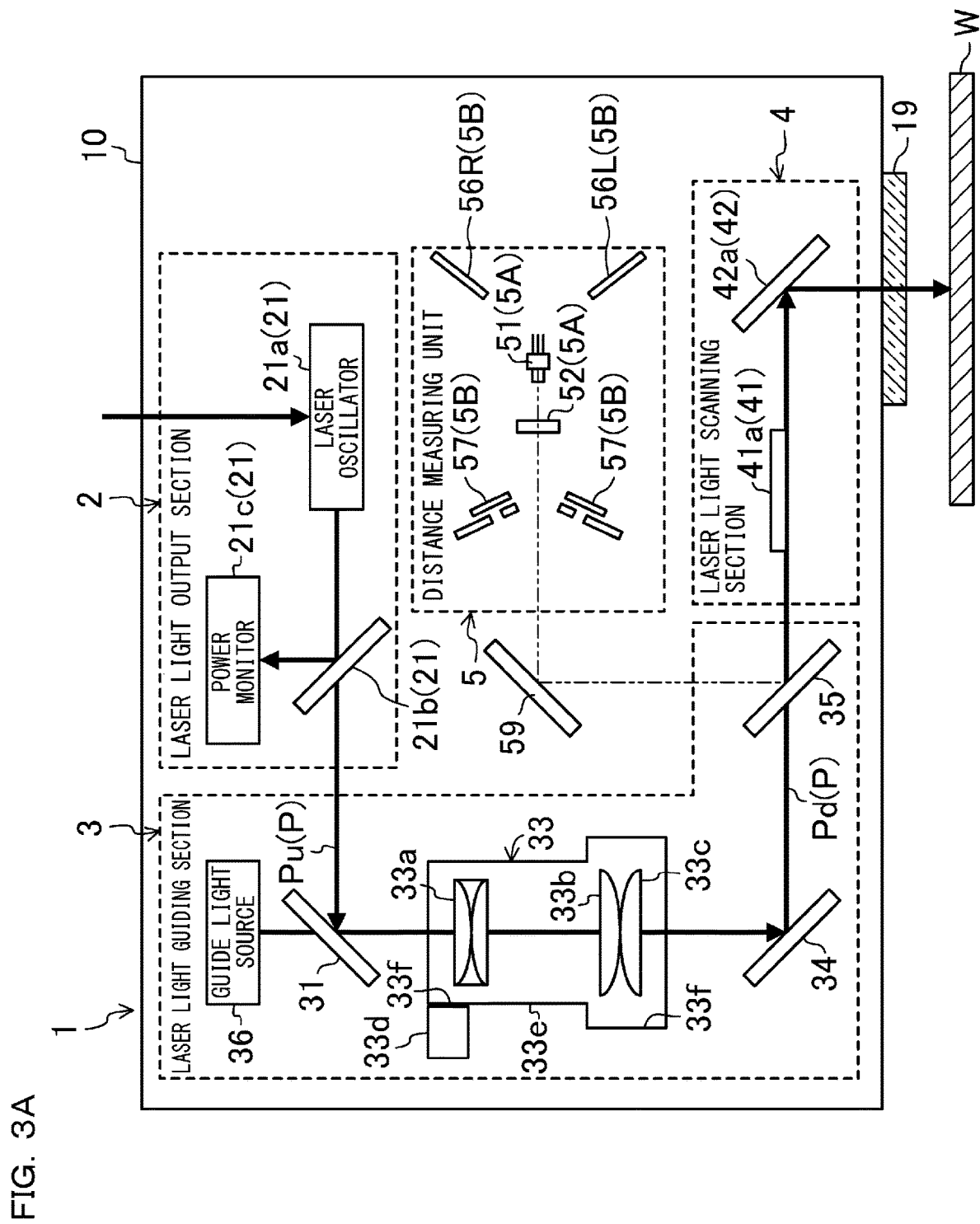
FIG. 3A is a block diagram illustrating a schematic configuration of a marker head.
Figure 3B:
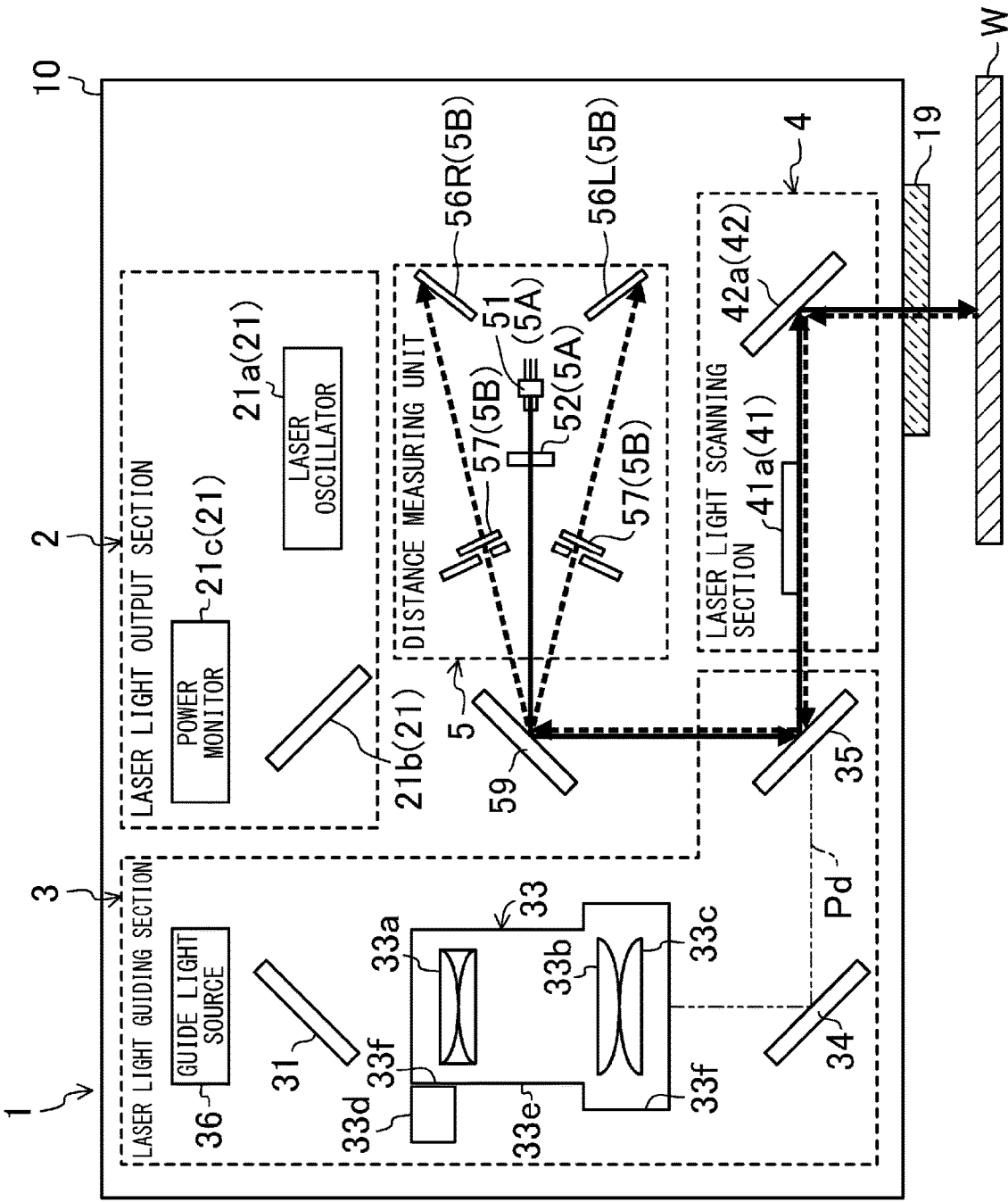
FIG. 3B is a block diagram illustrating a schematic configuration of a marker head.
Figure 4:
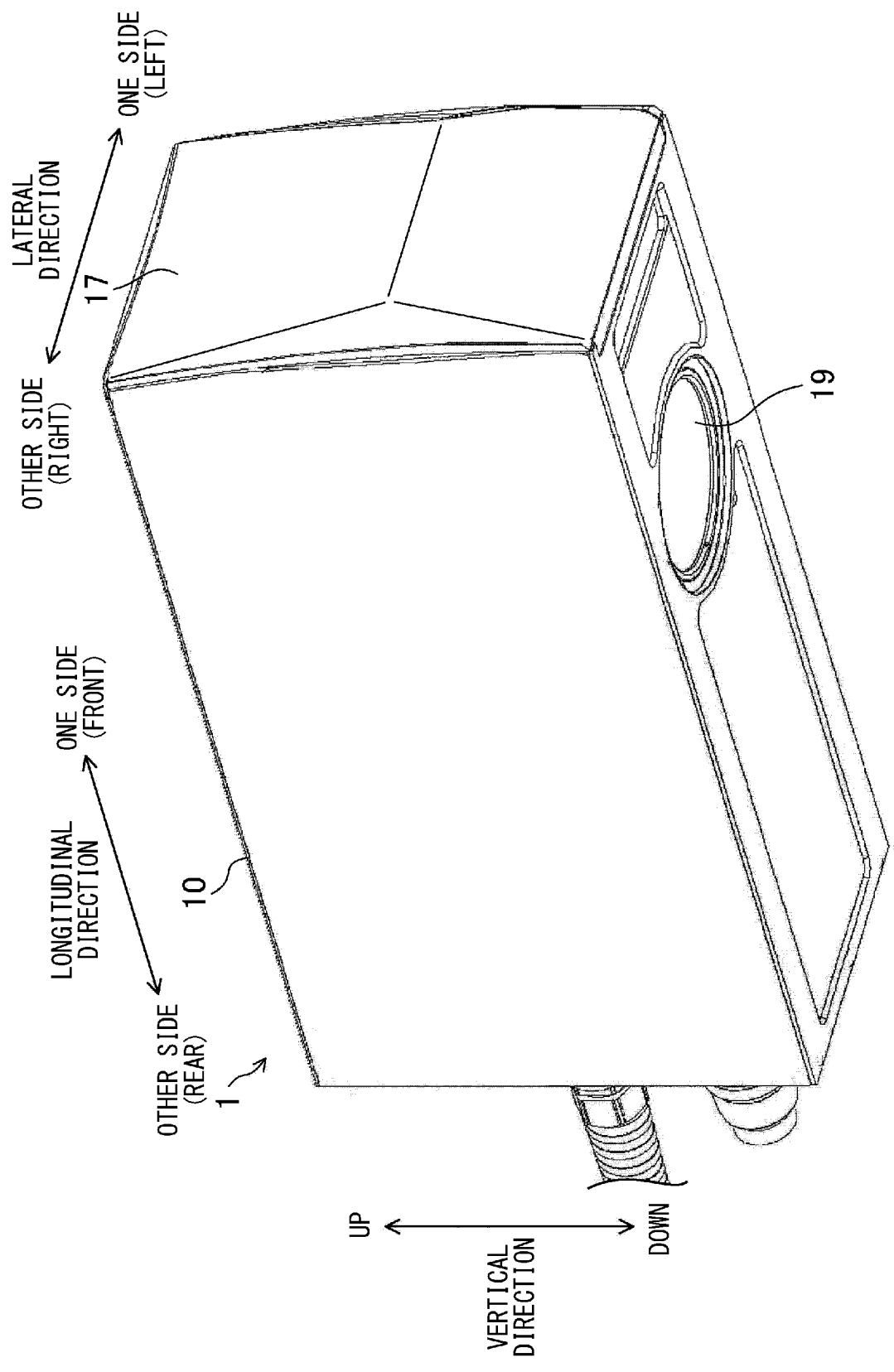
FIG. 4 is a perspective view illustrating an appearance of a marker head.

FIGS. 3A to 3B are block diagrams illustrating schematic configurations of the marker head 1, and FIG. 4 is a perspective view illustrating an appearance of the marker head 1. In FIG. 3A to FIG. 3B, FIG. 3A illustrates a case where the workpiece W is processed using near-infrared laser light, and FIG. 3B illustrates a case where a distance to the surface of the workpiece W is measured using the distance measuring unit 5.

As illustrated in FIG. 3A to FIG. 4, the marker head 1 includes a housing 10 in which at least the laser light output section 2, the laser light guiding section 3, the laser light scanning section 4, and the distance measuring unit 5 are provided. The housing 10 has a substantially rectangular outer shape as shown in FIG. 4. A lower surface of the housing 10 is partitioned by a plate-shaped bottomplate 10a. The bottomplate 10a is provided with an emission window portion 19 for emitting laser light from the marker head 1 to the outside of the marker head 1. The emission window portion 19 is configured by fitting a plate-shaped member capable of transmitting near-infrared laser light, guide light, and distance measurement light into a through hole that penetrates the bottom plate 10a in a thickness direction of the plate.

Figure 5:
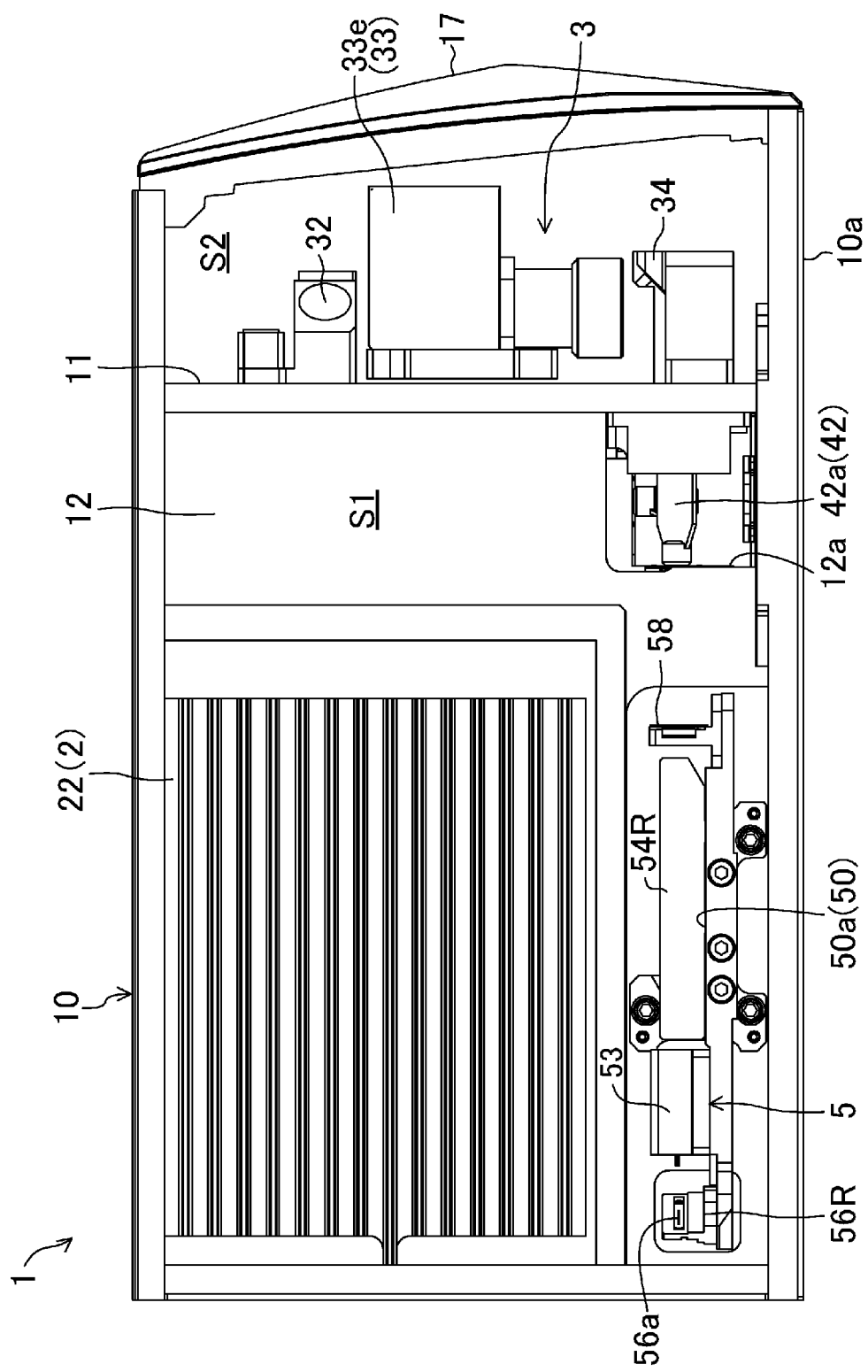
FIG. 5 is a side view illustrating an internal structure of a marker head.
Figure 6:
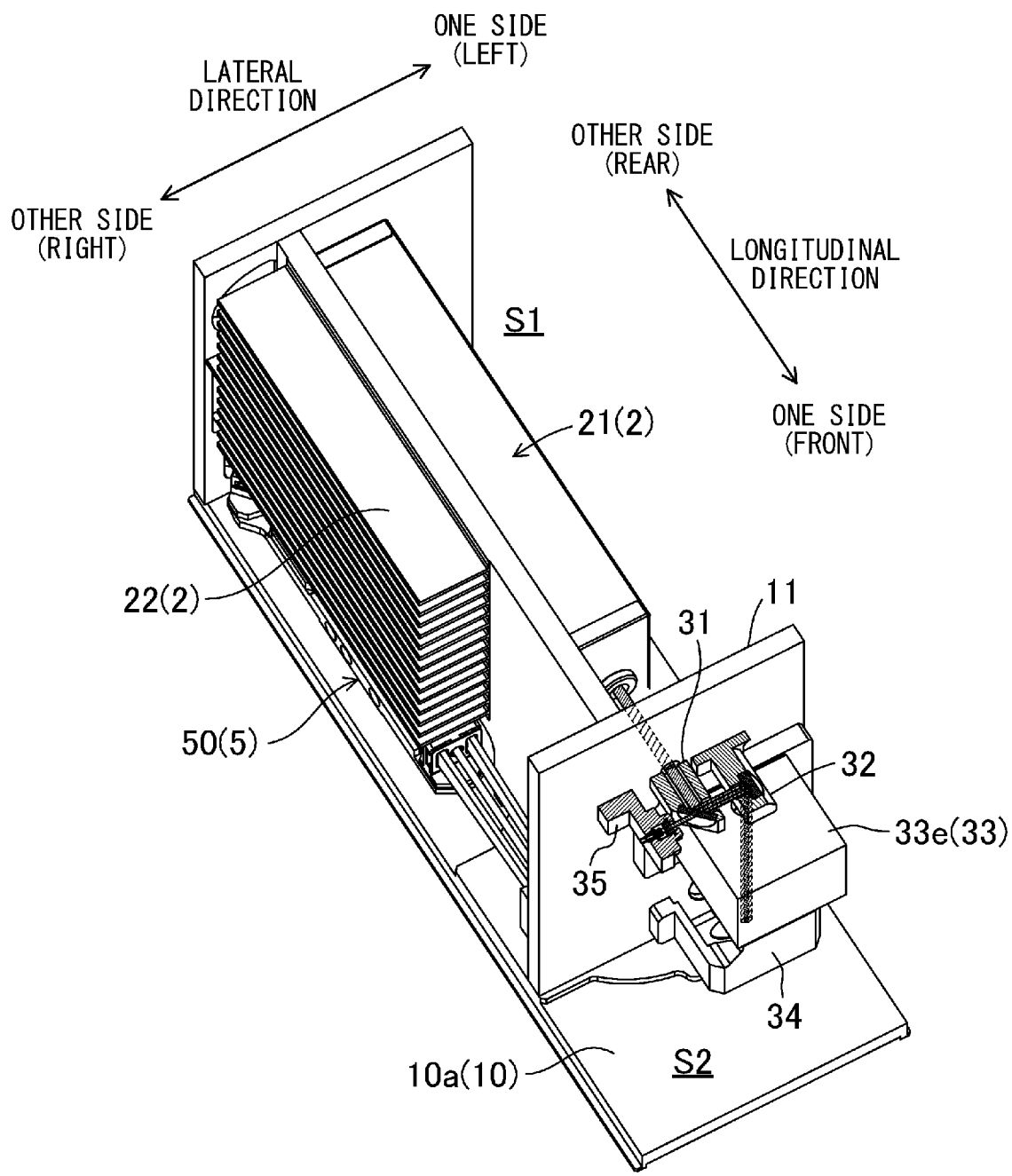
FIG. 6 is a perspective view illustrating an internal structure of a marker head.

FIG. 5 is a side view illustrating an internal structure of the marker head 1, and FIG. 6 is a perspective view illustrating the internal structure of the marker head 1. In the following description, the "longitudinal direction of the housing 10" refers to the left-right direction in FIG. 5, and the right side of FIG. 5 is referred to as "one side in the longitudinal direction" while the left side of FIG. 5 is referred to as "the other side in the longitudinal direction". Similarly, the "lateral direction of the housing 10" refers to a direction perpendicular to the paper surface of FIG. 5, and the rear side of the paper surface of FIG. 5 is referred to as "one side in the lateral direction" while the front side of the paper surface of FIG. 5 is referred to as "the other side in the lateral direction".

In other drawings, a direction corresponding to the longitudinal direction in FIG. 5 may be referred to as the "longitudinal direction of the housing 10" in cases. Similarly, a direction corresponding to the lateral direction in FIG. 5 may be referred to as the "lateral direction of the housing 10" in cases. In the following description, there are cases where the longitudinal direction of the housing 10 is simply referred to as "front-rear direction, and the lateral direction of the housing 10 is simply referred to as "left-right direction".

Further, the "vertical direction" in the following description is equal to the vertical direction on the paper surface in FIG. 5. In other drawings, a direction corresponding to this may be referred to as the "vertical direction" in cases.

As illustrated in FIG. 5 to FIG. 6, a partition portion 11 is provided inside the housing 10. The internal space of the housing 10 is partitioned by the partition portion 11 into one side and the other side in the longitudinal direction.

Specifically, the partition portion 11 is formed in a flat plate shape extending in a direction perpendicular to the longitudinal direction of the housing 10. Further, the partition portion 11 is arranged closer to one side in the longitudinal direction (front side in FIG. 4 to FIG. 6) in the longitudinal direction of the housing 10 than a central portion of the housing 10 in the same direction.

As a result, a space partitioned on one side in the longitudinal direction in the housing 10 has a shorter dimension in the longitudinal direction than a space partitioned on the other side in the longitudinal direction (rear side in FIG. 4 to FIG. 6). Hereinafter, the space partitioned on the other side in the longitudinal direction in the housing 10 is referred to as a first space S1, while the space partitioned on one side in the longitudinal direction is referred to as a second space S2.

In the embodiment, the laser light output section 2, apart of components in the laser light guiding section 3, the laser light scanning section 4, and the distance measuring unit 5 are arranged in the first space S1. Main components in the laser light guiding section 3 are arranged in the second space S2.

To be specific, the first space S1 is partitioned by a substantially flat base plate 12 into a space on one side in the lateral direction (left side in FIG. 6) and a space on the other side in the lateral direction (right side in FIG. 6). Components included in the laser light output section 2 are mainly arranged in the former space.

To be more specific, among the components included in the laser light output section 2, an optical component 21 which is required to be sealed as airtightly as possible, such as an optical lens and an optical crystal, is arranged in an accommodating space surrounded by the base plate 12 and the like in the space on one side in the lateral direction in the first space S1.

On the other hand, among the components included in the laser light output section 2, a component which is not necessarily required to be sealed, such as an electrical wiring and a heat sink 22, is arranged, for example, as shown in FIG. 6, on an opposite side (the other side in the lateral direction in the first space S1) to the optical component 21 with the base plate 12 sandwiched.

Figure 8:
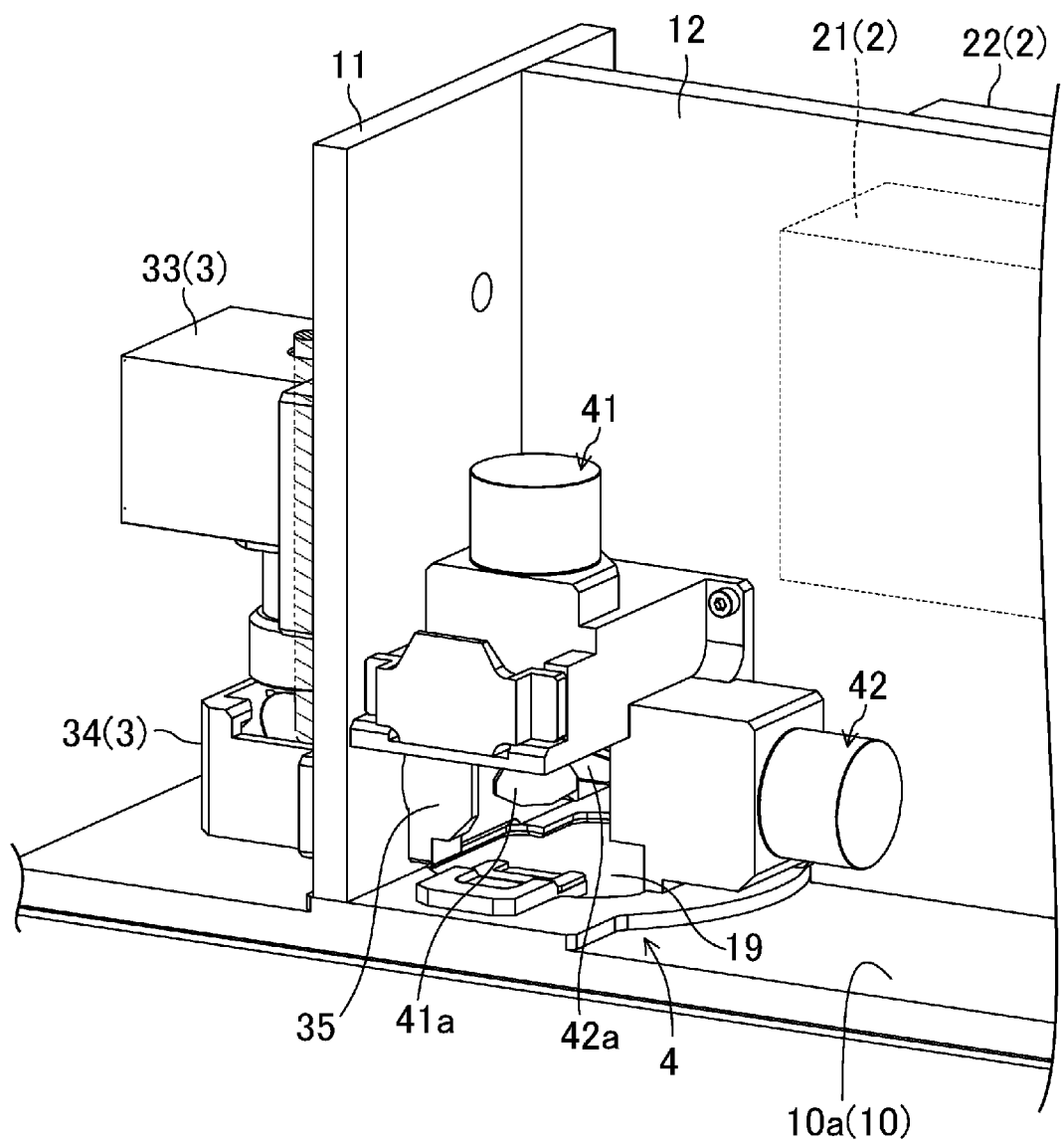
FIG. 8 is a perspective view illustrating a configuration of a laser light scanning section.
Figure 12:
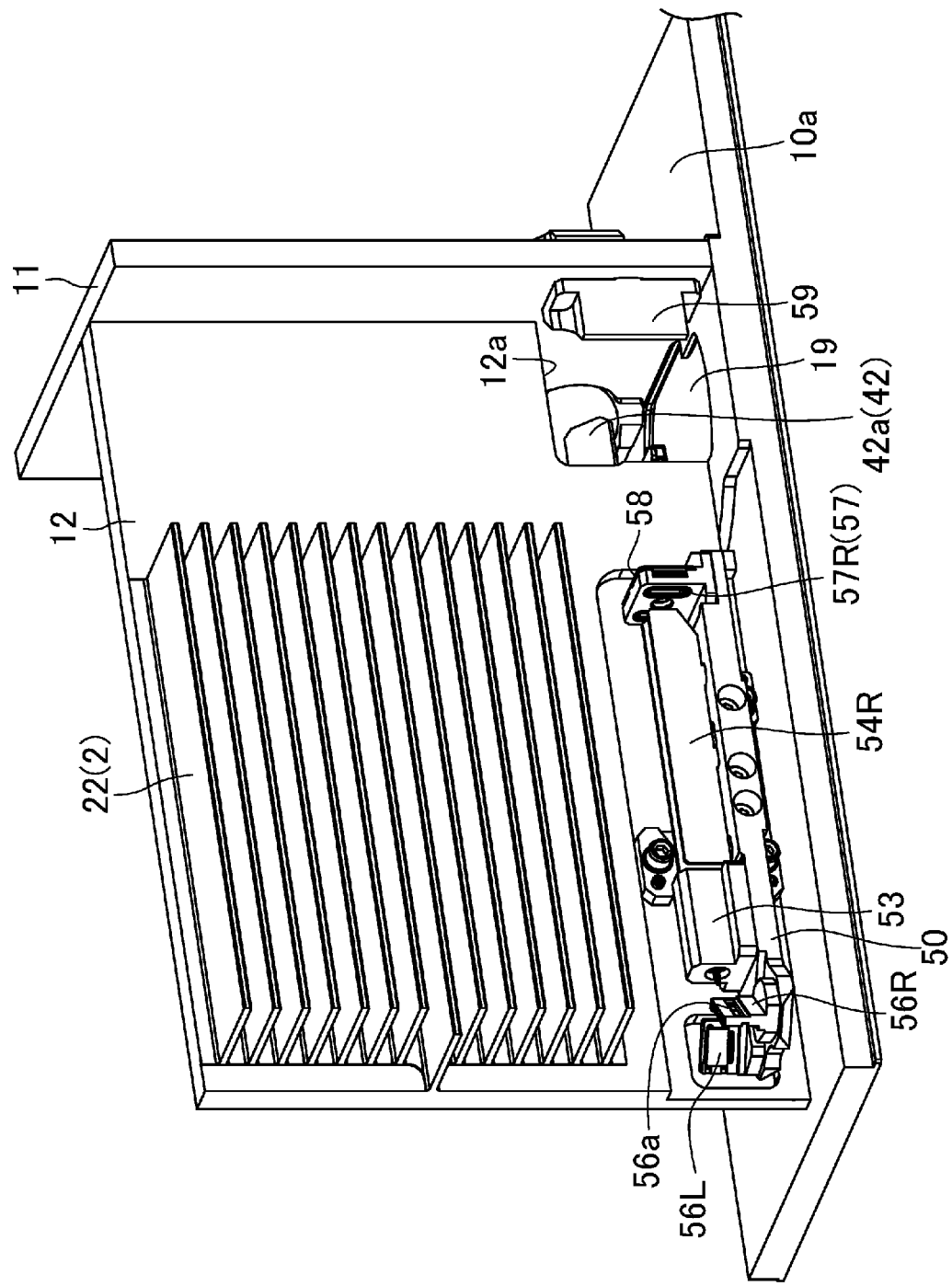
FIG. 12 is a perspective view illustrating a layout of the distance measuring unit.

Further, as illustrated in FIG. 8 and FIG. 12 which will be described later, the laser light scanning section 4 can be arranged on one side in the lateral direction with the base plate 12 sandwiched, in the same manner as the optical component 21 in the laser light output section 2 (see also FIG. 10 and the like). Specifically, the laser light scanning section 4 according to the embodiment is arranged along an inner bottom surface of the housing 10 in the vertical direction while adjoining the aforementioned partition portion 11 in the longitudinal direction.

Figure 9:
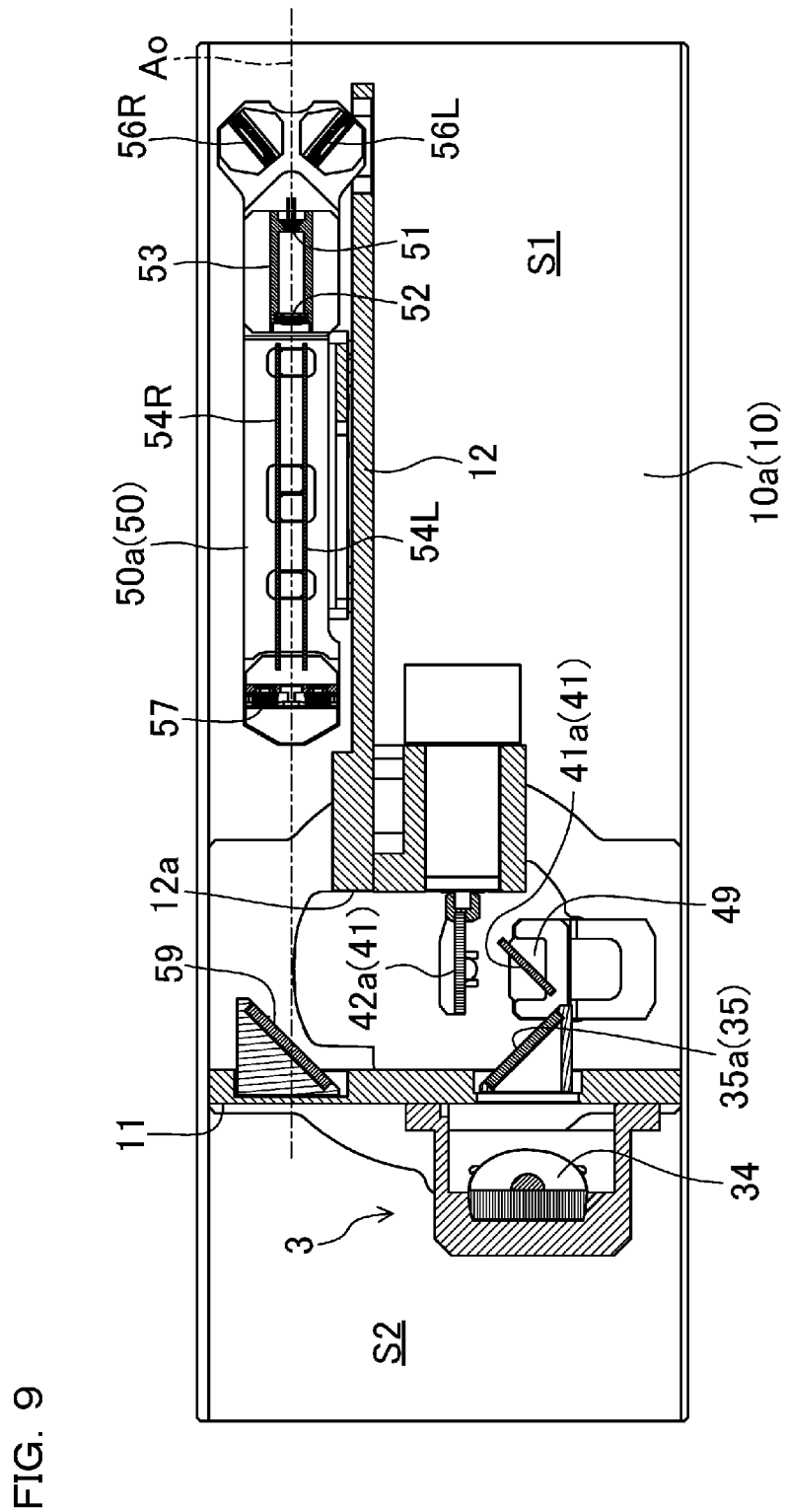
FIG. 9 is a sectional view illustrating a configuration of a laser light guiding section, a laser light scanning section, and a distance measuring unit.

In addition, as shown in FIG. 6 and FIG. 9 for example, the distance measuring unit 5 is arranged in a space on the other side in the lateral direction in the first space S1 in the same manner as the heat sink 22 in the laser light output section 2. Specifically, the distance measuring unit 5 according to the embodiment is arranged, as shown in FIG. 12 for example, below the heat sink 22, and is fastened to the base plate 12 from a side instead of to the aforementioned bottom plate 10a.

In addition, the components included in the laser light guiding section 3 are mainly arranged in the second space S2. In the embodiment, most of the components included in the laser light guiding section 3 are accommodated in a space surrounded by the partition portion 11 and a cover member 17 which partitions a front surface of the housing 10.

Among the components included in the laser light guiding section 3, the downstream side merging mechanism 35 is arranged in a part near the partition portion 11 in the first space S1. That is, in the embodiment, the downstream side merging mechanism 35 is positioned near a boundary between the first space S1 and the second space S2.

As described above, the downstream side merging mechanism 35 is configured to merge the laser light guided from the laser light guiding section 3 to the laser light scanning section 4 and the distance measurement light projected from the distance measuring unit 5. However, while the laser light scanning section 4 is arranged in the space on one side in the lateral direction, the distance measuring unit 5 is arranged in the space on the other side in the lateral direction with the base plate 12 sandwiched. Therefore, as shown in FIG. 5, a through hole 12a which penetrates the base plate 12 in the thickness direction of plate is formed in the base plate 12 (see also FIG. 12). Through the through hole 12a, the laser light guiding section 3, the laser light scanning section 4, and the distance measuring unit 5 are optically coupled.

Further, the aforementioned optical fiber cable is connected to a rear surface of the housing 10. The optical fiber cable is connected to the laser light output section 2 arranged in the first space S1.

Hereinafter, configurations of the laser light output section 2, the laser light guiding section 3, the laser light scanning section 4, and the distance measuring unit 5 will be described in order.

(Laser Light Output Section 2)

The laser light output section 2 is configured to generate near-infrared laser light for printing processing based on the laser excitation light generated by the excitation light generating section 110 and output the near-infrared laser light to the laser light guiding section 3.

Specifically, the laser light output section 2 includes a laser oscillator 21a which generates laser light having a predetermined wavelength based on the laser excitation light, amplifies the laser light, and emits near-infrared laser light, a beam sampler 21b for separating a part of the near-infrared laser light oscillated by the laser oscillator 21a, and a power monitor 21c on which the near-infrared laser light separated by the beam sampler 21b is incident.

Although details are omitted, the laser oscillator 21a according to the embodiment includes a laser medium which performs stimulated emission corresponding to laser excitation light to emit laser light, a Q switch for pulse oscillation of laser light emitted from the laser medium, and a mirror which resonates the laser light to which pulse oscillation has been performed by the Q switch.

Particularly in the embodiment, a rod-shaped Nd:YVO$_4$ (yttrium vanadate) is used as the laser medium. As a result, the laser oscillator 21a can emit laser light (the aforementioned near-infrared laser light) having a wavelength near 1064 nm. However, the invention is not limited to this example, and, for example, YAG, YLF, GdVO$_4$ and the like in which a rare earth element is doped can also be used as other laser media. Various kinds of solid laser media can be used according to the use of the laser processing apparatus L.

In addition, a wavelength conversion element can be combined with a solid laser medium to convert the wavelength of the output laser light into any wavelength. Further, a so-called fiber laser using a fiber as an oscillator instead of a bulk as a solid laser medium may be used.

Moreover, the laser oscillator 21a may be configured by combining a solid laser medium such as Nd:YVO$_4$ with a fiber. In that case, it is possible to emit a laser with a short pulse width to suppress thermal damage to the workpiece W as in the case of using a solid laser medium, and it is also possible to achieve a higher output and faster printing processing as in the case of using a fiber.

The power monitor 21c detects an output of near-infrared laser light. The power monitor 21c is electrically connected to the marker controller 100, and can output a detection signal thereof to the control section 101, etc.

(Laser Light Guiding Section 3)

The laser light guiding section 3 forms an optical path P which guides near-infrared light emitted from the laser light output section 2 to the laser light scanning section 4. The laser light guiding section 3 includes, in addition to a first bend mirror 32 and a second bend mirror 34 for forming the optical path P, the Z scanner (focus adjusting section) 33 and the guide light source (guide light emitting section) 36, etc. All of these components are provided inside the housing 10 (mainly in the second space S2).

Figure 7:
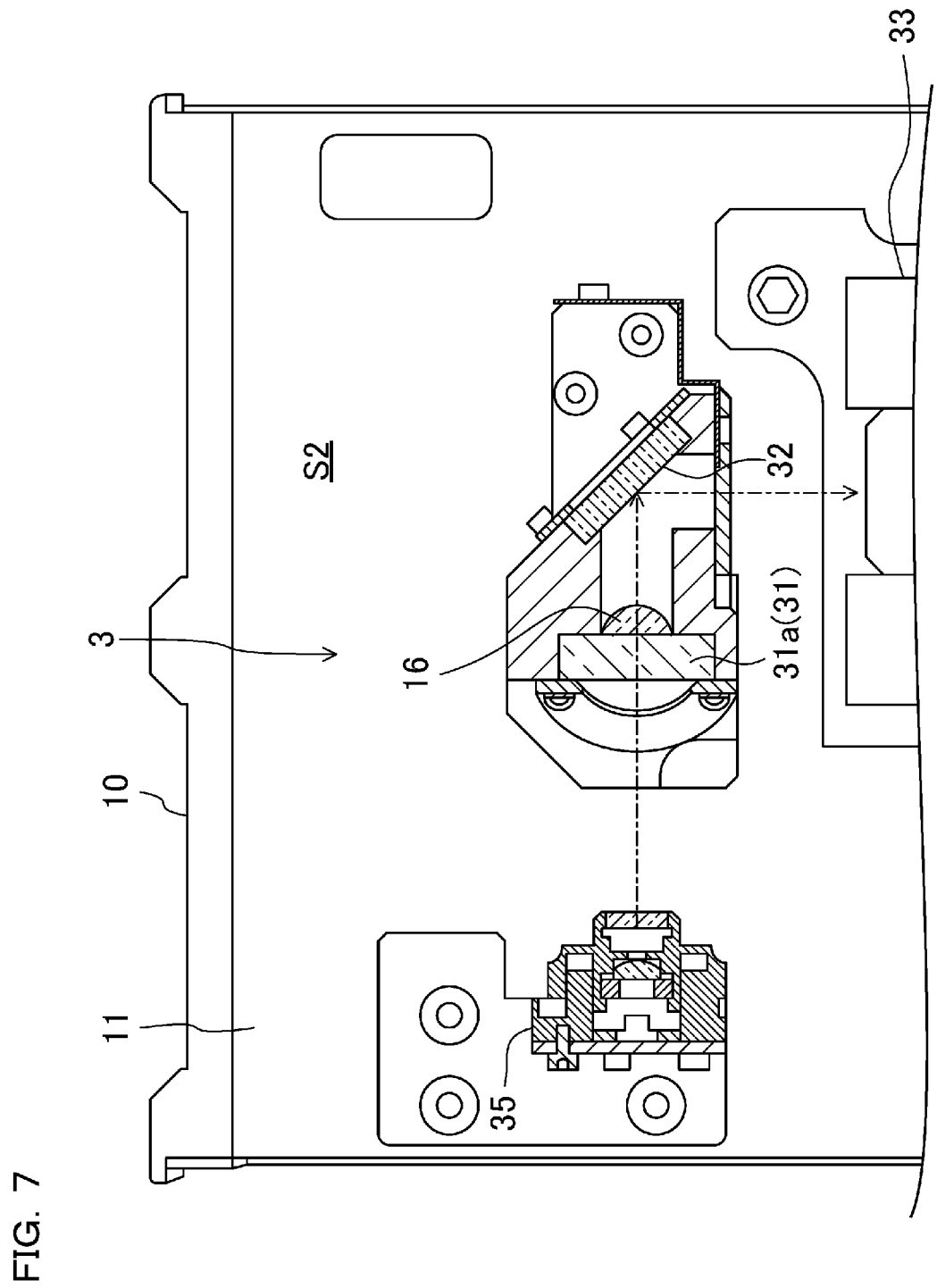
FIG. 7 is a diagram illustrating a configuration around a guide light emitting section in a laser light guiding section.

FIG. 7 is a diagram illustrating a configuration around the guide light source 36 in the laser light guiding section 3, and FIG. 8 is a perspective view illustrating a configuration of the laser light scanning section 4. Further, FIG. 9 is a sectional view illustrating a configuration of the laser light guiding section 3, the laser light scanning section 4, and the distance measuring unit 5, FIG. 10 is a sectional view illustrating an optical path connecting the laser light guiding section 3, the laser light scanning section 4, and the distance measuring unit 5, and FIG. 11 is a perspective view illustrating an optical path connecting the laser light guiding section 3, the laser light scanning section 4, and the distance measuring unit 5.

As shown in FIG. 6 and FIG. 7, the laser light guiding section 3 is optically coupled with the laser light output section 2 via an output window portion 16 provided above the partition portion 11 (specifically, slightly above a central portion in the vertical direction of the housing 10). In this way, the near-infrared laser light output from the laser light output section 2 is incident on the laser light guiding section 3 through the output window portion 16.

The near-infrared laser light incident through the output window portion 16 is reflected by the first bend mirror 32 and the second bend mirror 34 in this order and passes through the laser light guiding section 3. The Z scanner 33 which adjusts the focal position of the near-infrared laser light reflected by the first bend mirror 32 is arranged between the first bend mirror 32 and the second bend mirror 34. The near-infrared laser light that passes through the Z scanner 33 and is reflected by the second bend mirror 34 enters the laser light scanning section 4.

The optical path P formed by the laser light guiding section 3 can be divided into two with the Z scanner 33, which is a focus adjusting section, as a boundary. To be specific, the optical path P formed by the laser light guiding section 3 can be divided into an upstream side optical path Pu which is from the laser light output section 2 to the Z scanner 33, and a downstream side optical path Pd which is from the Z scanner 33 to the laser light scanning section 4.

To be more specific, the upstream side optical path Pu is provided inside the housing 10, and is from the output window portion 16 in the laser light output section 2 to the Z scanner 33 passing through the aforementioned upstream side merging mechanism 31 and the first bend mirror 32 in this order.

The downstream side optical path Pd is provided inside the housing 10, and is from the Z scanner 33 to a first scanner 41 in the laser light scanning section 4 passing through the second bend mirror 34 and the aforementioned downstream side merging mechanism 35 in this order.

As described above, in the housing 10, the upstream side merging mechanism 31 is provided in the middle of the upstream side optical path Pu, and the downstream side merging mechanism 35 is provided in the middle of the downstream side optical path Pd.

A configuration related to the laser light guiding section 3 will be described below in order.

Guide Light Source 36

The guide light source 36 is provided in the second space S2 inside the housing 10 and emits guide light for projecting a predetermined processing pattern on the surface of the workpiece W. The wavelength of the guide light is set so as to be within a visible light range. As an example, the guide light source 36 according to the embodiment emits red laser light having a wavelength near 655 nm as guide light. Therefore, when the guide light is emitted from the marker head 1, the user can visually recognize the guide light.

In the embodiment, the wavelength of the guide light is set to be different from at least the wavelength of the near-infrared laser light. Further, as will be described later, a distance measurement light emitting section 5A in the distance measuring unit 5 emits distance measurement light having a wavelength different from those of the guide light and the near-infrared laser light. Therefore, the distance measurement light, the guide light, and the laser light have different wavelengths from one another.

Specifically, the guide light source 36 is arranged at substantially the same height as the output window portion 16 and the upstream side merging mechanism 31 in the second space S2, and can emit a visible light laser (guide light) towards an inner side in the lateral direction of the housing 10. The guide light source 36 is further in a posture such that an optical axis of the guide light emitted from the guide light source 36 and the upstream side merging mechanism 31 intersect.

Here, "substantially the same height" refers to that, when viewed from the bottom plate 10a forming the lower surface of the housing 10, the height positions are substantially equal. In other descriptions, it also refers to a height viewed from the bottom plate 10a.

Therefore, for example, when the guide light is emitted from the guide light source 36 so that the user can visually recognize the processing pattern using the near-infrared laser light, the guide light reaches the upstream side merging mechanism 31. The upstream side merging mechanism 31 has a dichroic mirror 31a as an optical component. As will be described later, the dichroic mirror 31a reflects near-infrared laser light while transmitting guide light. As a result, the guide light transmitted through the dichroic mirror 31a and the near-infrared laser light reflected by the dichroic mirror 31a merge and become coaxial.

The guide light source 36 according to the embodiment is configured to emit guide light based on a control signal output from the control section 101.

Upstream Side Merging Mechanism 31

The upstream side merging mechanism 31 merges the guide light emitted from the guide light source 36 which is a guide light emitting section with the upstream side optical path Pu. By providing the upstream side merging mechanism 31, the guide light emitted from the guide light source 36 and near-infrared laser light in the upstream side optical path Pu can be made coaxial.

As described above, the wavelength of the guide light is set to be different from at least the wavelength of the near-infrared laser light. Therefore, the upstream side merging mechanism 31 can be configured using, for example, a dichroic mirror.

Specifically, the upstream side merging mechanism 31 according to the embodiment has the dichroic mirror 31a which transmits one of the near-infrared laser light and the guide light while reflecting the other. To be more specific, as illustrated in FIG. 7, etc., the dichroic mirror 31a is fixed in a posture in which a mirror surface on one side of the dichroic mirror 31a faces the output window portion 16 and the mirror surface on the other side faces the guide light source 36. Therefore, the near-infrared laser light is incident on the mirror surface on one side of the dichroic mirror 31a, while the guide light is incident on the mirror surface on the other side of the dichroic mirror 31a.

The dichroic mirror 31a according to the embodiment can reflect the laser light while transmitting the guide light. As a result, the guide light can be made to merge with the upstream side optical path Pu and can be made coaxial with the near-infrared laser light. The near-infrared laser light and the guide light that are thus made coaxial reach the first bend mirror 32 as shown in FIG. 7.

First Bend Mirror 32

The first bend mirror 32 is provided in the middle of the upstream side optical path Pu, and is arranged such that the optical path Pu is bent and directed downward. Specifically, the first bend mirror 32 is arranged at substantially the same height as the dichroic mirror 31*a* in the upstream side merging mechanism 31, and can reflect the near-infrared laser light and the guide light that have been made coaxial by the upstream side merging mechanism 31.

The near-infrared laser light and the guide light reflected by the first bend mirror 32 propagate downward and pass through the Z scanner 33 to reach the second bend mirror 34.

Z Scanner 33

The Z scanner 33 as a focus adjusting section is arranged between the first bend mirror 32 and the second bend mirror 34, and can adjust the focal position of the near-infrared laser light emitted from the laser light output section 2.

To be specific, as shown in FIG. 3A to FIG. 3B, the Z scanner 33 according to the embodiment includes an input lens 33*a* which transmits near-infrared laser light emitted from the laser light output section 2, a collimating lens 33*b* which passes the near-infrared laser light that has passed through the input lens 33*a*, an output lens 33*c* which passes the near-infrared laser light that has passed through the input lens 33*a* and the collimating lens 33*b*, a lens driving section 33*d* which moves the input lens 33*a*, and a casing 33*e* which accommodates the input lens 33*a*, the collimating lens 33*b*, and the output lens 33*c*.

The input lens 33*a* is a plano-concave lens, and the collimating lens 33*b* and the output lens 33*c* are plano-convex lenses. The input lens 33*a*, the collimating lens 33*b*, and the output lens 33*c* are arranged so that their optical axes are coaxial with each other.

Further, in the Z scanner 33, the lens driving section 33*d* moves the input lens 33*a* along an optical axis. In this way, a relative distance between the input lens 33*a* and the output lens 33*c* can be changed while keeping the optical axes of the input lens 33*a*, the collimating lens 33*b*, and the output lens 33*c* coaxial with respect to the near-infrared laser light passing through the Z scanner 33. As a result, the focal position of the near-infrared laser light irradiated onto the workpiece W changes.

Hereinafter, each part included in the Z scanner 33 will be described more specifically.

The casing 33*e* has a substantially cylindrical shape. As shown in FIG. 3A to FIG. 3B, openings 33*f* for passing the near-infrared laser light are formed at both end portions of the casing 33*e*. The input lens 33*a*, the collimating lens 33*b*, and the output lens 33*c* are arranged in this order in the vertical direction inside the casing 33*e*.

Among the input lens 33*a*, the collimating lens 33*b*, and the output lens 33*c*, the collimating lens 33*b* and the output lens 33*c* are fixed inside the casing 33*e*. The input lens 33*a* is provided to be movable in the vertical direction. The lens driving section 33*d* has a motor, for example, and moves the input lens 33*a* in the vertical direction. In this way, the relative distance between the input lens 33*a* and the output lens 33*c* is changed.

For example, assume that the distance between the input lens 33*a* and the output lens 33*c* is adjusted to be relatively short by the lens driving section 33*d*. In this case, a condensing angle of the near-infrared laser light passing through the output lens 33*c* becomes relatively small, and thus the focal position of the near-infrared laser light moves away from the emission window portion 19 of the marker head 1.

On the other hand, assume that the distance between the input lens 33*a* and the output lens 33*c* is adjusted to be relatively long by the lens driving section 33*d*. In this case, the condensing angle of the near-infrared laser light passing through the output lens 33*c* becomes relatively large, and thus the focal position of the near-infrared laser light approaches the emission window portion 19 of the marker head 1.

In the Z scanner 33, among the input lens 33*a*, the collimating lens 33*b*, and the output lens 33*c*, the input lens 33*a* may be fixed inside the casing 33*e* while the collimating lens 33*b* and the output lens 33*c* may be movable in the vertical direction. Alternatively, all of the input lens 33*a*, the collimating lens 33*b*, and the output lens 33*c* may be movable in the vertical direction.

As a result, the Z scanner 33 as a focus adjusting section functions as a section for scanning the near-infrared laser light in the vertical direction.

As described above, the near-infrared laser light passing through the Z scanner 33 is made coaxial with the guide light emitted from the guide light source 36. Therefore, by operating the Z scanner 33, it is possible to adjust not only the focal position of the near-infrared laser light but also the focal position of the guide light.

The Z scanner 33 according to the embodiment, in particular, the lens driving section 33*d* in the Z scanner 33, is configured to operate based on a control signal output from the control section 101.

Second Bend Mirror 34

The second bend mirror 34 is provided in the middle of the downstream side optical path Pd, and is arranged such that the optical path Pd is bent and directed rearward. Specifically, the second bend mirror 34 is arranged at substantially the same height as a dichroic mirror 35*a* in the downstream side merging mechanism 35, and can reflect the near-infrared laser light and the guide light that have passed through the Z scanner 33.

The near-infrared laser light and the guide light reflected by the second bend mirror 34 propagate rearward and pass through the downstream side merging mechanism 35 to reach the laser light scanning section (to be specific, the first scanner 41).

Downstream Side Merging Mechanism 35

The downstream side merging mechanism 35 guides distance measurement light emitted from the distance measurement light emitting section 5A in the distance measuring unit 5 to the workpiece W via the laser light scanning section 4 by merging the distance measurement light with the aforementioned downstream side optical path Pd. In addition, the downstream side merging mechanism 35 guides the distance measurement light reflected by the workpiece W and returning in the order of the laser light scanning section 4 and the downstream side optical path Pd to the distance measurement light receiving section 5B in the distance measuring unit 5.

By providing the downstream side merging mechanism 35, the distance measurement light emitted from the distance measurement light emitting section 5A and the near-infrared laser light and the guide light in the downstream side optical path Pd can be made coaxial. At the same time, by providing the downstream side merging mechanism 35, among the distance measurement light emitted from the marker head 1 and reflected by the workpiece W, distance measurement light incident on the marker head 1 can be guided to the distance measurement light receiving section 5B.

As described above, the wavelength of the distance measurement light is set to be different from the wavelength of the near-infrared laser light and the wavelength of the guide light. Therefore, similar to the upstream side merging mechanism 31, the downstream side merging mechanism 35 can be configured using, for example, a dichroic mirror.

Specifically, the downstream side merging mechanism 35 according to the embodiment has the dichroic mirror 35*a* which transmits one of the distance measurement light and the guide light while reflecting the other. To be more specific, the dichroic mirror 35*a* is arranged at substantially the same height as the second bend mirror 34 and behind the second bend mirror 34, and is arranged on the left side in the lateral direction of the housing 10 with respect to the through hole 12*a*.

Further, as shown in FIG. 9, etc., the dichroic mirror 35*a* is fixed in a posture in which a mirror surface on one side of the dichroic mirror 35*a* faces the second bend mirror 34 and the mirror surface on the other side faces the through hole 12*a* of the base plate 12. Therefore, the near-infrared laser light and the guide light are incident on the mirror surface on one side of the dichroic mirror 35*a*, while the distance measurement light is incident on the mirror surface on the other side of the dichroic mirror 35*a* via the through hole 12*a*.

The dichroic mirror 35*a* according to the embodiment can reflect the distance measurement light while transmitting the near-infrared laser light and the guide light. In this way, for example, when the distance measurement light emitted from the distance measuring unit 5 is incident on the dichroic mirror 35*a*, the distance measurement light can be merged with the downstream side optical path Pd and can be made coaxial with the near-infrared laser light and the guide light. The near-infrared laser light, the guide light, and the distance measurement light that are thus made coaxial reach the first scanner 41 as shown in FIG. 3A to FIG. 3B.

On the other hand, the distance measurement light reflected by the workpiece W returns to the laser light scanning section 4 to reach the downstream side optical path Pd. The distance measurement light that has returned to the downstream side optical path Pd is reflected by the dichroic mirror 35*a* in the downstream side merging mechanism 35 and reaches the distance measuring unit 5 via the through hole 12*a*.

Figure 10:
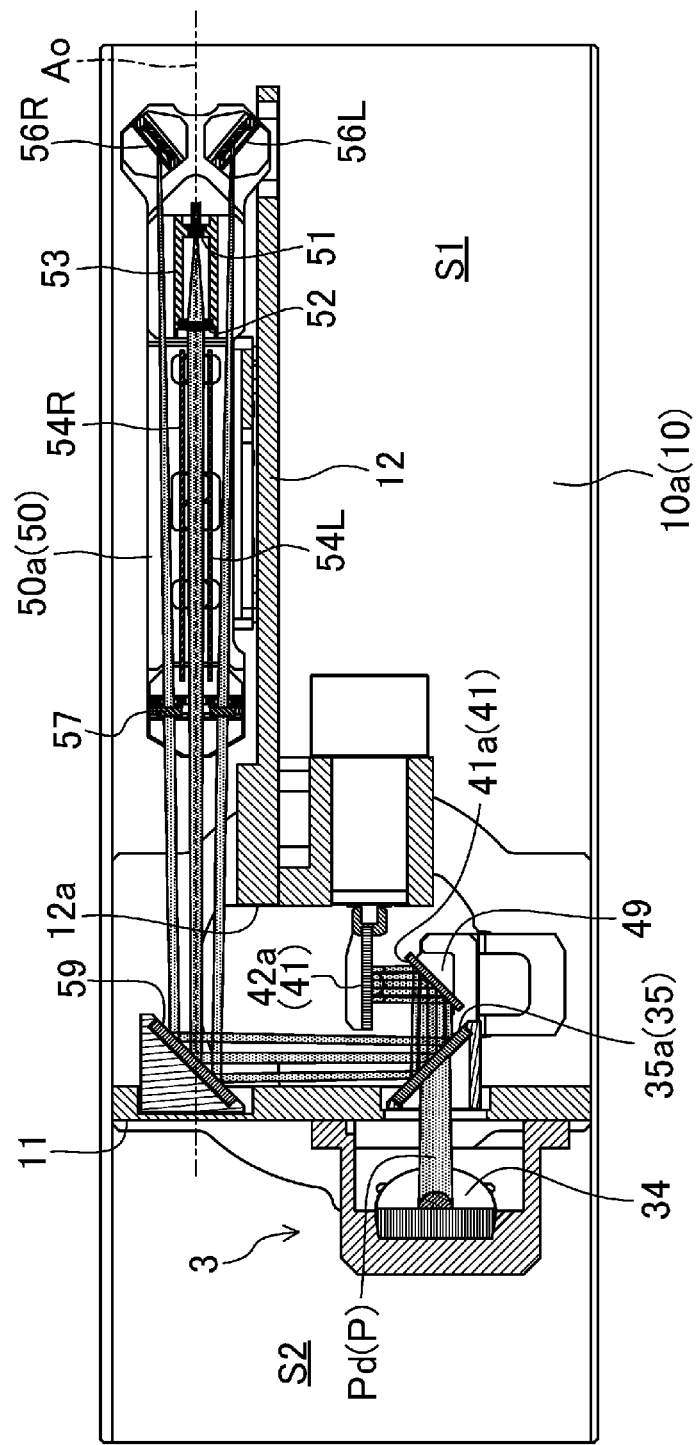
FIG. 10 is a sectional view illustrating an optical path connecting the laser light guiding section, the laser light scanning section, and the distance measuring unit.
Figure 11:
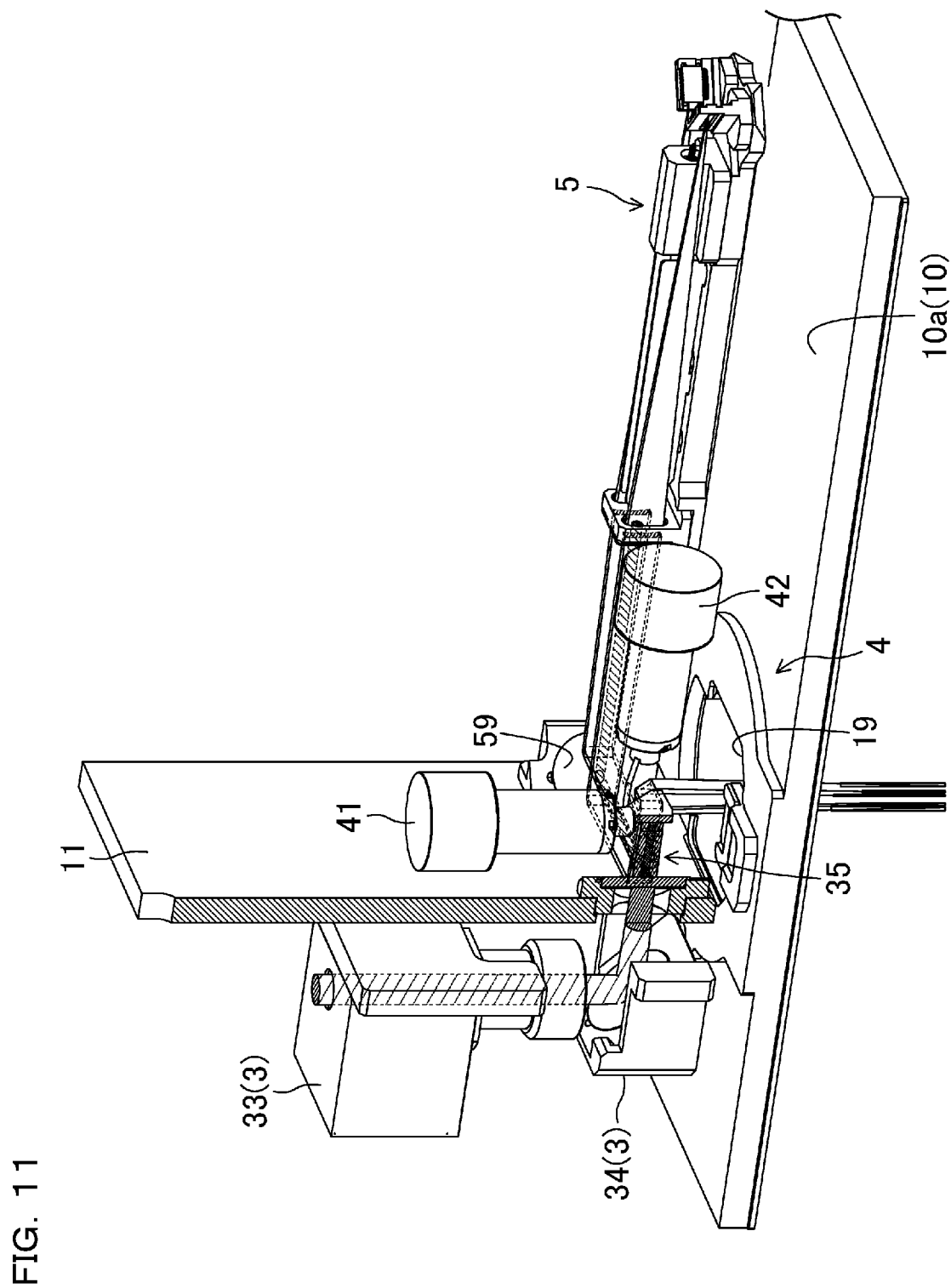
FIG. 11 is a perspective view illustrating an optical path connecting the laser light guiding section, the laser light scanning section, and the distance measuring unit.

The distance measurement light incident on the dichroic mirror 35*a* from the distance measuring unit 5 and the distance measurement light reflected by the dichroic mirror 35*a* and incident on the distance measuring unit 5 both propagate along the left-right direction (the lateral direction of the housing 10) when the housing 10 is viewed in a plan view, as shown in FIG. 10, etc.

(Laser Light Scanning Section 4)

As shown in FIG. 3A, the laser light scanning section 4 is configured to irradiate the workpiece W with the laser light (near-infrared laser light) emitted from the laser light output section 2 and guided by the laser light guiding section 3 and to perform a two-dimensional scanning on the surface of the workpiece W.

In the example shown in FIG. 8, the laser light scanning section 4 is configured as a so-called biaxial galvano scanner. That is, the laser light scanning section 4 includes the first scanner 41 for scanning the near-infrared laser light incident from the laser light guiding section 3 in a first direction, and a second scanner 42 for scanning the near-infrared laser light scanned by the first scanner 41 in a second direction.

Here, the second direction refers to a direction substantially orthogonal to the first direction. Therefore, the second scanner 42 can scan the near-infrared laser light in a direction substantially orthogonal to the first scanner 41. In the embodiment, the first direction is equivalent to the front-rear direction (the longitudinal direction of the housing 10), and the second direction is equivalent to the left-right direction (the lateral direction of the housing 10).

The first scanner 41 has a first mirror 41*a* at its tip. The first mirror 41*a* is arranged at substantially the same height as the second bend mirror 34 and the dichroic mirror 35*a* and behind the dichroic mirror 35*a*. Therefore, as shown in FIG. 9, the second bend mirror 34, the dichroic mirror 35*a*, and the first mirror 41*a* are arranged in a line along the front-rear direction (the longitudinal direction of the housing 10).

The first mirror 41*a* is further rotationally driven by a motor (not shown) built in the first scanner 41. The motor can rotate the first mirror 41*a* around a rotation axis extending in the vertical direction. By adjusting a rotation posture of the first mirror 41*a*, a reflection angle of the near-infrared laser light by the first mirror 41*a* can be adjusted.

Similarly, the second scanner 42 has a second mirror 42*a* at its tip. The second mirror 42*a* is arranged at substantially the same height as the first mirror 41*a* in the first scanner 41 and on the right side of the first mirror 41*a*. Therefore, as shown in FIG. 9, the first mirror 41*a* and the second mirror 42*a* are arranged along the left-right direction (the lateral direction of the housing 10).

The second mirror 42*a* is further rotationally driven by a motor (not shown) built in the second scanner 42. The motor can rotate the second mirror 42*a* around a rotation axis extending in the front-rear direction. By adjusting a rotation posture of the second mirror 42*a*, a reflection angle of the near-infrared laser light by the second mirror 42*a* can be adjusted.

Therefore, when the near-infrared laser light is incident on the laser light scanning section 4 from the downstream side merging mechanism 35, the near-infrared laser light is reflected by the first mirror 41*a* in the first scanner 41 and the second mirror 42*a* in the second scanner 42 in this order, and is emitted to the outside of the marker head 1 from the emission window portion 19.

In that case, it is possible to scan the near-infrared laser light in the first direction on the surface of the workpiece W by operating the motor of the first scanner 41 to adjust the rotation posture of the first mirror 41*a*. At the same time, it is possible to scan the near-infrared laser light in the second direction on the surface of the workpiece W by operating the motor of the second scanner 42 to adjust the rotation posture of the second mirror 42*a*.

Further, as described above, not only the near-infrared laser light but also the guide light which has passed through the dichroic mirror 35*a* of the downstream side merging mechanism 35, or the distance measurement light reflected by the dichroic mirror 35*a*, are incident on the laser light scanning section 4. The laser light scanning section 4 according to the embodiment can perform a two-dimensional scanning of the thus incident guide light or the distance measurement light by operating the first scanner 41 and the second scanner 42 respectively.

Rotation postures that the first mirror 41*a* and the second mirror 42*a* can take are basically set within a range where, when the near-infrared laser light is reflected by the second mirror 42*a*, the reflected light passes through the emission window portion 19.

(Distance Measuring Unit 5)

As shown in FIG. 3B, the distance measuring unit 5 projects distance measurement light via the laser light scanning section 4 and irradiates the surface of the workpiece W with the distance measurement light. The distance measuring unit 5 further receives the distance measurement light reflected by the surface of the workpiece W via the laser light scanning section 4.

Figure 13:
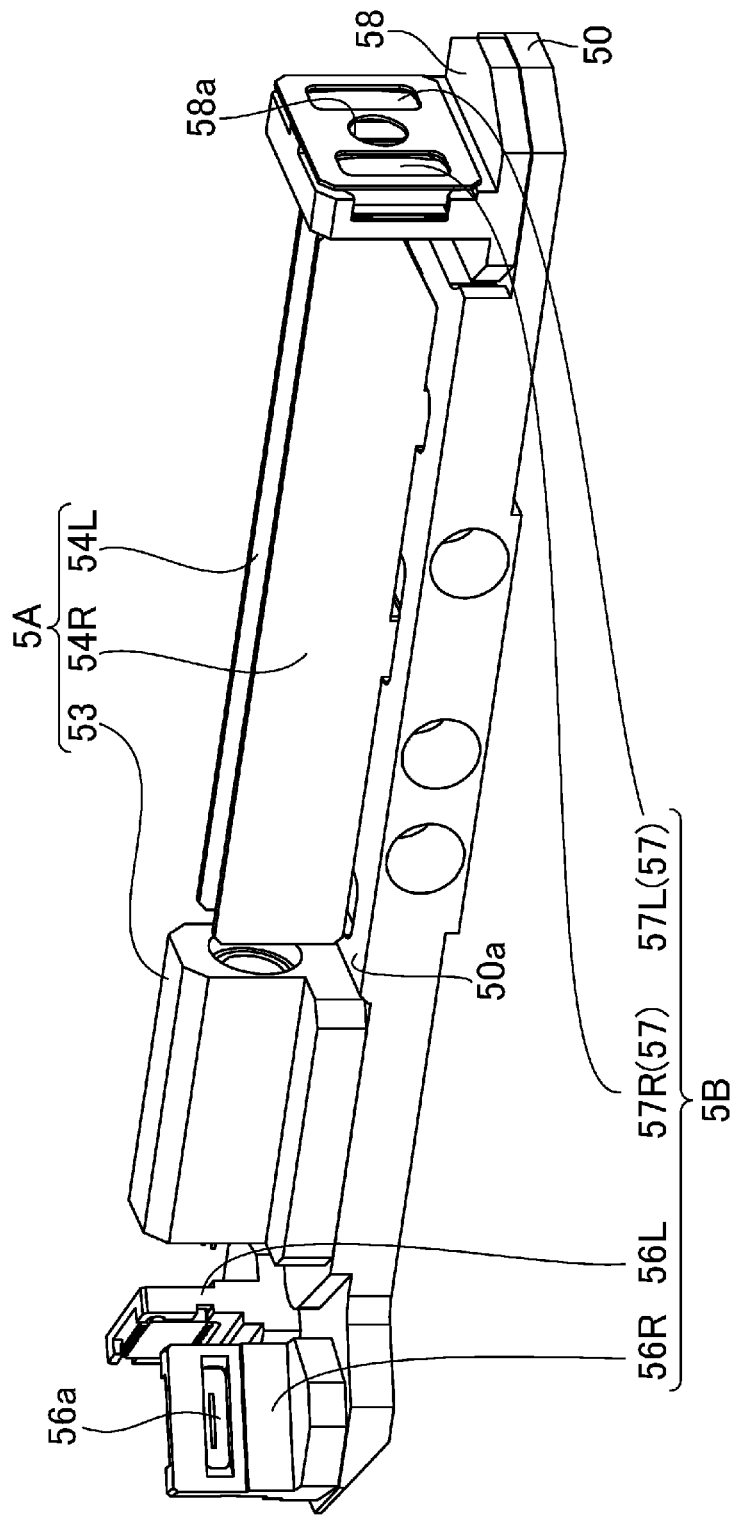
FIG. 13 is a perspective view illustrating a configuration of the distance measuring unit.
Figure 14:
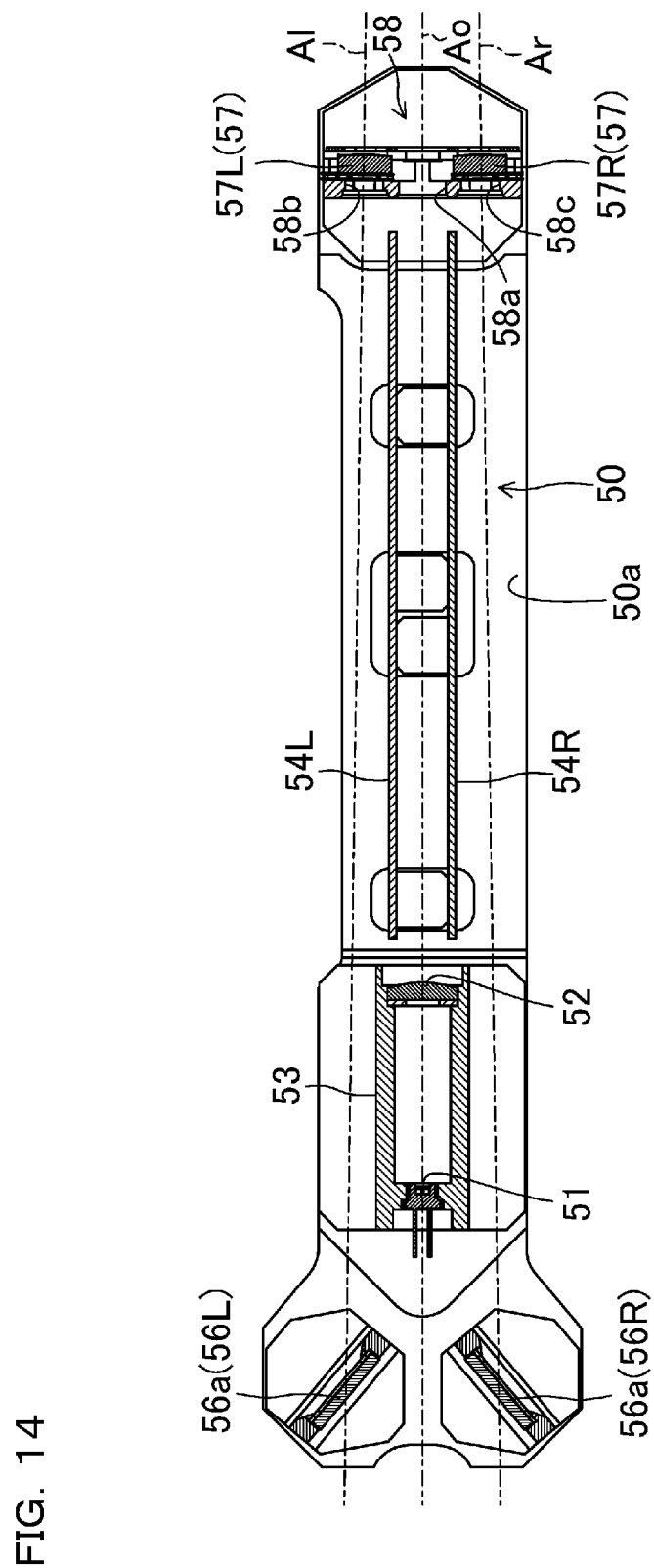
FIG. 14 is a sectional view illustrating the configuration of the distance measuring unit.

FIG. 12 is a perspective view illustrating a layout of the distance measuring unit 5. FIG. 13 is a perspective view illustrating a configuration of the distance measuring unit 5, and FIG. 14 is a sectional view illustrating the configuration of the distance measuring unit 5.

Figure 16A:
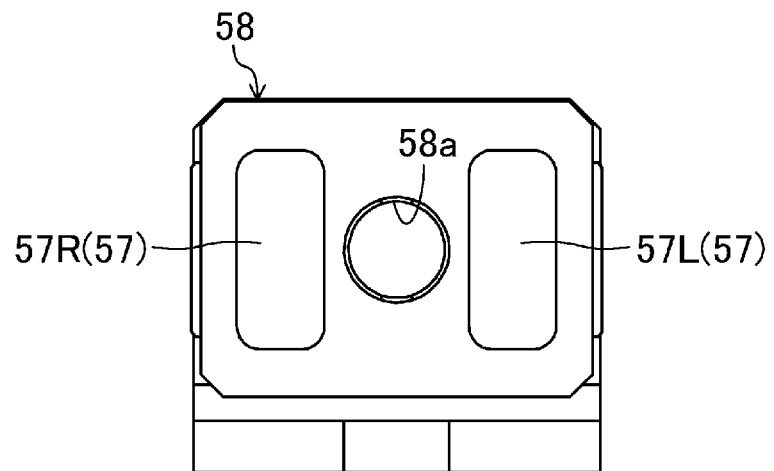
FIG. 16A is a front view illustrating a configuration around a light receiving lens.
Figure 16B:
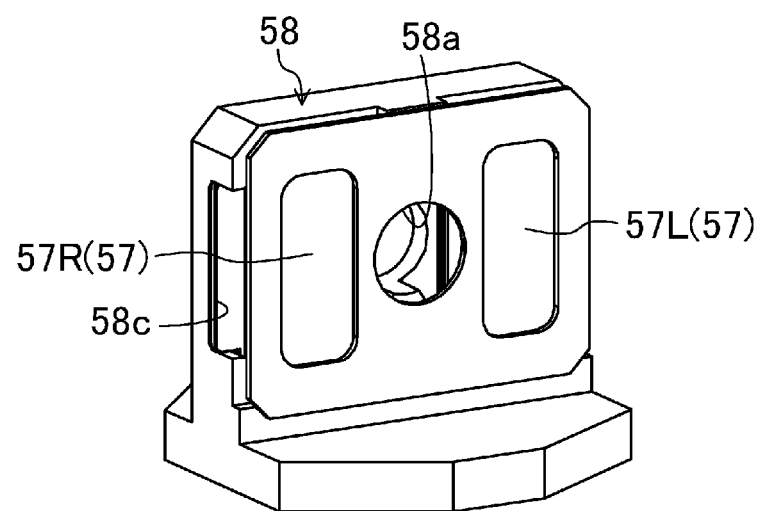
FIG. 16B is a perspective view illustrating the configuration around the light receiving lens.
Figure 17A:
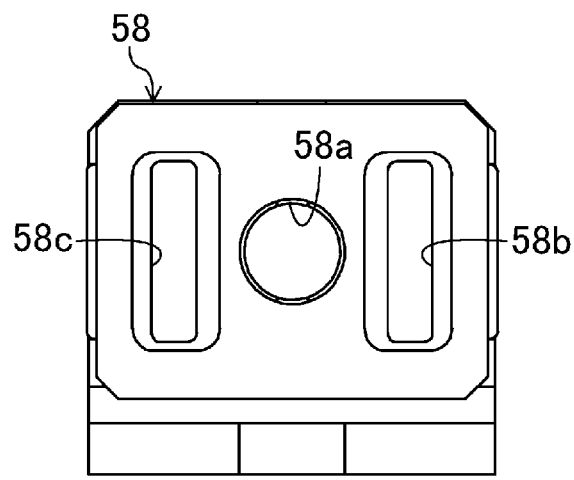
FIG. 17A is a diagram corresponding to FIG. 16A where the light receiving lens is omitted.
Figure 17B:
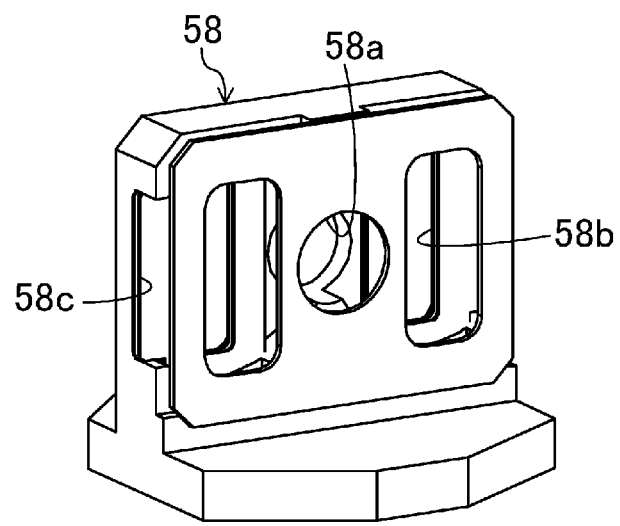
FIG. 17B is a diagram corresponding to FIG. 16B where the light receiving lens is omitted.

FIG. 16A is a front view illustrating a configuration around a light receiving lens 57, and FIG. 16B is a perspective view illustrating the configuration around the light receiving lens 57. FIG. 17A is a diagram corresponding to FIG. 16A where the light receiving lens 57 is omitted, and FIG. 17B is a diagram corresponding to FIG. 16B where the light receiving lens 57 is omitted.

The distance measuring unit 5 is mainly divided into a module for projecting distance measurement light and a module for receiving distance measurement light. Specifically, the distance measuring unit 5 includes the distance measurement light emitting section 5A which is provided in the housing 10 and emits to the laser light scanning section 4 distance measurement light for measuring a distance from the marker head 1 in the laser processing apparatus L to the surface of the workpiece W, and the distance measurement light receiving section 5B which is provided in the housing 10 and receives the distance measurement light emitted from the distance measurement light emitting section 5A and reflected by the workpiece W via the laser light scanning section 4. The distance measuring unit 5 further includes a support base 50 which supports the distance measurement light emitting section 5A and the distance measurement light receiving section 5B from below, and is fixed inside the housing 10 via the support base 50.

As described above, the distance measuring unit 5 is provided in a space on the other side in the lateral direction in the first space S1 and is arranged below the heat sink 22. As shown in FIG. 10, etc., the distance measuring unit 5 emits distance measurement light forward along the longitudinal direction of the housing 10, and receives distance measurement light propagating substantially rearward along the longitudinal direction.

Further, the distance measuring unit 5 is optically coupled with the laser light guiding section 3 via the aforementioned dichroic mirror 35a. However, while the distance measuring unit 5 projects distance measurement light along the longitudinal direction of the housing 10, the dichroic mirror 35a reflects distance measurement light propagating along the lateral direction instead of the longitudinal direction of the housing 10.

Therefore, a third bend mirror 59 is provided inside the housing 10 so as to form an optical path connecting the distance measuring unit 5 and the dichroic mirror 35a. As shown in FIG. 9 to FIG. 10, etc., in the space on the other side in the lateral direction in the first space S1, the third bend mirror 59 is arranged on the right side of the dichroic mirror 35a and the through hole 12a and in front of the distance measuring unit 5.

The third bend mirror 59 is arranged at substantially the same height as the dichroic mirror 35a in the downstream side merging mechanism 35, and the distance measurement light emitting section 5A and the distance measurement light receiving section 5B in the distance measuring unit 5. Further, the third bend mirror 59 is fixed in a posture in which the mirror surface on one side faces the through hole 12a and the dichroic mirror 35a, and the distance measurement light emitting section 5A and the distance measurement light receiving section 5B.

Therefore, the distance measurement light incident on the third bend mirror 59 from the distance measurement light emitting section 5A is reflected by the third bend mirror 59 and incident on the dichroic mirror 35a via the through hole 12a. On the other hand, the distance measurement light that returns to the laser light scanning section 4 and is reflected by the dichroic mirror 35a is incident on the third bend mirror 59 via the through hole 12a, and is reflected by the third bend mirror 59 to enter the distance measurement light receiving section 5B.

Hereinafter, configuration of each part included in the distance measuring unit 5 will be described in order.

Support Base 50

As shown in FIG. 13 to FIG. 14, the support base 50 is formed extending along an optical axis of the distance measurement light emitting section 5A, that is, an optical axis Ao of the distance measurement light emitted from the distance measurement light emitting section 5A, and is provided inside the housing 10. The support base 50 according to the embodiment is made with an integral plate-shaped body and has a rectangular outer shape extending along the optical axis Ao.

As shown in FIG. 12, etc., the support base 50 is arranged in a posture in which the longitudinal direction of the support base 50 is along the longitudinal direction of the housing 10, and is fastened from the side with respect to the base plate 12 instead of the bottom plate 10a of the housing 10. Therefore, as shown in FIG. 5, the support base 50 is fixed in a state of being spaced from the bottom plate 10a without contacting the bottom plate 10a.

Various members can be attached to an upper surface 50a of the support base 50. Specifically, a pair of light receiving elements 56L and 56R included in the distance measurement light receiving section 5B is provided on one side in the longitudinal direction of the support base 50, that is, at apart corresponding to the rear side of the housing 10. On the other hand, a light receiving lens 57 included in the distance measurement light receiving section 5B is provided together with the pair of light receiving elements 56L and 56R on the other side in the longitudinal direction of the support base 50, that is, at apart corresponding to the front side of the housing 10. Among the members included in the distance measurement light receiving section 5B, at least the pair of light receiving elements 56L and 56R, and the light receiving lens 57 can both be fixed on the support base 50.

The distance measurement light emitting section 5A is fixed to the upper surface of the support base 50 between the pair of light receiving elements 56L and 56R, and the light receiving lens 57. As shown in FIG. 14, the distance measurement light emitting section 5A according to the embodiment is formed by modularizing a distance measurement light source 51 which emits distance measurement light, and a light projecting lens 52 which condenses the distance measurement light emitted from the distance measurement light source 51. Among the members included in the distance measurement light emitting section 5A, at least the distance measurement light source 51 and the light projecting lens 52 can both be fixed on the support base 50.

Distance Measurement Light Emitting Section 5A

The distance measurement light emitting section 5A is provided inside the housing 10, and is configured to emit distance measurement light for measuring the distance from the marker head 1 in the laser processing apparatus L to the surface of the workpiece W.

Specifically, the distance measurement light emitting section 5A includes the aforementioned distance measurement light source 51 and the light projecting lens 52, a casing 53 accommodating the distance measurement light source 51 and the light projecting lens 52, and a pair of guide plates 54L and 54R that guides the distance measurement light condensed by the light projecting lens 52. The distance measurement light source 51, the light projecting lens 52, and the guide plates 54L and 54R are arranged in this order in the rear side of the housing 10, and the arrangement direction thereof is substantially equivalent to the longitudinal direction of the housing 10.

The casing 53 is formed in a cylindrical shape extending along the longitudinal direction of the housing 10 and the support base 50, and the distance measurement light source 51 is attached to one side in the longitudinal direction, that is, one end portion corresponding to the rear side of the housing 10, while the light projecting lens 52 is attached to the other end portion corresponding to the front side of the housing 10. The space between the distance measurement light source 51 and the light projecting lens 52 is sealed in a substantially airtight manner.

The distance measurement light source 51 emits distance measurement light towards the front side of the housing 10 according to a control signal input from the control section 101. To be specific, the distance measurement light source 51 can emit laser light in the visible light range as the distance measurement light. In particular, the distance measurement light source 51 according to the embodiment emits red laser light having a wavelength near 690 nm as the distance measurement light.

The distance measurement light source 51 is further fixed in a posture in which the optical axis Ao of the red laser light emitted as the distance measurement light is along the longitudinal direction of the casing 53. Therefore, the optical axis Ao of the distance measurement light is along the longitudinal direction of the housing 10 and the support base 50, passes through the central portion of the light projecting lens 52 and reaches the outside of the casing 53.

The light projecting lens 52 is positioned between the pair of light receiving elements 56L and 56R, and the light receiving lens 57 in the distance measurement light receiving section 5B in the longitudinal direction of the support base 50. The light projecting lens 52 is in a posture in which the optical axis Ao of the distance measurement light passes through the light projecting lens 52.

The light projecting lens 52 can be, for example, a plano-convex lens, and can be fixed in a posture in which a spherical convex surface faces the outside of the casing 53. The light projecting lens 52 condenses the distance measurement light emitted from the distance measurement light source 51 and emits the distance measurement light to the outside of the casing 53. The distance measurement light emitted to the outside of the casing 53 reaches the guide plates 54L and 54R.

The guide plates 54L and 54R are configured as a pair of members arranged in the lateral direction of the support base 50, and can respectively be a plate-shaped body extending in the longitudinal direction of the support base 50. A space for emitting distance measurement light is defined between the guide plate 54L and the guide plate 54R. The distance measurement light emitted to the outside of the casing 53 passes through the space thus defined and reaches a lens base 58.

The lens base 58 is fixed to the upper surface of the front end portion of the support base 50, and can support the light receiving lens 57 in the distance measurement light receiving section 5B from below. As shown in FIG. 13, the lens base 58 is provided with a through hole 58a which penetrates the lens base 58 in the longitudinal direction of the support base 50, and the through hole 58a can pass the distance measurement light emitted from the distance measurement light source 51.

Therefore, the distance measurement light emitted from the distance measurement light source 51 passes through a space inside the casing 53, a central portion of the light projecting lens 52, the space between the guide plate 54 L and the guide plate 54R, and the through hole 58a of the lens base 58, and is output to the outside of the distance measuring unit 5. The distance measurement light thus output is reflected by the third bend mirror 59, and the dichroic mirror 35a in the downstream side merging mechanism 35, and enters the laser light scanning section 4.

The distance measurement light that has entered the laser light scanning section 4 is reflected by the first mirror 41a of the first scanner 41 and the second mirror 42a of the second scanner 42 in this order, and is emitted from the emission window portion 19 to the outside of the marker head 1.

As described in the description of the laser light scanning section 4, it is possible to scan the distance measurement light in the first direction on the surface of the workpiece W by adjusting the rotation posture of the first mirror 41a of the first scanner 41. At the same time, it is possible to scan the distance measurement light in the second direction on the surface of the workpiece W by operating the motor of the second scanner 42 to adjust the rotation posture of the second mirror 42a.

The distance measurement light thus scanned is reflected on the surface of the workpiece W. A part of the distance measurement light thus reflected (hereinafter also referred to as "reflected light") enters the inside of the marker head 1 via the emission window portion 19. The reflected light that has entered the inside of the marker head 1 returns to the laser light guiding section 3 via the laser light scanning section 4. The reflected light has the same wavelength as the distance measurement light, and thus the reflected light is reflected by the dichroic mirror 35a of the downstream side merging mechanism 35 in the laser light guiding section 3 and enters the distance measuring unit 5 via the through hole 12a and the third bend mirror 59.

Distance Measurement Light Receiving Section 5B

The distance measurement light receiving section 5B is provided inside the housing 10, and is configured to receive distance measurement light (equivalent to the aforementioned "reflected light") emitted from the distance measurement light emitting section 5A and reflected by the workpiece W.

Specifically, the distance measurement light receiving section 5B includes the pair of light receiving elements 56L and 56R, and the light receiving lens 57 supported by the aforementioned lens base 58. Each of the pair of light receiving elements 56L and 56R is arranged in the rear end portion of the support base 50, while the light receiving lens 57 and the lens base 58 are respectively arranged in the front end portion of the support base 50. Therefore, the pair of light receiving elements 56L and 56R, the light receiving lens 57, and the lens base 58 are substantially arranged along the longitudinal direction of the housing 10 and the support base 50.

For the pair of light receiving elements 56L and 56R, their respective optical axes Al and Ar are arranged inside the housing so as to sandwich the optical axis Ao of the distance measurement light in the distance measurement light emitting section 5A. Each of the pair of light receiving elements 56L and 56R receives reflected light that has returned to the laser light scanning section 4.

To be specific, the pair of light receiving elements 56L and 56R is arranged in a direction orthogonal to the optical axis Ao of the distance measurement light emitting section 5A. In the embodiment, the arrangement direction of the pair of light receiving elements 56L and 56R is equivalent to the lateral direction, that is, the left-right direction, of the housing 10 and the support base 50. In the lateral direction, the light receiving element 56L is arranged on the left side of the distance measurement light source 51, and the light receiving element 56R is arranged on the right side of the distance measurement light source 51.

Each of the pair of light receiving elements 56L and 56R has a light receiving surface 56a directed obliquely frontward, detects a light receiving position of the reflected light on each light receiving surface 56a, and outputs a signal (detection signal) indicating a detection result thereof. Detection signals output from the light receiving elements 56L and 56R are input to the marker controller 100 and reach the aforementioned distance measuring section 103.

Here, the light receiving element 56L arranged on the left side of the distance measurement light source 51 is fixed in a posture in which the light receiving surface 56a thereof faces obliquely left frontward, and the light receiving element 56R arranged on the right side of the distance measurement light source 51 is fixed in a posture in which the light receiving surface 56a thereof faces obliquely right frontward.

Examples of elements that can be used as each of the light receiving elements 56L and 56R include a CMOS image sensor including a complementary MOS (CMOS), a CCD image sensor including a charge-coupled device (CCD), and a position sensitive detector (PSD), etc.

In the embodiment, each of the light receiving elements 56L and 56R is configured using a CMOS image sensor. In this case, the light receiving elements 56L and 56R can detect not only the light receiving position of the reflected light but also received light amount distribution thereof. That is, when each of the light receiving elements 56L and 56R is configured using a CMOS image sensor, pixels are arranged at least in the left-right direction on each light receiving surface 56a. In this case, each of the light receiving elements 56L and 56R can read and amplify a signal for each pixel and output the signal to the outside. Intensity of the signal in each pixel is determined based on intensity of the reflected light at that spot when the reflected light forms a spot on the light receiving surface 56a.

The pair of light receiving elements 56L and 56R according to the embodiment can detect at least a peak position indicating the light receiving position of the reflected light and the intensity of the reflected light.

Further, the optical path length from the downstream side merging mechanism 35 to each of the light receiving elements 56L and 56R is longer than the optical path length from the downstream side merging mechanism 35 to the distance measurement light emitting section 5A. This can also be understood from the fact that each of the light receiving elements 56L and 56R is arranged behind the distance measurement light emitting section 5A.

As a result, the optical path length of the distance measurement light receiving section 5B becomes longer than the optical path length of the distance measurement light emitting section 5A. The distance from the light receiving lens 57 to each of the light receiving elements 56L and 56R is only increased by a portion that the length of the optical path length of the distance measurement light receiving section 5B is made longer. Therefore, this is advantageous in increasing measurement resolution in the distance measurement light receiving section 5B while preventing increase in size of the housing 10 since the size of the housing 10 is limited.

The light receiving lens 57 is arranged inside the housing 10 such that each of the optical axes Al and Ar of the pair of light receiving elements 56L and 56R passes through the light receiving lens 57. The light receiving lens 57 is further arranged in the middle of an optical path connecting the downstream side merging mechanism 35 and the pair of light receiving elements 56L and 56R, and can condense reflected light that has passed through the downstream side merging mechanism 35 on the respective light receiving surfaces 56a and 56a of the pair of light receiving elements 56L and 56R.

The light receiving lens 57 is also arranged at substantially the same height as the aforementioned third bend mirror 59 and the respective light receiving surfaces 56a of the pair of light receiving elements 56L and 56R in the vertical direction. Therefore, the laser light scanning section 4, the downstream side merging mechanism 35, the light receiving lens 57, and the pair of light receiving elements 56L and 56R are arranged at substantially the same height when viewed from the bottom plate 10a of the housing 10.

The light receiving lens 57 according to the embodiment is configured as a pair of left and right light receiving lenses 57L and 57R, similar to the pair of light receiving elements 56L and 56R. The pair of light receiving lenses 57L and 57R is arranged in a direction orthogonal to the optical axis Ao of the distance measurement light emitting section 5A.

The light receiving lens 57L positioned on the left side in the pair of light receiving lenses 57L and 57R is arranged such that the optical axis Al of the light receiving element 56L positioned on the left side in the pair of light receiving elements 56L and 56R passes through the light receiving lens 57L. Similarly, the light receiving lens 57R positioned on the right side in the pair of light receiving lenses 57L and 57R is arranged such that the optical axis Ar of the light receiving element 56R positioned on the right side in the pair of light receiving elements 56L and 56R passes through the light receiving lens 57R.

Further, as illustrated in FIG. 14, an interval between the light receiving lenses 57L and 57R in the left-right direction is shorter than an interval between the light receiving elements 56L and 56R in the left-right direction.

The pair of light receiving lenses 57L and 57R respectively condenses reflected light that has returned to the laser light scanning section 4 and forms a spot of the reflected light on the light receiving surfaces 56a of the corresponding light receiving elements 56L and 56R. Each of the light receiving elements 56L and 56R outputs a signal indicating a peak position of the spot thus formed to the distance measuring section 103.

To be specific, each of the pair of light receiving lenses 57L and 57R is configured as an I-cut lens (a lens having an I-shaped contour) having a longer dimension in a direction perpendicular (vertical direction) to the arrangement direction than a dimension in the arrangement direction of the pair of light receiving elements 56L and 56R (left-right direction).

By making each of the light receiving lenses 57L and 57R an I-cut lens, the dimension in the vertical direction becomes long, and thus the amount of reflected light can be increased. Moreover, by making each of the light receiving lenses 57L and 57R an I-cut lens, as shown in FIG. 16A for example, a gap can be formed between the light receiving lenses 57L and 57R and a space for providing the aforementioned through hole 58a can be secured. This is advantageous in suppressing interference between the distance measurement light emitted from the distance measurement light emitting section 5A and the reflected light received by the distance measurement light receiving section 5B.

In addition, as illustrated in FIG. 13 to FIG. 14, the distance measurement light source 51 and the light projecting lens 52 in the distance measurement light emitting section 5A are arranged between the pair of light receiving elements 56L, 56R, and the pair of light receiving lenses 57L, 57R in the distance measurement light receiving section 5B in a front-rear direction, and are arranged closer to the pair of light receiving elements 56L and 56R than to the pair of light receiving lenses 57L and 57R in the front-rear direction. This is advantageous in suppressing interference between reflected light that has passed through each of the light receiving lenses 57L and 57R, and the distance measurement light emitting section 5A.

Taking the light receiving lens 57L and the light receiving element 56L positioned on the left side as an example, it is considered to arrange the distance measurement light source 51, the light receiving element 56L, and the light receiving lens 57L to follow Scheimpflug principle in order to image the reflected light on the light receiving surface 56a regardless of the distance to the workpiece W.

Figure 15A:
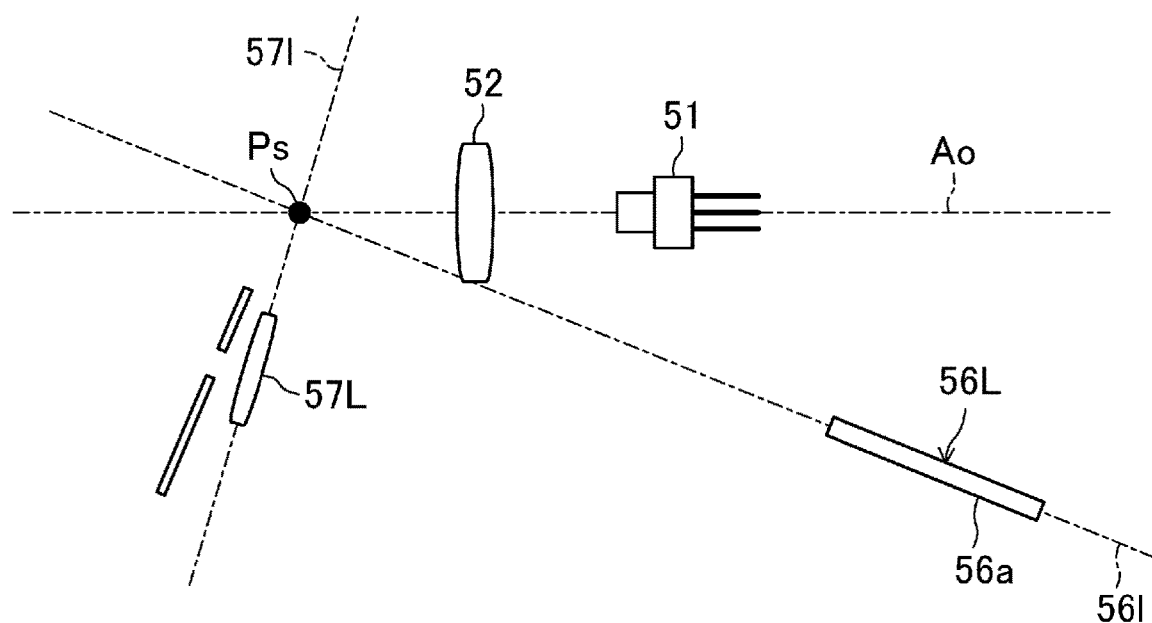
FIG. 15A is a diagram illustrating a layout following Scheimpflug principle.

In a case of a configuration following the Scheimpflug principle (so-called conjugate imaging optical system), as illustrated in FIG. 15A, the light receiving surface 56a of the light receiving element 56L must be inclined so as to make a straight line 561 extending along the light receiving surface 56a of the light receiving element 56L intersect with an intersection Ps of the optical axis Ao of the distance measurement light source 51 and a straight line 571 extending along a main surface of the light receiving lens 57L. This means that the layout of the light receiving element 56L is limited.

As a result of intensive studies, inventors of the present application have found that depending on the configuration of the distance measuring unit 5, the light receiving surface 56a of the light receiving element 56 may be excessively inclined with respect to the main surface 57a of the light receiving lens 57L and a total reflection of reflected light on the light receiving surface 56a may be caused.

Therefore, in the embodiment, the straight line 571 extending along the main surface of the light receiving lens 57L, and the straight line 561 extending along each light receiving surface 56a of the pair of light receiving elements 56L and 56R, particularly the light receiving surface 56a of the light receiving element 56L corresponding to the light receiving lens 57L, are arranged so as not to follow the Scheimpflug principle.

Figure 15B:
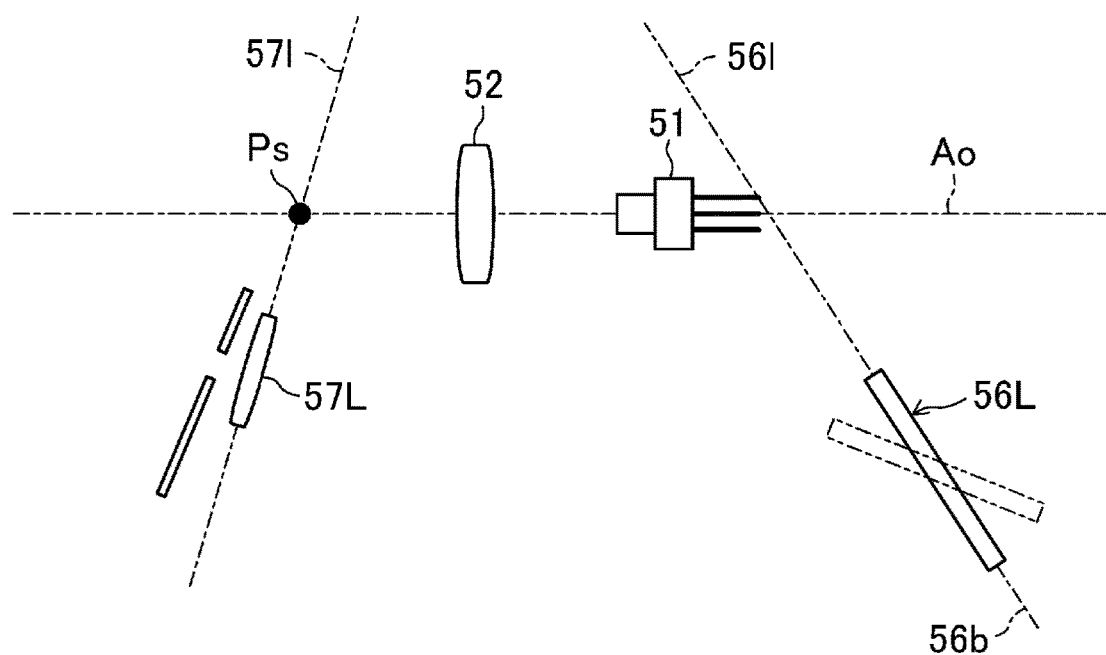
FIG. 15B is a diagram illustrating a layout that does not follow the Scheimpflug principle.

Specifically, as shown in FIG. 15B, the straight line 561 extending along the light receiving surface 56a of the light receiving element 56L is arranged so as not to intersect with the intersection Ps of the optical axis Ao of the distance measurement light source 51 and the straight line 571 extending along the main surface of the light receiving lens 57L. When such an arrangement is adopted, the degree of freedom of the layout of the light receiving element 56L can be increased.

However, when it is arranged so as not to follow the Scheimpflug principle, an optical image (the aforementioned spot) formed on the light receiving surface 56a may not be focused and the optical image may be blurred.

Therefore, in the embodiment, a diaphragm 58b for adjusting light amount incident on the light receiving surface 56a is provided between the light receiving lens 57L and the light receiving surface 56a of the corresponding light receiving element 56L. Specifically, the diaphragm 58b is formed as a slit whose dimension in the vertical direction is longer than the dimension in the left-right direction, which is similar to the outer shape of the light receiving lens 57L. The diaphragm 58b is further formed integrally with the lens base 58 for supporting the light receiving lens 57L, and contributes to compactness around the light receiving lens 57L.

Instead of the diaphragm 58b provided in the lens base 58, or in addition to the diaphragm 58b provided in the lens base 58, a diaphragm may be arranged between the downstream side merging mechanism 35 and the light receiving lens 57L. The diaphragm in this case is preferably arranged in the middle of an optical path connecting the third bend mirror 59 and the light receiving lens 57L. Moreover, the lens base 58 is provided with an opening for allowing distance measurement light to pass through the light receiving lenses 57L and 57R. By narrowing the width of the opening, the opening itself may function as a diaphragm.

The configuration described so far is the same for the light receiving lens 57 and the light receiving element 56R positioned on the right side. That is, the light receiving surface 56a of the light receiving element 56R on the right side is arranged so as not to intersect with the intersection of the optical axis Ao of the distance measurement light source 51 and the main surface of the light receiving lens 57R on the right side. Then, among all parts included in the lens base 58, a diaphragm 58c formed as a slit whose dimension in the vertical direction is longer than the dimension in the left-right direction is provided in a part positioned between the light receiving lens 57R arranged on the right side and the light receiving surface 56a of the corresponding light receiving element 56R.

Further, as is clear from FIG. 9, etc., the pair of light receiving elements 56L and 56R is arranged such that their relative positional relations with the first scanner 41 and the second scanner 42 are different from each other.

An optical path that the reflected light follows inside the marker head 1 is deviated from an optical path that the distance measurement light follows at the time of emission according to the distance to the surface of the workpiece W. The magnitude of the distance at that time is reflected in light receiving positions on the respective light receiving surfaces 56a of the light receiving elements 56L and 56R. Therefore, it is possible to measure the distance to the surface of the workpiece W by detecting the light receiving position (peak position of a spot in the embodiment) on each light receiving surface 56a.

In this way, the laser processing apparatus L can basically measure a distance to the surface of the workpiece W based on a light receiving position of the reflected light in each light receiving surface 56a of the light receiving elements 56L and 56R. As a distance measuring method, a so-called triangulation method is used.

<Distance Measuring Method>

FIG. 18 is a diagram explaining the triangulation method. In FIG. 18, only the distance measuring unit 5 is shown. However, the following description is also applicable to a case where distance measurement light is emitted via the laser light scanning section 4 as described above.

As illustrated in FIG. 18, when distance measurement light is emitted from the distance measurement light source 51 in the distance measurement light emitting section 5A, the distance measurement light is irradiated onto the surface of the workpiece W. When the distance measurement light is reflected by the workpiece W, the reflected light (particularly diffuse reflected light) propagates substantially isotropically if an influence of specular reflection is removed.

The reflected light thus propagating includes a component which enters the light receiving element 56L via the light receiving lens 57L. However, an incident angle to the light receiving element 56L increases or decreases depending on the distance between the marker head 1 and the workpiece W. When the incident angle to the light receiving element 56L increases or decreases, the light receiving positions on the light receiving surface 56a increase or decrease.

In this way, the distance between the marker head 1 and the workpiece W, and the light receiving position on the light receiving surface 56a are associated with each other with a predetermined relation. Therefore, by grasping the relation in advance and storing the same in, for example, the marker controller 100, it is possible to calculate distances from the light receiving position on the light receiving surface 56a to the marker head 1 and to the workpiece W. Such a calculation method is nothing but a method using the so-called triangulation method.

That is, the aforementioned distance measuring section 103 measures the distance from the laser processing apparatus L to the surface of the workpiece W by the triangulation method based on the light receiving position of the distance measurement light in the distance measurement light receiving section 5B.

Specifically, the aforementioned condition setting storing section 102 stores in advance a relation between a light receiving position on the light receiving surface 56a, and a distance between the marker head 1 and the surface of the workpiece W. On the other hand, a signal indicating a light receiving position of distance measurement light in the distance measurement light receiving section 5B, to be specific, a peak position of a spot formed by reflected light on the light receiving surface 56a, is input to the distance measuring section 103.

The distance measuring section 103 measures a distance to the surface of the workpiece W based on the input signal and the relation stored in the condition setting storing section 102. A measurement value thus obtained is input to the control section 101, for example, and is used for control of the Z scanner 33, etc., by the control section 101.

<Processing Procedure of Workpiece W>

Figure 19:
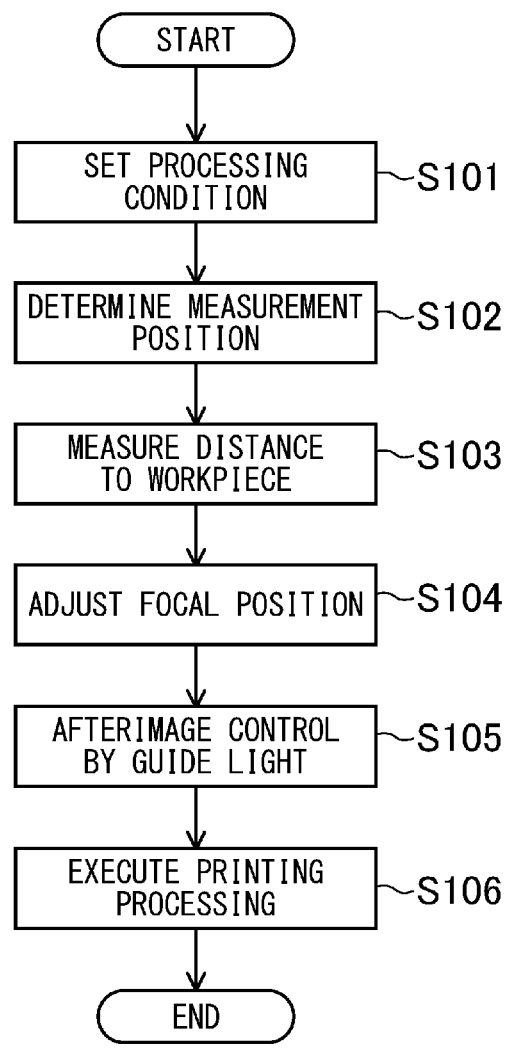
FIG. 19 is a flowchart illustrating a workpiece processing procedure.

Hereinafter, a processing procedure of the workpiece W by the laser processing apparatus L will be described as a usage example of the measurement result obtained by the distance measuring section 103. FIG. 19 is a flow chart illustrating a processing procedure of the workpiece W.

A control process illustrated in FIG. 19 can be executed by the control section 101 which is capable of controlling the excitation light generating section 110, the laser light output section 2, the Z scanner 33, the laser light scanning section 4, the distance measurement light emitting section 5A, and the guide light source 36.

First, in step S101, a processing condition in laser processing is set when a user operates the operation terminal 800. The processing condition set in step S101 includes, for example, a content (marking pattern) of a character string, etc., to be printed on the surface of the workpiece W, and a layout of such a character string, etc.

In subsequent step S102, the control section 101 determines a plurality of positions (hereinafter also referred to as "measurement position") where a distance from the marker head 1 is to be measured on the surface of the workpiece W based on the processing condition set in step S101.

In subsequent step S103, the control section 101 measures the distance from the laser processing apparatus L to the surface of the workpiece W via the distance measuring section 103 by controlling the distance measurement light emitting section 5A.

Specifically, in step S103, the control section 101 causes the distance measurement light emitting section 5A to emit distance measurement light and causes the distance measurement light receiving section 5B to receive reflected light with respect to each measurement position determined in step S102. Then, a signal indicating a light receiving position of the reflected light in the distance measurement light receiving section 5B is input to the distance measuring section 103, and the distance measuring section 103 measures the distance to the surface of the workpiece W. The distance measuring section 103 inputs a signal indicating the distance thus measured to the control section 101.

In subsequent step S104, the control section 101 determines a control parameter of the Z scanner 33 based on a measurement result in step S103, that is, a distance measurement value at each measurement position, such that focal positions match the respective measurement values.

Specifically, in step S104, the control section 101 determines a control parameter of the lens driving section 33d at each measurement position, that is, a relative distance between the input lens 33a and the output lens 33c at each measurement position.

In subsequent step S105, the control section 101 adjusts a focal position at each measurement position via the Z scanner 33, and after adjusting the focal position by the Z scanner 33, irradiates the surface of the workpiece W with guide light via the guide light source 36. At the same time, the control section 101 controls the laser light scanning section 4 to trace a marking pattern with guide light emitted from the guide light source 36.

The upstream side merging mechanism 31 which merges the guide light with the near-infrared laser light is provided on the upstream side of the Z scanner 33. Therefore, by adjusting the focal position by the Z scanner 33, it is possible to adjust not only the focal position of the near-infrared laser light but also the focal position of the guide light.

Further, the tracing of the marking pattern by the guide light is repeatedly performed by appropriately controlling the laser light scanning section 4. In this way, the marking pattern is continuously displayed on the surface of the workpiece W due to afterimage effect of a human eye. At this time, in order to make the continuous display by the afterimage effect effective, it is conceivable to set a scanning speed of the guide light to be equal to or higher than a minimum speed at which the afterimage phenomenon occurs. On the other hand, depending on conditions such as a material of the workpiece W and an output of the near-infrared laser light, a scanning speed of the near-infrared laser light may be excessively slow during printing processing. In response to this, the scanning speed of the guide light is set to a speed higher than the scanning speed of the near-infrared laser light, that is, a speed equal to or higher than the minimum speed at which the afterimage phenomenon occurs.

In subsequent step S106, the control section 101 completes setting related to the marking pattern, and executes printing processing based on the setting. Instead of the step S106, the setting related to the marking pattern may be transferred to the condition setting storing section 102 or the operation terminal 800 and stored.

<Configuration Related to Downstream Side Merging Mechanism 35>

According to the embodiment, when measuring the distance from the laser processing apparatus L, in particular, the marker head 1 to the surface of the workpiece W, the distance measurement light emitting section 5A emits distance measurement light. The distance measurement light emitted from the distance measurement light emitting section 5A passes through the downstream side merging mechanism 35 and the laser light scanning section 4 in this order and is irradiated onto the workpiece W as shown in FIG. 3B. As shown in FIG. 3B, the distance measurement light irradiated onto the workpiece W returns, after being reflected by the workpiece W, to the laser light scanning section 4 and the downstream side merging mechanism 35 in this order and reaches the distance measurement light receiving section 5B. Then, as shown in FIG. 18, the distance measuring section 103 measures the distance to the surface of the workpiece W based on the light receiving position of the distance measurement light in the distance measurement light receiving section 5B.

Here, as shown in FIG. 3A, the downstream side merging mechanism 35 is provided in a section connecting the Z scanner 33 as a focus adjusting section and the laser light scanning section 4, and makes the distance measurement light emitted from the distance measurement light emitting section 5A and the near-infrared laser light that has passed through the Z scanner 33 coaxial. Accordingly, the distance measurement light is made coaxial in the optical path on the upstream side of the laser light scanning section 4, and thus the distance measurement light can be scanned by operating the laser light scanning section 4.

At the same time, the distance measurement light is also made coaxial in the optical path on the downstream side of the Z scanner 33. Therefore, the measurement resolution by the distance measurement light can be secured without excessively increasing the openings 33f of the casing 33e in the Z scanner 33.

Further, according to the embodiment, not only the distance measurement light emitted from the distance measurement light emitting section 5A but also the distance measurement light reflected by the workpiece W and received by the distance measurement light receiving section 5B does not pass through the Z scanner 33. Therefore, the distance measurement light emitting section 5A and the distance measurement light receiving section 5B can be arranged close to each other, and an influence of distortion and the like of the housing 10 caused by a temperature change can be suppressed. This is effective in securing measurement accuracy of the distance measuring section 103.

Moreover, according to the embodiment, as shown in FIG. 3A, the guide light emitted from the guide light source 36 as a guide light emitting section passes through the upstream side merging mechanism 31, the Z scanner 33, the downstream side merging mechanism 35, and the laser light scanning section 4 in this order, and is irradiated onto the workpiece W.

Here, the upstream side merging mechanism 31 is provided between the laser light output section 2 and the Z scanner 33, and makes the guide light emitted from the guide light source 36 and the laser light emitted from the laser light output section 2 coaxial. Therefore, the guide light and the laser light are merged in the optical path (upstream side optical path Pu) on the upstream side of the Z scanner 33, and thus the focal position of the guide light can be adjusted by operating the Z scanner 33. As a result, it is possible to improve visibility of the guide light.

As described above, according to the embodiment, by providing an optical path of the distance measurement light and an optical path of the guide light separately, it is possible to achieve both the measurement resolution of the distance measurement light and the visibility of the guide light.

Further, as shown in FIG. 3A, etc., by configuring the downstream side merging mechanism 35 using the dichroic mirror 35a, it is possible to suppress attenuation of the distance measurement light and the guide light, and make the distance measurement light and the guide light coaxial by the downstream side merging mechanism 35.

In addition, as illustrated in FIG. 19, when a processing pattern is projected onto the surface of the workpiece W, guide light with an adjusted focal length can be used. In this way, the visibility of the guide light and the processing pattern can be improved.

<Variation of Downstream Side Merging Mechanism 35>

In the aforementioned embodiment, the distance measurement light emitting section 5A is configured to emit distance measurement light having a wavelength different from that of the guide light, and the downstream side merging mechanism 35 is configured to include the dichromic mirror 35a to transmit one of the distance measurement light and the guide light while reflecting the other. However, it is not limited to this configuration.

For example, the downstream side merging mechanism 35 may include a polarizing beam splitter that separates one of the distance measurement light and the guide light. In this case, the distance measurement light emitting section 5A emits distance measurement light including a polarized component different from that of the guide light.

Such a variation can be implemented by, for example, replacing the dichroic mirror 35a in FIG. 3A with a polarizing beam splitter. In this case, for example, it is only necessary to set one of the distance measurement light, the guide light, and the near-infrared laser light as circularly polarized light and set the others as linearly polarized light.

<Configuration Related to Distance Measuring Unit 5>

According to the present embodiment, when measuring the distance from the laser processing apparatus L, in particular, the marker head 1 to the surface of the workpiece W, the distance measurement light emitting section 5A emits distance measurement light. The distance measurement light emitted from the distance measurement light emitting section 5A passes through the downstream side merging mechanism 35 and the laser light scanning section 4 in this order and is irradiated onto the workpiece W as shown in FIG. 3B. As shown in FIG. 3B, the distance measurement light irradiated onto the workpiece W returns, after being reflected by the workpiece W, to the laser light scanning section 4 and the downstream side merging mechanism 35 in this order and reaches the light receiving lens 57 of the distance measurement light receiving section 5B. Then, the distance measurement light (reflected light) that has passed through the light receiving lens 57 reaches the respective light receiving surfaces 56a of the pair of light receiving elements 56L and 56R. As shown in FIG. 18, the distance measuring section 103 measures the distance to the surface of the workpiece W based on the light receiving positions of the distance measurement light on the light receiving surfaces 56a.

Here, the merging mechanism is provided between the laser light output section and the laser light scanning section, and makes the distance measurement light emitted from the distance measurement light emitting section and the laser light emitted from the laser light output section coaxial. Therefore, the distance measurement light is made coaxial in the optical path (upstream side optical path Pu) on the upstream side of the laser light scanning section 4, and thus the distance measurement light can be scanned by operating the laser light scanning section 4.

Further, the light receiving lens 57 is provided between the downstream side merging mechanism 35 and the pair of light receiving elements 56L and 56R, and can condense the distance measurement light that has passed through the downstream side merging mechanism 35. In this way, the distance measurement light can form an appropriate spot on the light receiving surface 56a, and further the distance to the workpiece W can be measured with a high accuracy.

In addition, by using a pair of members as the light receiving elements 56L and 56R, even when the distance measurement light fails to be well received by the light receiving element 56L due to vignetting caused by a shape of the workpiece, for example, it is still possible to measure the distance based on the distance measurement light received by the other light receiving element 56R.

Further, as shown in FIG. 3B, etc., each of the light receiving elements 56L and 56R is arranged away from the downstream side merging mechanism 35 farther than the distance measurement light emitting section 5A. As a result, the distance between the light receiving lens 57 and each of the light receiving elements 56L and 56R is increased by a portion that each of the light receiving elements 56L and 56R is made farther away, and consequently the measurement resolution can be increased.

Moreover, as shown in FIG. 13 to FIG. 14, etc., the distance measurement light source 51 and the light projecting lens 52 are fixed via a support. As a result, the distance measurement light source 51 and the light projecting lens 52 form an integral light projecting module, which is advantageous in maintaining a relative positional relation between the distance measurement light source 51 and the light projecting lens 52.

Further, as shown in FIG. 13 to FIG. 14, etc., the pair of light receiving elements 56L and 56R and the light receiving lens 57 are fixed via the support base 50. As a result, each of the light receiving elements 56L ad 56R and the light receiving lens 57 form an integral light receiving module, which is advantageous in maintaining a relative positional relation between each of the light receiving elements 56L and 56R and the light receiving lens 57.

Further, since the light projecting module and the light receiving module are integrated via the support base 50, it is easy to attach a component related to the distance measurement light and it is advantageous in bringing an optical path on the emitting side and an optical path on the light receiving side close to each other.

In addition, in general, the main surface of the light receiving lens 57 and the light receiving surfaces 56a of the light receiving elements 56L and 56R are arranged inclined with respect to each other for the sake of layout in cases. In this case, although focal points can be connected on the light receiving surfaces 56a by arranging following the so-called Scheimpflug principle, each layout is limited.

In contrast, as shown in FIG. 15B, by arranging so as not to follow the Scheimpflug principle, it is possible to freely layout the light receiving lens 57 and each of the light receiving elements 56L and 56R, and it is also possible to measure a distance with a high accuracy by providing diaphragms 58b and 58c.

Further, by making the height positions of the laser light scanning section 4, the downstream side merging mechanism 35, the light receiving lens 57, and the pair of light receiving elements 56L and 56R substantially the same, it is possible to limit the number of turns of an optical path connecting the components. As a result, the number of components such as reflection mirrors for turning the optical path can be decreased, and manufacturing cost can be reduced.

Moreover, the distance measurement light reflected by the workpiece W is reflected by the first scanner 41 and the second scanner 42 to enter each of the light receiving elements 56L and 56R. Here, depending on a measurement position on the workpiece W, the distance measurement light reflected by the first scanner 41 and the second scanner 42 may not reach each of the light receiving elements 56L and 56R, or may not enter the first scanner 41 or the second scanner 42 in the first place. When the distance measurement light does not reach the light receiving elements 56L and 56R, the distance to the workpiece W cannot be measured.

However, as can be seen from FIG. 9, etc., the pair of light receiving elements 56L and 56R is arranged such that their relative positional relations with the first scanner 41 and the second scanner 42 are different from each other. Therefore, for example, even when the distance measurement light reflected by the second scanner 42 fails to enter the light receiving element 56L, it is still possible to enter the other light receiving element 56R. By configuring to measure a distance using the distance measurement light incident on any one of the light receiving elements 56L and 56R, it is possible to widen an area where the distance can be measured on the workpiece W.

<Measurement Using a Pair of Light Receiving Elements 56L and 56R>

Figure 20A:
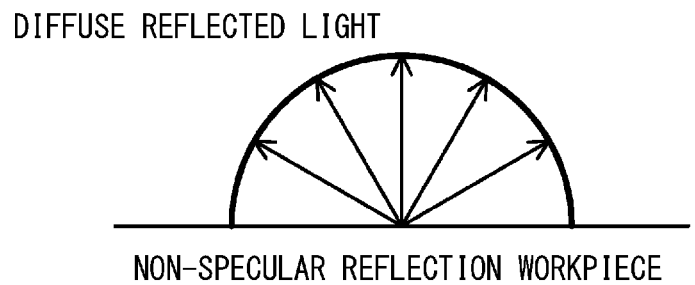
FIG. 20A is a diagram illustrating diffuse reflected light.
Figure 20B:
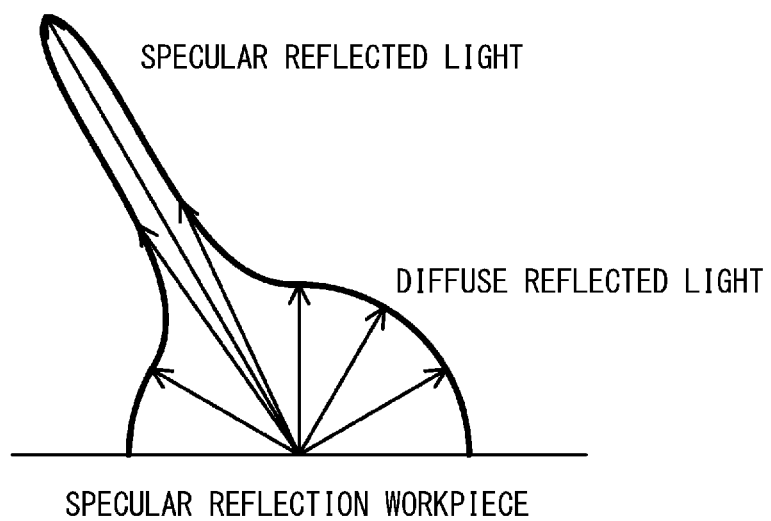
FIG. 20B is a diagram illustrating specular reflected light.
Figure 21A:
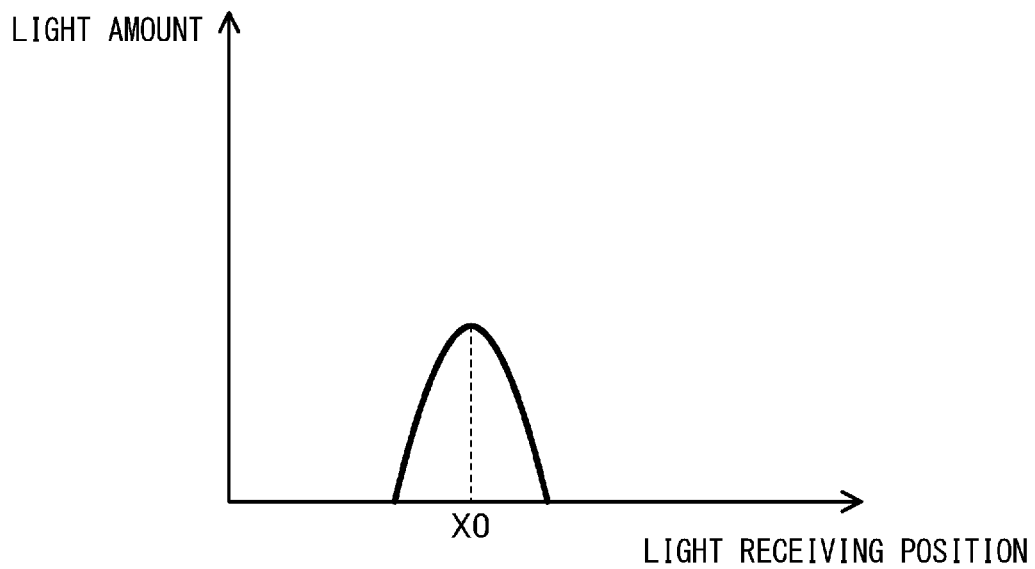
FIG. 21A is a diagram illustrating light receiving amount of diffuse reflected light.
Figure 21B:
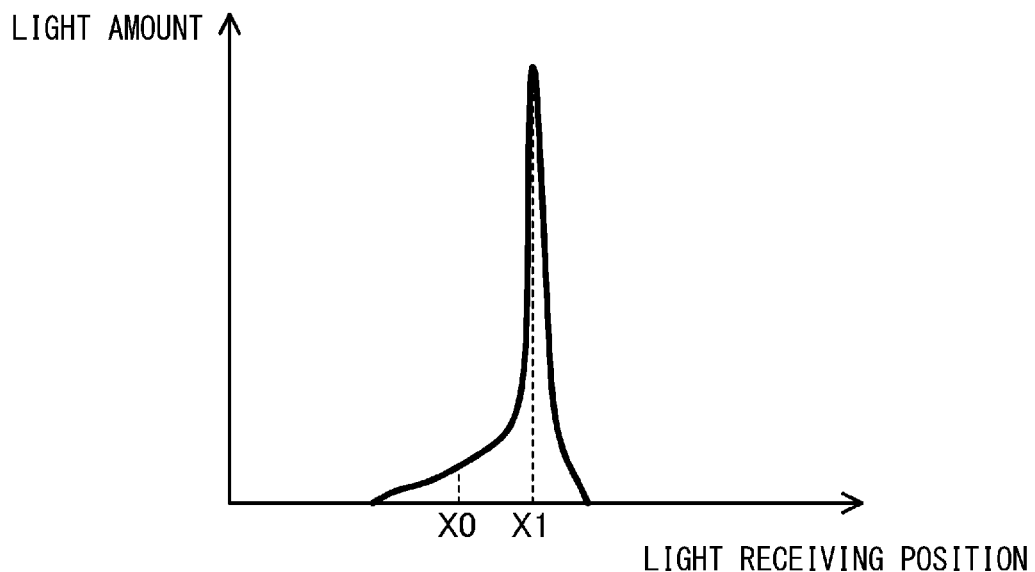
FIG. 21B is a diagram illustrating light receiving amount of specular reflected light.
Figure 22A:
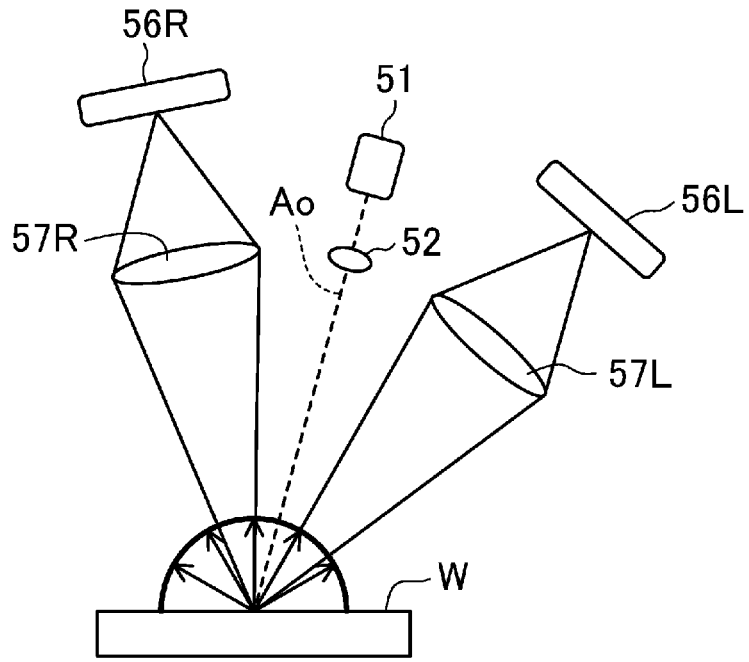
FIG. 22A is a diagram illustrating diffuse reflected light incident on a pair of light receiving elements.
Figure 22B:
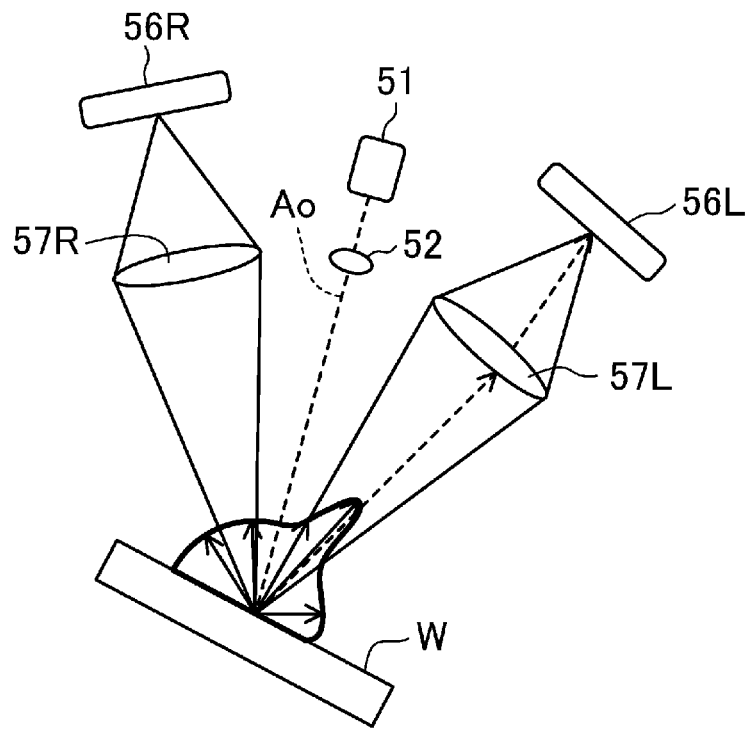
FIG. 22B is a diagram illustrating specular reflected light incident on a pair of light receiving elements.

FIG. 20A is a diagram illustrating diffuse reflected light, and FIG. 20B is a diagram illustrating specular reflected light. FIG. 21A is a diagram illustrating light receiving amount of diffuse reflected light, and FIG. 21B is a diagram illustrating light receiving amount of specular reflected light. Further, FIG. 22A is a diagram illustrating diffuse reflected light incident on the pair of light receiving elements 56L and 56R, and FIG. 22B is a diagram illustrating specular reflected light incident on the pair of light receiving elements 56L and 56R.

When the distance measurement light is reflected by the workpiece W, the so-called diffuse reflected light propagates substantially isotropically as shown in FIG. 20A. On the other hand, depending on the material of the workpiece W, specular reflected light as shown in FIG. 20B may be generated in addition to the diffuse reflected light shown in FIG. 20A.

For example, when only diffuse reflected light is incident on the light receiving surface 56a of the light receiving element 56L, the light amount (light amount of spots formed by the reflected light) of the reflected light at each light receiving position (specifically, the position of a pixel arranged on the light receiving surface 56a) follows a normal distribution having a peak at a predetermined position X0 as shown in FIG. 21A. In this case, a peak signal indicating the predetermined position X0 is input to the distance measuring section 103.

In general, specular reflected light has higher intensity than diffuse reflected light. Therefore, when specular reflected light is incident on the light receiving surface 56a of the light receiving element 56L, the light amount of the reflected light at each light receiving position would have a peak at a position X1 deviated from the predetermined position X0 as shown in FIG. 21B. In this case, a peak signal indicating the position X1 instead of the signal indicating the predetermined position X0 is input to the distance measuring section 103. This situation is not desirable from the perspective of measurement accuracy.

In contrast, in the embodiment, as shown in FIG. 22A, a configuration including the pair of light receiving elements 56L and 56R is used. Therefore, as shown in FIG. 22B, even when specular reflected light is incident on the light receiving element 56L, it is still possible to secure the measurement accuracy by measuring the distance using diffuse reflected light incident on the other light receiving element 56R.

Specific Control Process

Figure 23:
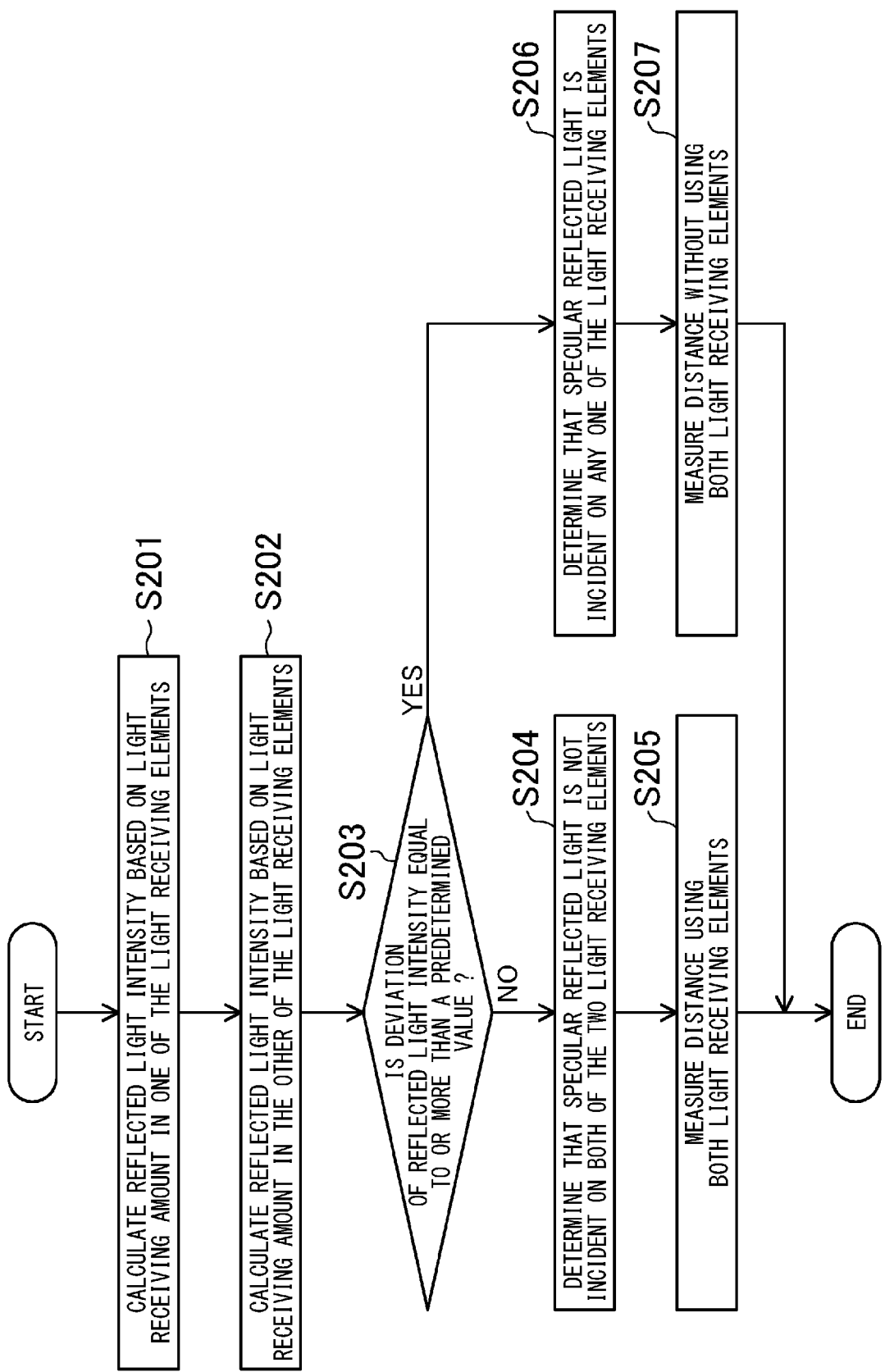
FIG. 23 is a diagram illustrating a distance measurement procedure using a pair of light receiving elements.

FIG. 23 is a diagram illustrating a distance measurement procedure using the pair of light receiving elements 56L and 56R.

First, in step S201, the distance measuring section 103 calculates the intensity of the reflected light based on the light receiving amount of the reflected light incident on the light receiving surface 56a of the light receiving element 56L.

In subsequent step S202, the distance measuring section 103 calculates the intensity of the reflected light based on the light receiving amount of the reflected light incident on the light receiving surface 56a of the other light receiving element 56R.

In subsequent step S203, the distance measuring section 103 calculates a deviation between the intensity calculated in step S201 and the intensity calculated in step S202. Then, the distance measuring section 103 determines whether the deviation thus calculated is equal to or more than a predetermined value. When it is determined NO, the process proceeds to step S204. When it is determined YES, the process proceeds to step S206.

In step S204, the distance measuring section 103 determines that specular reflected light is not incident on both the light receiving elements 56L and 56R, and measures a distance using the two light receiving elements 56L and 56R in step S205. For example, the distance measuring section 103 calculates the distance using each of the light receiving elements 56L and 56R, and uses an average value thereof as a final measurement result.

On the other hand, in step S206, the distance measuring section 103 determines that specular reflected light is incident on one of the two light receiving elements 56L and 56R, and measures the distance without using both the light receiving elements 56L and 56R in step S207. For example, the distance measuring section 103 can select one of the pair of light receiving elements 56L and 56R that has a relatively small intensity of reflected light, and can calculate the distance using the selected one. Alternatively, the distance measuring section 103 can change a coordinate to be measured by performing a two-dimensional scanning of the distance measurement light.

Variation of Control Process

In the flow chart exemplified in FIG. 23, it is configured such that the intensity of the reflected light at each of the light receiving elements 56L and 56R is calculated and compared. However, it is not limited this configuration. For example, in steps S201 to S202, the distance measuring section 103 may measure the distance using each of the light receiving elements 56L and 56R instead of the intensity of the reflected light at each of the light receiving elements 56L and 56R. In this case, in step S203, not the intensity of the reflected light but distances calculated using each of the light receiving elements 56L and 56R are compared.

Then, when the deviation of the distances calculated using each of the light receiving elements 56L and 56R is equal to or less than a predetermined value, it is determined that specular reflected light is not incident on both of the light receiving elements 56L and 56R. When the deviation is more than the predetermined value, it is determined that specular reflected light is incident on one of the two light receiving elements 56L and 56R. In the former case, it is processed in the same manner as in step S205 described above. In the latter case, the intensity of the reflected light at each of the light receiving elements 56L and 56R may be calculated and compared in order to identify the element on which specular reflected light is incident, or the coordinate to be measured may be changed as described above.

<Layout of the Pair of Light Receiving Elements 56L and 56R>

Figure 27:
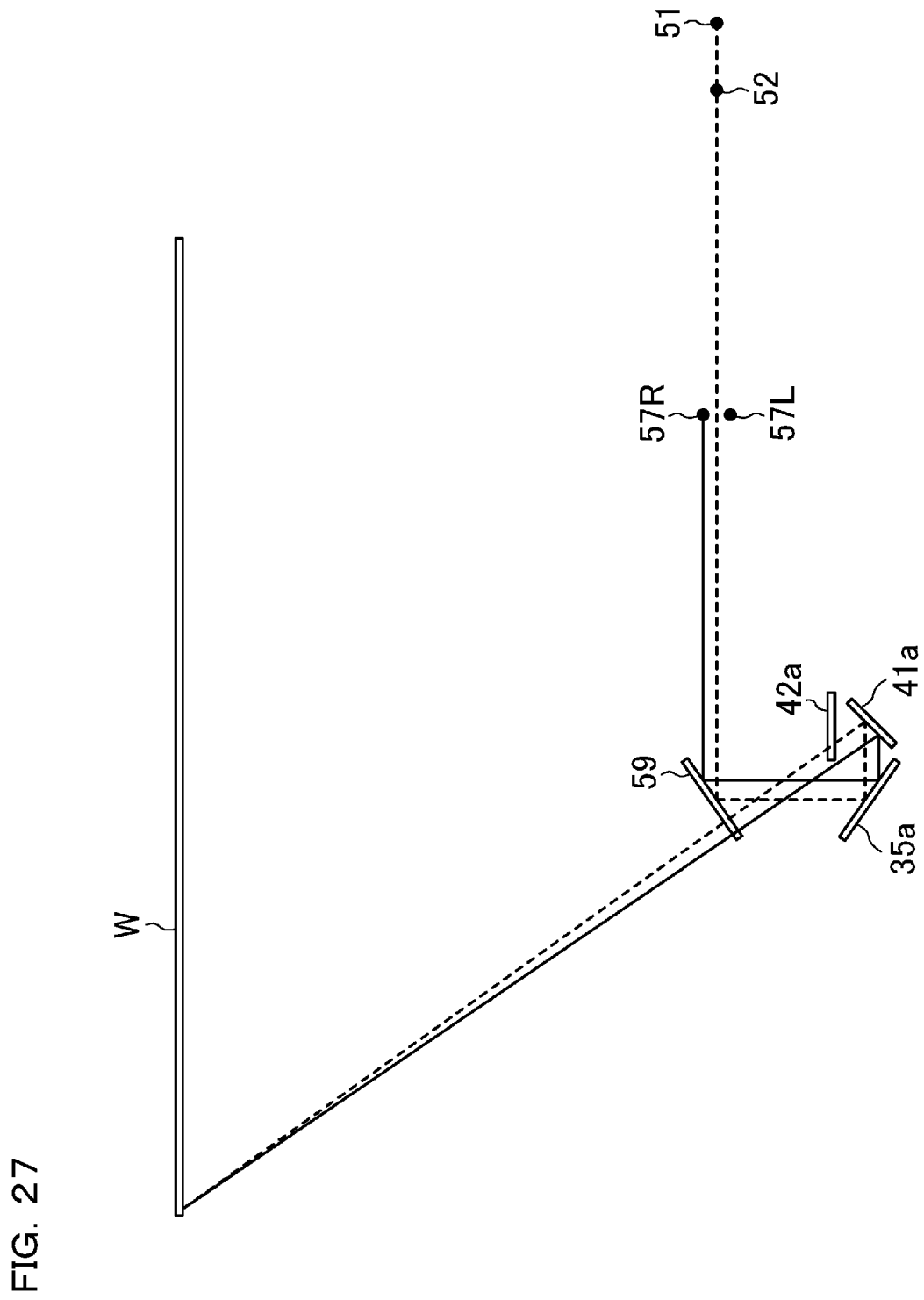
FIG. 27 is a diagram schematically showing a layout of an optical system.
Figure 28:
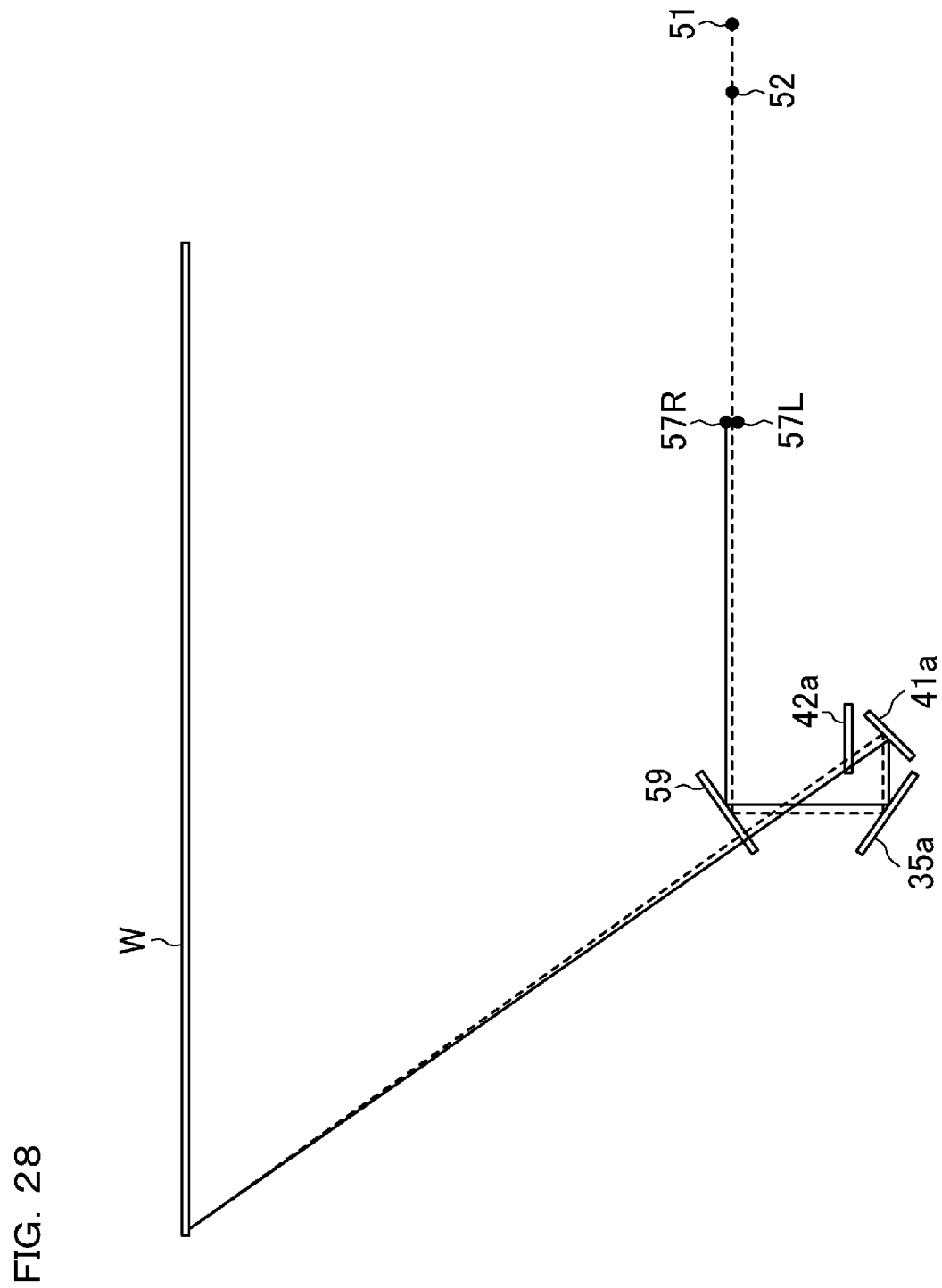
FIG. 28 is a diagram schematically showing a layout of an optical system.
Figure 29:
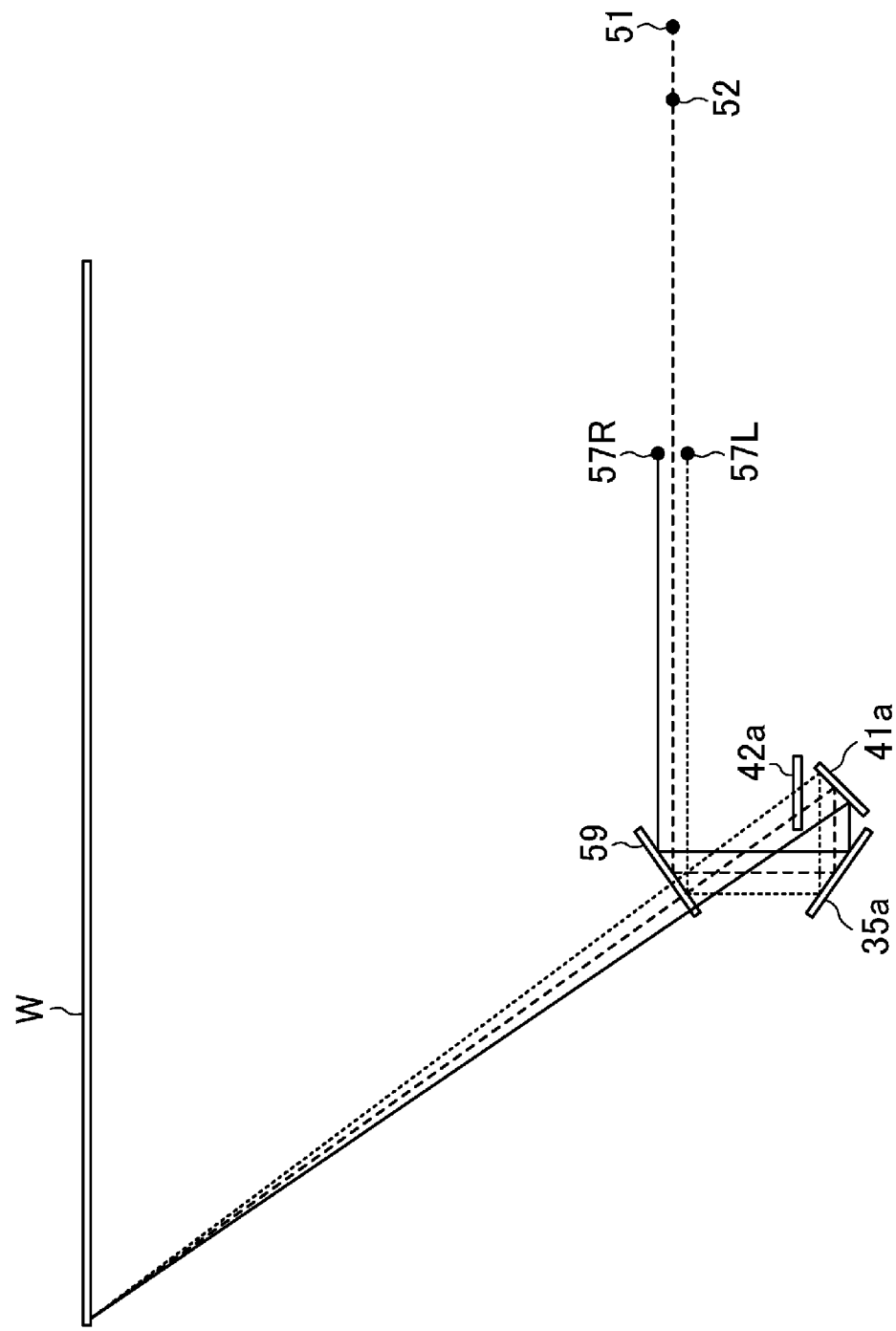
FIG. 29 is a diagram schematically showing a layout of an optical system.

FIG. 27 to FIG. 29 are diagrams schematically showing a layout of an optical system. The rough broken lines in FIG. 27 to FIG. 29 indicate a trajectory of the distance measurement light emitted from the distance measurement light source 51 and irradiated onto the workpiece W. The solid line and the fine broken lines in FIG. 27 to FIG. 29 indicate trajectories of the reflected light that is reflected by the workpiece Wand reaches the light receiving lenses 57L and 57R. The meanings of other reference numerals and signs are the same as in other drawings.

As shown in FIG. 27, when only one of the pair of light receiving lenses 57L and 57R is used, there is a possibility that the reflected light does not pass through the first mirror 41a or the second mirror 42a depending on the measurement position of the workpiece W. In the example shown in FIG. 27, the reflected light indicated by the solid line does not pass through the second mirror 42a, and thus the reflected light does not reach the light receiving lens 57R and the distance cannot be measured. Therefore, the area where the distance can be measured is limited.

In order to solve this problem, it is conceivable to make an optical path followed by the distance measurement light and an optical path followed by the reflected light as close as possible. However, when configured in this way, as shown in FIG. 28, an angle formed by the reflected light with respect to the distance measurement light (so-called light projecting/receiving angle) becomes excessively small, and thus there is still room for improving the measurement accuracy.

In contrast, as shown in FIG. 29, by using both of the pair of light receiving lenses 57L and 57R, even when the reflected light does not reach the light receiving lens 57R, the reflected light still can reach the other light receiving lens 57L. In this case, the angle formed by the reflected light with respect to the distance measurement light (so-called light projecting/receiving angle) can be made relatively large, and thus it is advantageous in improving the measurement accuracy.

In this way, the distance measuring unit 5 according to the embodiment can improve the measurement accuracy without narrowing the area where the distance can be measured.

<Measurement Using Peripheral Scanning>

Figure 24:
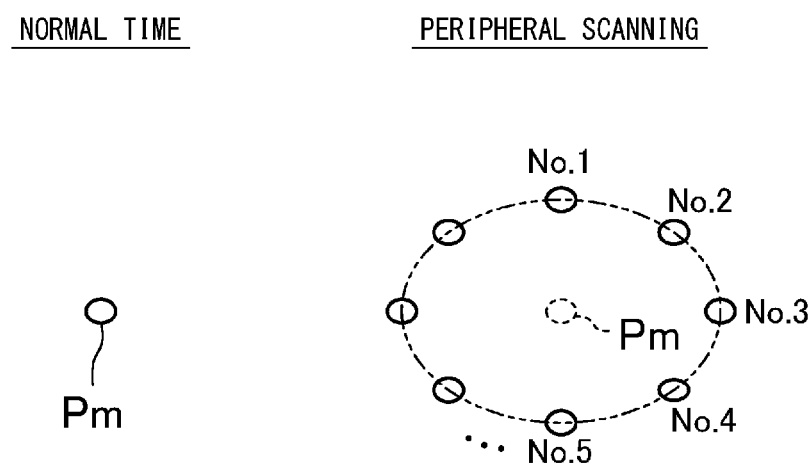
FIG. 24 is a diagram illustrating a peripheral scanning.

FIG. 24 is a diagram illustrating a peripheral scanning, and FIG. 25 is a diagram illustrating averaging processing by a peripheral scanning.

The measurement method described so far measures a distance at a certain coordinate Pm (a coordinate defined on the surface of the workpiece W, hereinafter also referred to as "distance measurement coordinate") as shown in the left diagram in FIG. 24. However, the method for suppressing the influence of specular reflection is not limited thereto. For example, the following method (hereinafter referred to as "peripheral scanning") can be considered.

As a specific example, the distance measurement light emitting section 5B emits distance measurement light a plurality of times with respect to a peripheral portion of a measurement position (corresponding to the aforementioned distance measurement coordinate Pm) on the workpiece W. The distance measuring section 103 measures a distance from the laser processing apparatus L to the peripheral portion a plurality of times based on each reflected light of the distance measurement light that has been emitted a plurality of times, and estimates a distance from the laser processing apparatus L to the distance measurement coordinate Pm based on the distances that have been measured a plurality of times.

That is, it is not to measure a distance to the distance measurement coordinate Pm. Instead, a distance at each of the coordinates around the distance measurement coordinate Pm is measured, and the distance to the distance measurement coordinate Pm is estimated using a measurement result thereof.

For example, as shown in the right diagram in FIG. 24, the distance measuring section 103 can measure coordinates No. 1, No. 2, No. 3, No. 4, No. 5 . . . around the distance measurement coordinate Pm in order by scanning the distance measurement light so as to follow a substantially circular trajectory.

The substantially circular trajectory is merely an example. For example, scanning may be performed along an elliptical trajectory, or a spiral trajectory, or a linear trajectory.

Even when a circular trajectory is used, a diameter thereof may be changed, or the speed of two-dimensional scanning may be changed, or a timing for measuring the distance may be changed. Alternatively, the circular trajectory may be circulated a plurality of times.

For example, when a circular trajectory is used, the timing for measuring the distance using the distance measurement light may be timings with substantially equal intervals as shown in the right diagram in FIG. 24, or may be timings with non-equal intervals.

The measurement results thus obtained may be averaged as shown in FIG. 25, for example. In FIG. 25, black circle plots indicate distance measurement values by the light receiving element 56L and white circle plots indicate distance measurement values by the other light receiving element 56R. Each measurement value is equal to a measurement result when a peripheral scanning is performed with respect to the aforementioned distance measurement coordinate Pm. The "average" here includes an average value obtained by a simple average or a trim average. A mode value may be used instead of the average value.

In FIG. 25A, a broken line extending along the horizontal axis indicates an average value (initial average value) obtained by averaging all measurement values. A plot greatly deviating from the average value means that specular reflected light is received. As described above, it is required to suppress the influence of specular reflected light as much as possible.

Therefore, as shown in FIG. 25B, the distance measuring section 103 calculates a deviation between the average value and each measurement value, and when the deviation exceeds a predetermined value (specifically, when a measurement value is above a straight line L1, or when a measurement value is below a straight line L2), the measurement value is considered to reflect an influence of the specular reflected light. The distance measuring section 103 excludes a measurement value that is considered to reflect the influence of the specular reflected light from the calculation of the average value.

The distance measuring section 103 extracts at least a part (measurement values that are considered not to reflect the influence of specular reflected light) of the distances from the laser processing apparatus L to the peripheral portion that have been measured a plurality of times, and recalculates the average value using the extracted part of distances.

The recalculated average value (new average value) is as shown in FIG. 25C. The distance measuring section 103 estimates that the average value obtained by recalculation is the distance to the distance measurement coordinate Pm. In this way, by combining the peripheral scanning and the averaging processing, the influence of the specular reflected light can be suppressed as much as possible and the measurement accuracy can be improved.

When the distance measuring section 103 measures the distance from the laser processing apparatus L to the distance measurement coordinate Pm by extracting at least a part of the distances that have been measured a plurality of times, the distance measuring section 103 can determine a probability of a measurement value based on a ratio of the extracted distances.

When the probability determined as described above is equal to or less than a predetermined value, the distance measuring section 103 can remeasure the distance from the laser processing apparatus L to the distance measurement coordinate Pm.

Specific Control Process

Figure 26:
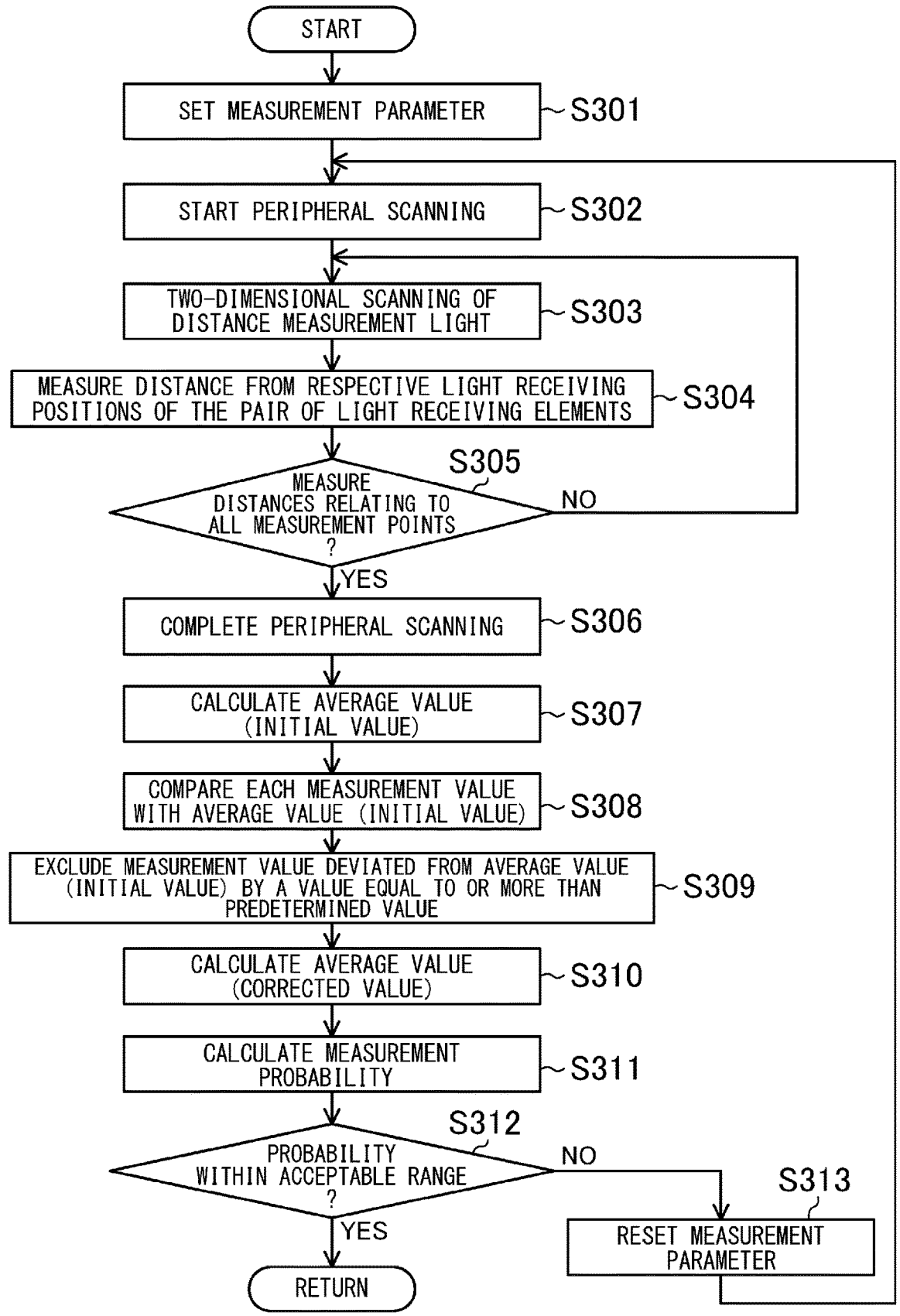
FIG. 26 is a flow chart exemplifying a specific procedure of averaging processing by a peripheral scanning.

FIG. 26 is a flow chart exemplifying a specific procedure of averaging processing by a peripheral scanning. First, in step S301, the distance measuring section 103 determines a measurement parameter. The measurement parameter determined in step S301 includes parameters such as a peripheral scanning trajectory, the size of the trajectory, the speed of two-dimensional scanning when following the trajectory, and timing for measuring the distance. In addition, the distance measurement coordinate Pm, the intensity of the distance measurement light emitted from the distance measurement light emitting section 5A, the sensitivity of the light receiving surface 56a, etc., may also be used as a measurement parameter. The measurement parameter may be set manually by the user, or may be automatically read from data stored in the condition setting storing section 102, etc.

In subsequent step S302, the distance measuring section 103 starts a peripheral scanning.

In subsequent step S303, the distance measuring section 103 performs a two-dimensional scanning of the distance measurement light to measure the distance around the distance measurement coordinate Pm.

Particularly in the embodiment, as shown in step S304, the distance is measured from respective light receiving positions of the pair of light receiving elements 56L and 56R in the distance measuring unit 5.

In subsequent S304, the distance measuring section 103 determines whether distances relating to all measurement points (measurement points around the distance measurement coordinate Pm) have been measured. When it is determined YES, the process proceeds to step S306 to determine that the peripheral scanning has been completed. When it is determined NO, the process returns to step S303 to continue to perform the peripheral scanning.

In step S307 following step S305, the distance measuring section 103 calculates an average value (initial value). The average value here is equal to an average value obtained by averaging all measurement values obtained through the peripheral scanning as illustrated in FIG. 25A.

In subsequent step S308, the distance measuring section 103 compares each measurement value (measurement value at each measurement point) with the average value (initial value).

In subsequent step S309, as illustrated in FIG. 25B, the distance measuring section 103 excludes measurement values that deviate from the average value (initial value) by a value equal to or more than a predetermined value.

In subsequent step S310, as illustrated in FIG. 25C, the distance measuring section 103 calculates an average value (corrected value) using the remaining measurement values that are not excluded in step S309. The corrected value here is equal to the new average value illustrated in FIG. 25C, and can be regarded as an estimated value of the distance from the marker head 1 to the distance measurement coordinate Pm.

In subsequent step S311, the distance measuring section 103 calculates a probability of measurement. Specifically, the distance measuring section 103 calculates a ratio of the number of measurement values used in the calculation in step S310 to the total number of measurement values obtained through the peripheral scanning. The distance measuring section 103 regards the ratio thus calculated as the probability.

In subsequent step S312, the distance measuring section 103 determines whether the probability calculated in step S311 is within an acceptable range. When it is determined YES, the process returns. When it is determined NO, the process proceeds to step S313.

In step S313, the distance measuring section 103 resets the measurement parameter set in step S301, and returns to step S302. This is equivalent to performing measurement again using the reset measurement parameter, that is, performing remeasurement (retry).

Although not shown in the drawings, processing using the number of remeasurements (retries) as a control parameter may be performed. For example, when the number of retries exceeds a predetermined number, the distance measurement coordinate Pm may be automatically changed.

Variation of Control Process

In the flowchart exemplified in FIG. 26, processing using the distance measurement value is illustrated. However, it is not limited to this configuration. As in the flow chart illustrated in FIG. 23, processing using the intensity of the reflected light may be used.

<Other Variations>

In the aforementioned embodiment, the distance measuring unit 5 is configured to include two light receiving elements 56L and 56R, and one distance measurement light source 51. However, it is not limited to this configuration. The distance measuring unit 5 may include, for example, three or more light receiving elements, or may include two or more distance measurement light sources. In this case, the three or more light receiving elements may be arranged side by side on a horizontal plane, or may three-dimensionally arranged using the vertical direction. In addition, two or more light receiving lenses may be used for one light receiving element, and a plurality of light receiving lenses may be three-dimensionally arranged.

What is claimed is:

1. A laser processing apparatus including
an excitation light generating section which generates excitation light,
a laser light output section which generates laser light for printing processing based on the excitation light generated by the excitation light generating section and emits the laser light,
a laser light scanning section which irradiates a workpiece with the laser light emitted from the laser light output section and scans the laser light emitted from the laser light output section on a surface of the workpiece, the laser light scanning section having a first galvano mirror and a second galvano mirror, the second galvano mirror reflecting the laser light reflected by the first galvano mirror, and
a marker head in which at least the laser light output section, the first galvano mirror and the second galvano mirror are provided, the marker head having an emission window through which the laser light reflected by the first galvano mirror and the second galvano mirror passes,
wherein the laser processing apparatus includes
a distance measuring unit which is provided within the marker head and for measuring a distance from the laser processing apparatus to the surface of the workpiece,
a distance measurement light emitting section which is provided in the distance measuring unit and emits distance measurement light,
a merging mechanism which is provided on an optical path between the laser light output section and the first galvano mirror in the marker head, the optical path used for the laser light for printing processing, guides the distance measurement light emitted from the distance measurement light emitting section to the workpiece by merging the distance measurement light into the optical path such that the distance measurement light reaches the first galvano mirror, the second galvano mirror and the emission window in turn, and guides, to the distance measuring unit, the distance measurement light reflected by the workpiece and going through the emission window, the second galvano mirror and the first galvano mirror in turn,
a pair of light receiving elements which is provided in the distance measuring unit and receives the distance measurement light guided by the merging mechanism, optical axes of the pair of light receiving elements being arranged inside the marker head so as to sandwich an optical axis of the distance measurement light emitting section,
a light receiving lens which is arranged in the distance measuring unit such that each of the optical axes of the pair of light receiving elements passes through the light receiving lens, and is arranged on an optical path between the merging mechanism and the pair of light receiving elements, and condenses the distance measurement light that has been reflected by the workpiece and has passed through the merging mechanism on respective light receiving surfaces of the pair of light receiving elements, and
a distance measuring section which measures a distance from the laser processing apparatus to the surface of the workpiece by a triangulation method based on a light receiving position of the distance measurement light condensed on respective light receiving surfaces of the pair of light receiving element.

2. The laser processing apparatus according to claim 1, wherein
an optical path length from the merging mechanism to the pair of light receiving elements is longer than an optical path length from the merging mechanism to the distance measurement light emitting section.

3. The laser processing apparatus according to claim 1, wherein
the pair of light receiving elements is arranged in a direction orthogonal to the optical axis of the distance measurement light emitting section.

4. The laser processing apparatus according to claim 1, wherein
the distance measurement light emitting section includes a light projecting lens which is provided between the pair of light receiving elements and the light receiving lens and is arranged such that the optical axis of the distance measurement light emitting section passes through the light projecting lens.

5. The laser processing apparatus according to claim 4, wherein
a support base extending along the optical axis of the distance measurement light emitting section is provided in the marker head,
the distance measurement light emitting section includes a distance measurement light source which emits the distance measurement light to be condensed by the light projecting lens, and
the distance measurement light source and the light projecting lens are both fixed via the support base.

6. The laser processing apparatus according to claim 5, wherein
the pair of light receiving elements and the light receiving lens are both fixed on the support base.

7. The laser processing apparatus according to claim 1, wherein
the light receiving lens includes a pair of light receiving lenses,
an optical axis of one of the pair of light receiving lenses passes through one of the pair of light receiving elements, and
an optical axis of the other of the pair of light receiving lenses passes through the other of the pair of light receiving elements.

8. The laser processing apparatus according to claim 1, wherein
a main surface of the light receiving lens and the respective light receiving surfaces of the pair of light receiving elements are arranged so as not to follow Scheimpflug principle.

9. The laser processing apparatus according to claim 8, wherein
a diaphragm for adjusting light amount incident on the light receiving surfaces is provided between the light receiving lens and the respective light receiving surfaces of the pair of light receiving elements, or between the merging mechanism and the light receiving lens, or between the light receiving lens and the respective light receiving surfaces of the pair of light receiving elements and between the merging mechanism and the light receiving lens.

10. The laser processing apparatus according to claim 1, wherein
the marker head includes a bottom plate positioned at least below the laser light scanning section, the merging mechanism, the pair of light receiving elements, and the light receiving lens, and
the laser light scanning section, the merging mechanism, the light receiving lens, and the pair of light receiving elements are arranged at substantially a same height when viewed from the bottom plate.

11. The laser processing apparatus according to claim 1, wherein
the first galvano mirror scans the laser light emitted from the laser light output section in a first direction, and the second galvano mirror scans the laser light scanned by the first galvano mirror in a second direction substantially orthogonal to the first direction,
the pair of light receiving elements receives the distance measurement light reflected by the workpiece and reflected by the first galvano mirror and the second galvano mirror,
the pair of light receiving elements is arranged such that their relative positional relations with the first galvano mirror and the second galvano mirror are different from each other, and
the distance measuring section measures, when the distance measurement light has been received by at least one of the pair of light receiving elements, the distance from the laser processing apparatus to the surface of the workpiece based on a light receiving position of the distance measurement light.

12. The laser processing apparatus according to claim 1, wherein
the distance measurement light emitting section emits the distance measurement light a plurality of times with respect to a peripheral portion of a measurement position on the workpiece,
the distance measuring section measures a distance from the laser processing apparatus to the peripheral portion a plurality of times based on each reflected light of the distance measurement light that has been emitted a plurality of times, and
the distance measuring section estimates a distance from the laser processing apparatus to the measurement position based on the distances from the laser processing apparatus to the peripheral portion that have been measured a plurality of times.

13. The laser processing apparatus according to claim 12, wherein
the distance measuring section estimates the distance from the laser processing apparatus to the measurement position by extracting at least a part of the distances from the laser processing apparatus to the peripheral portion that have been measured a plurality of times, and determines a probability of a measurement value based on a ratio of the extracted distances.

14. The laser processing apparatus according to claim 13, wherein
the distance measuring section remeasures the distance from the laser processing apparatus to the measurement position when the probability is equal to or less than a predetermined value.

* * * * *